United States Patent
Afshari

(10) Patent No.: US 11,085,440 B2
(45) Date of Patent: *Aug. 10, 2021

(54) SYSTEM TO PUMP FLUID AND CONTROL THEREOF

(71) Applicant: Project Phoenix, LLC, Mesa, AZ (US)

(72) Inventor: Thomas Afshari, Phoenix, AZ (US)

(73) Assignee: Project Phoenix, LLC, Mesa, AZ (US)

( * ) Notice: Subject to any disclaimer, the term of this patent is extended or adjusted under 35 U.S.C. 154(b) by 634 days.

This patent is subject to a terminal disclaimer.

(21) Appl. No.: 15/756,928

(22) PCT Filed: Sep. 1, 2016

(86) PCT No.: PCT/US2016/049959
§ 371 (c)(1),
(2) Date: Mar. 1, 2018

(87) PCT Pub. No.: WO2017/040825
PCT Pub. Date: Mar. 9, 2017

(65) Prior Publication Data
US 2018/0252213 A1  Sep. 6, 2018

Related U.S. Application Data

(60) Provisional application No. 62/213,505, filed on Sep. 2, 2015.

(51) Int. Cl.
*F04C 2/08* (2006.01)
*F04C 15/00* (2006.01)
(Continued)

(52) U.S. Cl.
CPC .............. *F04C 2/084* (2013.01); *F04C 2/18* (2013.01); *F04C 11/00* (2013.01); *F04C 11/003* (2013.01);
(Continued)

(58) Field of Classification Search
CPC ...... F16H 39/02; F16H 39/06; F16H 61/4008; F16H 61/4035; F15B 7/006; F15B 15/08;
(Continued)

(56) References Cited

U.S. PATENT DOCUMENTS

| 337,551 A | 3/1886 | Berrenberg et al. |
| 688,616 A | 12/1901 | Ferguson |

(Continued)

FOREIGN PATENT DOCUMENTS

| CA | 2 236 535 A1 | 11/1999 |
| CA | 2 878 316 A1 | 3/2014 |

(Continued)

OTHER PUBLICATIONS

Esposito, Fluid Power with Applicators, 7th Ed., Chapter 5, pp. 154-162 (2009).

(Continued)

*Primary Examiner* — Atif H Chaudry
(74) *Attorney, Agent, or Firm* — Perkins Coie LLP

(57) ABSTRACT

A fluid-driven actuator system includes a fluid-driven actuator and at least one proportional control valve and at least one pump connected to the fluid-driven actuator to provide fluid to operate the fluid-driven actuator. The at least one pump includes at least one fluid driver having a prime mover and a fluid displacement assembly to be driven by the prime mover such that fluid is transferred from the pump inlet to the pump outlet. The fluid-driven actuator system also includes a controller that establishes at least one of a speed and a torque of the at least one prime mover to adjust at least one of a flow in the fluid-driven system to a flow set point and a pressure in the fluid-driven actuator system to a pressure set point and concurrently establishes an opening of (Continued)

the at least one proportional control valve to adjust at least one of the flow to the flow set point and the pressure to the pressure set point.

20 Claims, 37 Drawing Sheets

(51) Int. Cl.
| | |
|---|---|
| F04C 11/00 | (2006.01) |
| F15B 15/18 | (2006.01) |
| F15B 7/00 | (2006.01) |
| F16H 39/06 | (2006.01) |
| F15B 15/08 | (2006.01) |
| F16H 39/02 | (2006.01) |
| F16H 61/4008 | (2010.01) |
| F16H 61/4035 | (2010.01) |
| F04C 14/08 | (2006.01) |
| F04C 2/18 | (2006.01) |
| F15B 15/20 | (2006.01) |

(52) U.S. Cl.
CPC ............ *F04C 11/008* (2013.01); *F04C 14/08* (2013.01); *F04C 15/00* (2013.01); *F04C 15/0092* (2013.01); *F04C 15/0096* (2013.01); *F15B 7/006* (2013.01); *F15B 15/08* (2013.01); *F15B 15/18* (2013.01); *F15B 15/202* (2013.01); *F16H 39/02* (2013.01); *F16H 39/06* (2013.01); *F16H 61/4008* (2013.01); *F16H 61/4035* (2013.01); *F04C 2270/035* (2013.01); *F04C 2270/051* (2013.01)

(58) Field of Classification Search
CPC ......... F04C 11/008; F04C 2/18; F04C 14/08; F04C 2270/035; F04C 2270/051; F04C 2/084
See application file for complete search history.

(56) References Cited

U.S. PATENT DOCUMENTS

| | | | |
|---|---|---|---|
| 1,341,846 A | 6/1920 | Gollings | |
| 1,361,423 A | 12/1920 | Waterous | |
| 1,407,496 A | 2/1922 | Storey | |
| 1,418,741 A | 6/1922 | Stallman | |
| 1,665,120 A | 4/1928 | Wendell | |
| 1,681,796 A | 8/1928 | Wendell | |
| 1,712,157 A | 5/1929 | Morita | |
| 2,439,427 A | 4/1948 | Guibert et al. | |
| 2,572,334 A | 10/1951 | Guibert | |
| 2,601,397 A | 6/1952 | Hill et al. | |
| 2,621,603 A | 12/1952 | Thomas | |
| 2,918,209 A | 12/1959 | Schueller | |
| 2,927,429 A | 3/1960 | Carlson | |
| 2,928,295 A | 3/1960 | Boulanger | |
| 2,937,807 A | 5/1960 | Lorenz | |
| 2,940,661 A | 6/1960 | Lorenz | |
| 3,136,224 A | 6/1964 | Escobosa | |
| 3,264,502 A | 8/1966 | Lytle et al. | |
| 3,585,973 A | 6/1971 | Klover | |
| 3,694,105 A | 9/1972 | Martin | |
| 3,763,746 A | 10/1973 | Walters | |
| 3,922,855 A | 12/1975 | Bridwell et al. | |
| 3,932,993 A | 1/1976 | Riedhammer | |
| 3,979,910 A | 9/1976 | Leuenberger et al. | |
| 4,016,719 A | 4/1977 | Yavnai | |
| 4,030,403 A | 6/1977 | Elser | |
| 4,345,436 A | 8/1982 | Johnson | |
| 4,369,625 A | 1/1983 | Izumi et al. | |
| 4,418,610 A | 12/1983 | Holtrop | |
| 4,529,362 A | 7/1985 | Ichiryu et al. | |
| 4,627,237 A | 12/1986 | Hutson | |
| 4,630,441 A | 12/1986 | Chamberlain | |
| 4,682,939 A | 7/1987 | Petro | |
| 4,696,163 A | 9/1987 | Glomeau | |
| 4,850,812 A | 7/1989 | Voight | |
| 5,026,248 A | 6/1991 | Hamilton | |
| 5,048,294 A | 9/1991 | Oshina et al. | |
| 5,161,957 A | 11/1992 | Ribaudo | |
| 5,197,861 A | 3/1993 | Maruyama et al. | |
| 5,271,719 A | 12/1993 | Abe et al. | |
| 5,295,798 A | 3/1994 | Maruyama et al. | |
| 5,329,216 A | 7/1994 | Hasegawa | |
| 5,708,311 A | 1/1998 | Claar et al. | |
| 5,709,537 A | 1/1998 | Maruyama et al. | |
| 5,767,635 A | 6/1998 | Steffens et al. | |
| 5,767,638 A | 6/1998 | Wu et al. | |
| 5,778,671 A | 7/1998 | Bloomquist et al. | |
| 5,836,746 A | 11/1998 | Maruyama et al. | |
| 6,002,186 A | 12/1999 | Coutu et al. | |
| 6,004,119 A | 12/1999 | Yoshiaki et al. | |
| 6,042,095 A | 3/2000 | Kuchta | |
| 6,048,235 A | 4/2000 | Kai | |
| 6,053,717 A | 4/2000 | Dixon | |
| 6,155,790 A | 12/2000 | Pyötsiä et al. | |
| 6,247,906 B1 | 6/2001 | Pijanowski | |
| 6,447,256 B2 | 9/2002 | Bussard | |
| 6,447,266 B2 | 9/2002 | Antaki et al. | |
| 6,543,223 B2 | 4/2003 | Muschong et al. | |
| 6,652,249 B2 | 11/2003 | Kenney et al. | |
| 6,796,120 B2 | 9/2004 | Franchet et al. | |
| 6,971,463 B2 | 12/2005 | Shore et al. | |
| 6,979,185 B2 | 12/2005 | Kaempe | |
| 7,000,386 B1 | 2/2006 | Morgan | |
| 7,051,526 B2 | 5/2006 | Geiger | |
| 7,155,910 B2 | 1/2007 | Last | |
| 7,191,593 B1 | 3/2007 | Ho | |
| 7,232,292 B2 | 6/2007 | Lopatinsky et al. | |
| 7,240,893 B2 | 6/2007 | Komaba et al. | |
| 7,281,372 B2 | 10/2007 | Sakai et al. | |
| 7,434,395 B2 | 10/2008 | He | |
| 7,537,441 B2 | 5/2009 | Iwasaki | |
| 7,870,727 B2 | 1/2011 | Mueller et al. | |
| 7,927,079 B2 | 4/2011 | Suzuki et al. | |
| 8,157,539 B2 | 4/2012 | Hidaka et al. | |
| 8,167,589 B2 | 5/2012 | Hidaka et al. | |
| 8,448,432 B2 | 5/2013 | Bresie | |
| 8,869,924 B2 | 10/2014 | Kim | |
| 8,959,905 B2 | 2/2015 | Baltes et al. | |
| 9,234,532 B2 | 1/2016 | Vanderlaan et al. | |
| 9,670,943 B2 | 6/2017 | Gomm et al. | |
| 2002/0009368 A1 | 1/2002 | Bussard | |
| 2003/0077183 A1 | 4/2003 | Franchet et al. | |
| 2003/0091448 A1 | 5/2003 | Prampolini | |
| 2003/0126981 A1 | 7/2003 | Bridger et al. | |
| 2003/0151315 A1 | 8/2003 | Choi et al. | |
| 2004/0060430 A1 | 4/2004 | Brinkman | |
| 2004/0213680 A1 | 10/2004 | Suzuki et al. | |
| 2005/0022523 A1 | 2/2005 | Nagai et al. | |
| 2005/0089414 A1* | 4/2005 | Ohman | F04B 35/045 417/410.4 |
| 2005/0112012 A1 | 5/2005 | Marheineie | |
| 2005/0144939 A1 | 7/2005 | Mentink et al. | |
| 2005/0238505 A1 | 10/2005 | Iwasaki | |
| 2005/0254970 A1 | 11/2005 | Mayer et al. | |
| 2006/0001202 A1 | 1/2006 | Bauman | |
| 2006/0039804 A1 | 2/2006 | Jordan et al. | |
| 2006/0156713 A1 | 7/2006 | Kadlicko | |
| 2007/0074511 A1 | 4/2007 | Verkuilen | |
| 2007/0098576 A1 | 5/2007 | Horng et al. | |
| 2007/0101711 A1 | 5/2007 | Debus | |
| 2007/0157612 A1 | 7/2007 | He | |
| 2007/0166168 A1 | 7/2007 | Vigholm | |
| 2008/0010984 A1 | 1/2008 | Arbel et al. | |
| 2008/0190104 A1 | 8/2008 | Bresie | |
| 2009/0210120 A1 | 8/2009 | Stein | |
| 2009/0266934 A1 | 10/2009 | Makino | |
| 2009/0297370 A1 | 12/2009 | Moldovan et al. | |
| 2010/0226806 A1 | 9/2010 | Mellet et al. | |
| 2010/0247362 A1 | 9/2010 | Koizumi | |
| 2010/0264885 A1 | 10/2010 | Olsen et al. | |

(56) References Cited

U.S. PATENT DOCUMENTS

| | | | |
|---|---|---|---|
| 2010/0322805 A1* | 12/2010 | Aregger | F04C 2/18 418/2 |
| 2011/0000203 A1 | 1/2011 | Riedel et al. | |
| 2011/0017310 A1 | 1/2011 | Eriksson | |
| 2011/0030364 A1 | 2/2011 | Persson et al. | |
| 2011/0030505 A1 | 2/2011 | Hoyle et al. | |
| 2011/0135516 A1 | 6/2011 | Oishi et al. | |
| 2011/0209471 A1 | 9/2011 | Vanderlaan et al. | |
| 2011/0250082 A1 | 10/2011 | Han et al. | |
| 2012/0141315 A1 | 6/2012 | Seto et al. | |
| 2012/0173027 A1 | 7/2012 | Cheng et al. | |
| 2012/0233997 A1 | 9/2012 | Andruch, III et al. | |
| 2012/0305603 A1 | 12/2012 | Kwok et al. | |
| 2013/0074487 A1 | 3/2013 | Herold et al. | |
| 2013/0091833 A1 | 4/2013 | Zhan et al. | |
| 2013/0098015 A1 | 4/2013 | Opdenbosh | |
| 2013/0098017 A1 | 4/2013 | Knussman et al. | |
| 2013/0098464 A1 | 4/2013 | Knussman | |
| 2013/0239558 A1 | 9/2013 | Shirao | |
| 2013/0298542 A1 | 11/2013 | Lowman et al. | |
| 2014/0105714 A1 | 4/2014 | Kim | |
| 2014/0130487 A1 | 5/2014 | Akiyama et al. | |
| 2014/0174549 A1 | 6/2014 | Dybing | |
| 2014/0260233 A1* | 9/2014 | Giovanardi | F15B 13/0444 60/431 |
| 2014/0308106 A1 | 10/2014 | Beschorner | |
| 2014/0366519 A1 | 12/2014 | Sadamori | |
| 2015/0121860 A1 | 5/2015 | Hyon | |
| 2015/0275927 A1 | 10/2015 | Gomm et al. | |
| 2015/0308463 A1 | 10/2015 | Gomm et al. | |
| 2015/0361743 A1* | 12/2015 | Miikkulainen | E21B 21/106 175/24 |
| 2016/0102685 A1* | 4/2016 | Chester | F15B 7/006 60/327 |

FOREIGN PATENT DOCUMENTS

| | | |
|---|---|---|
| CH | 625 600 A5 | 9/1981 |
| CN | 101655087 A | 2/2018 |
| DE | 1 258 617 | 1/1968 |
| DE | 1 528 965 | 10/1969 |
| DE | 3 230 550 A1 | 1/1984 |
| DE | 3 247 004 A1 | 6/1984 |
| DE | 3 821 321 A1 | 12/1989 |
| DE | 10 2008 018407 A1 | 10/2009 |
| DE | 10 2009 027282 A1 | 12/2010 |
| DE | 10 2009 028095 A1 | 2/2011 |
| DE | 10 2009 045028 A1 | 3/2011 |
| DE | 10 2011 005831 A1 | 9/2012 |
| DE | 10 2012 102156 A1 | 10/2012 |
| EP | 0 558 921 A1 | 9/1993 |
| EP | 0 942 173 A1 | 9/1999 |
| EP | 1 249 608 A1 | 10/2002 |
| EP | 1 531 269 | 5/2005 |
| EP | 1 967 745 A1 | 9/2008 |
| EP | 2 113 666 A2 | 11/2009 |
| EP | 2 816 237 A1 | 12/2014 |
| FR | 2.119.294 | 8/1972 |
| FR | 2 428 771 | 1/1980 |
| GB | 270 000 | 5/1927 |
| GB | 1 081 711 A | 8/1967 |
| GB | 1 284 551 | 8/1972 |
| GB | 1 284 552 | 8/1972 |
| GB | 1 284 553 | 8/1972 |
| GB | 1 450 436 | 9/1976 |
| GB | 2 123 089 A | 1/1984 |
| GB | 2 259 333 | 3/1993 |
| JP | S59-20590 A | 2/1984 |
| JP | HEI 11-336671 A | 12/1999 |
| JP | 2001-011899 A | 1/2001 |
| JP | 2001-153066 A | 6/2001 |
| JP | 2002-147370 A | 5/2002 |
| JP | 2003-088084 A | 3/2003 |
| JP | 2006-316662 A | 11/2006 |
| JP | 3 154 210 U | 10/2009 |
| JP | 2014-009655 A | 1/2014 |
| JP | 2014-512495 A | 5/2014 |
| RU | 2284424 C1 | 9/2006 |
| RU | 2009149035 A | 8/2011 |
| SU | 857 550 A | 8/1981 |
| SU | 1 087 705 A | 4/1984 |
| WO | WO 1991/13256 A1 | 9/1991 |
| WO | WO 01/073295 A1 | 10/2001 |
| WO | WO 03/069160 A1 | 8/2003 |
| WO | WO 2004/071845 A1 | 8/2004 |
| WO | WO 2008/060681 A2 | 5/2008 |
| WO | WO 2010/083991 A2 | 7/2010 |
| WO | WO 2010/097596 A1 | 9/2010 |
| WO | WO 2011/035971 A2 | 3/2011 |
| WO | WO 2011/048261 A1 | 4/2011 |
| WO | WO 2011/072502 A1 | 6/2011 |
| WO | 2012-122159 A2 | 9/2012 |
| WO | WO 2013/06902 A1 | 1/2013 |
| WO | WO 2013/027620 A1 | 2/2013 |
| WO | WO 2014/060760 A2 | 4/2014 |
| WO | WO 2014/135284 A1 | 9/2014 |
| WO | WO 2014/176256 A1 | 10/2014 |

OTHER PUBLICATIONS

International Search Report and Written Opinion, International Applicatoin No. PCT/US2015/018342 (published as WO 2015/131196), 19 pages (dated Jul. 20, 2015).

International Search Report and Written Opinion, International Application No. PCT/US2015/022484, (published as WO 2015/148662), 9 pages (dated Jun. 9, 2015).

International Search Report and Written Opinion, International Application No. PCT/US2015/027003 (published as WO 2015/164453), 18 pages (dated Nov. 4, 2015).

International Search Report and Written Opinion, International Application No. PCT/US2015/033752 (published as WO 2015/187673), 15 pages (dated Sep. 29, 2015).

International Search Report and Written Opinion, International Application No. PCT/US2015/033764 (published as WO 2015/187681), 7 pages (dated Aug. 19, 2015).

International Search Report and Written Opinion, International Application No. PCT/US2015/033776 (published as WO 2015/187688), 31 pages (dated Oct. 28, 2015).

International Search Report and Written Opinion, International Application No. PCT/US2015/041612 (published as WO 2016/014715), 8 pages (dated Sep. 28, 2015).

International Search Report and Written Opinion, International Application No. PCT/US2015/053670 (published as WO 2015/057321), 10 pages (dated Dec. 16, 2015).

International Search Report and Written Opinion, International Application No. PCT/US2015/054145 (published as WO 2016/064569), 9 pages (dated Feb. 2, 2016).

International Search Report and Written Opinion, International Application No. PCT/US2015/050589 (published as WO 2016/048773), 10 pages (dated Dec. 7, 2015).

International Search Report and Written Opinion, International Application No. PCT/US2016/049959 (published as WO 2017/040825), 10 pages (dated Dec. 9, 2016).

International Search Report and Written Opinion, International Application No. PCT/US2016/049918 (published as WO 2017/040792), 10 pages (dated Nov. 23, 2016).

Marks' Standard Handbook for Mechanical Engineers, Eighth Ed., Section 14, pp. 14-1-14-31 (1978).

Supplementary European Search Report, EP Application No. 15802457.0, 24 pages (dated Mar. 14, 2018).

Supplementary European Search Report, EP Application No. 15803186.4, 9 pages (dated Dec. 19, 2017).

Supplementary European Search Report, EP Application No. 15803994.1, 7 pages (dated Jan. 22, 2018).

Supplemental European Search Report, European Application No. EP 18 20 7568.9 (not yet published), 7 pages (Feb. 4, 2019).

(56) References Cited

OTHER PUBLICATIONS

Yusof et al., "Slip flow coefficient analysis in water hydrauilics gear pump for environmental friendly application," *IOP Conf. Series: Materials Science and Engineering*, 50:012016 (2013).
U.S. Appl. No. 16/698,566, filed Nov. 27, 2019, Hydrostatic Transmission Assembly and System.
U.S. Appl. No. 16/698,631, filed Nov. 27, 2019, Linear Actuator Assembly and System.
U.S. Appl. No. 16/714,504, filed Dec. 13, 2019, Linear Actuator Assembly and System.
U.S. Appl. No. 16/714,540, filed Dec. 13, 2019, Hydrostatic Transmission Assembly and System.
U.S. Appl. No. 16/787,876, filed Feb. 11, 2020, External Gear Pump Integrated With Two Independently Driven Prime Movers.
U.S. Appl. No. 16/936,366, filed Jul. 22, 2020, Linear Actuator Assembly and System.
U.S. Appl. No. 17/022,059, filed Sep. 15, 2020, System to Pump Fluid and Control Thereof.
U.S. Appl. No. 17/092,159, filed Nov. 6, 2020, System to Pump Fluid and Control Thereof.
Extended European Search Report, European Application No. 20197360.9, 8 pages (dated Nov. 10, 2020).
Supplementary European Search Report, EP Application No. 20166746.6, 7 pages (dated May 6, 2020).
Supplementary European Search Report, EP Application No. 20168937.9, 8 pages (dated May 14, 2020).
Supplementary European Search Report, EP Application No. 20179980.6, 8 pages (dated Jul. 30, 2020).

\* cited by examiner

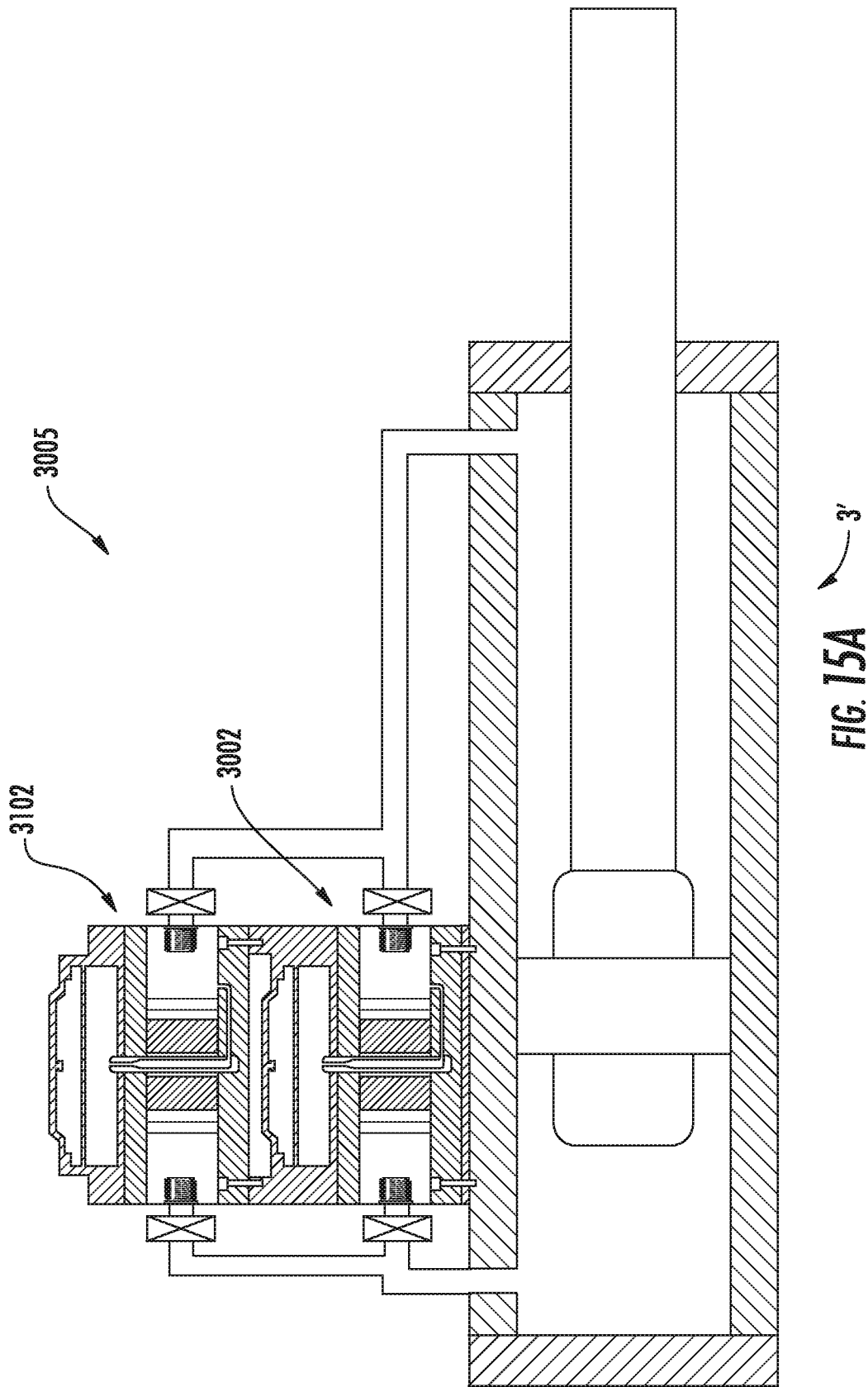

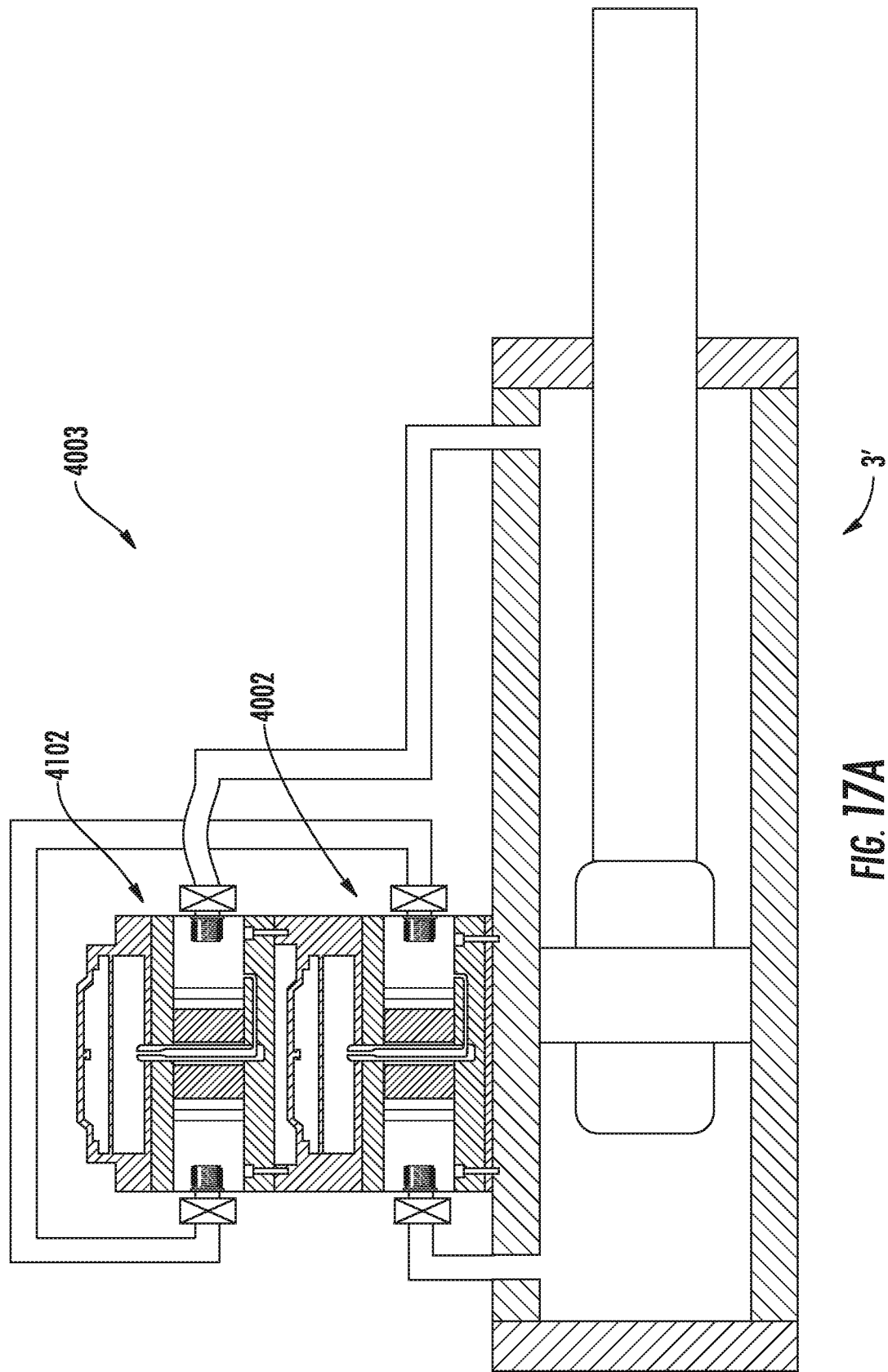

SYSTEM TO PUMP FLUID AND CONTROL THEREOF

PRIORITY

The present application is a 371 filing of International Application No. PCT/US2016/049959, which was filed Sep. 1, 2016, and which claims the benefit of priority to U.S. Provisional Application No. 62/213,505 filed on Sep. 2, 2015, which is incorporated herein by reference in its entirety.

TECHNICAL FIELD

The present invention relates generally to fluid pumping systems fluid-driven actuator assemblies and control methodologies thereof, and more particularly to fluid-driven actuator assemblies having at least one pump assembly, at least one proportional control valve assembly and a fluid-driven actuator; and control methodologies thereof in a fluid pumping system, including adjusting at least one of a flow and a pressure in the system by establishing a speed and/or torque of each prime mover in the at least one pump assembly and concurrently establishing an opening of at least one control valve in the at least one proportional control valve assembly.

BACKGROUND OF THE INVENTION

Fluid-driven actuator assemblies are widely used in a variety of applications ranging from small to heavy load applications. Because the specifics of the systems can vary depending on the application, for brevity, the background of the invention will be described in terms of a generalized hydraulic system application typically found in heavy and industrial machines. In such machines, hydraulic systems can be used in applications ranging from small to heavy load applications, e.g., excavators, front-end loaders, cranes, and hydrostatic transmissions to name just a few. Depending on the type of system, a conventional machine with a hydraulic system usually includes many parts such as a hydraulic actuator (e.g., a hydraulic cylinder, hydraulic motor, or another type of actuator that performs work on an external load), a hydraulic pump (including a motor and gear assembly), and a fluid reservoir. The motor drives the gear assembly to provide pressurized fluid from the fluid reservoir to the hydraulic actuator, in a predetermined manner. For example, when the hydraulic actuator is a hydraulic cylinder, the hydraulic fluid from the pump causes the piston rod of the cylinder to move within the body of the cylinder. In a case where the hydraulic actuator is a hydraulic motor, the hydraulic fluid from the pump causes the hydraulic motor to, e.g., rotate and drive an attached load.

Typically, the inertia of the hydraulic pump in the above-described industrial applications makes it impractical to vary the speed of the hydraulic pump to precisely control the flow in the system. That is, the prior art pumps in such industrial machines are not very responsive to changes in flow demand. Thus, to control the flow in the system, flow control devices such as a variable-displacement hydraulic pump and/or a directional flow control valve are added to the system and the hydraulic pump is run at a constant speed to ensure that an adequate pressure is always maintained to the flow control devices. The hydraulic pump can be run at full speed or at some other constant speed that ensures that the system always has the required pressure for the flow control devices in the system. However, running the hydraulic pump at full speed or at some other constant speed is inefficient as it does not take into account the true energy input requirements of the system. For example, the pump will run at full speed even when the system load is only at 50%. In addition, the flow control devices in these systems typically use hydraulic controls to operate, which can be relatively complex and require additional hydraulic fluid to function.

Because of the complexity of the hydraulic circuits and controls, these hydraulic systems are typically open-loop in that the pump draws the hydraulic fluid from a large fluid reservoir and the hydraulic fluid is sent back to the reservoir after performing work on the hydraulic actuator and after being used in the hydraulic controls. That is, the hydraulic fluid output from the hydraulic actuator and the hydraulic controls is not sent directly to the inlet of the pump as in a closed-loop system. An open-loop system with a large fluid reservoir is needed in these systems to maintain the temperature of the hydraulic fluid to a reasonable level and to ensure that there is an adequate supply of hydraulic fluid for the pump to prevent cavitation and for operating the various hydraulically-controlled components. While closed-loop circuits are known, these tend to be for simple systems where the risk of pump cavitation is minimal. In open-loop systems, however, the various components are often located spaced apart from one another. To interconnect these parts, various additional components like connecting shafts, hoses, pipes, and/or fittings are used in a complicated manner and thus susceptible to contamination. Moreover, these components are susceptible to damage or degradation in harsh working environments, thereby causing increased machine downtime and reduced reliability of the machine. Thus, known systems have undesirable drawbacks with respect to complexity and reliability of the systems.

Applicant's co-pending International Application No. PCT/US2015/050589, filed Sep. 17, 2015, ("the '589 application") discloses control of a variable speed and/or a variable torque pump with two fluid drivers and at least one proportional control valve in a fluid system. The '589 application discloses an inventive system in which the operation of the pump and the at least one proportional control valve is coordinated to provide for faster and more precise control of the fluid flow and/or the pressure in the fluid system than that found in conventional systems. The '589 application, however, does not disclose a control scheme in which a pump control circuit, having at least one of a pressure control module and a flow control module, positions the pump gears to even more precisely control the flow and pressure.

Further limitation and disadvantages of conventional, traditional, and proposed approaches will become apparent to one skilled in the art, through comparison of such approaches with embodiments of the present invention as set forth in the remainder of the present disclosure with reference to the drawings.

SUMMARY OF THE INVENTION

Preferred embodiments of the present invention provide for faster and more precise control of the fluid flow and/or pressure in systems that use a variable-speed and/or a variable-torque pump. The fluid pumping system and method of control thereof discussed below are particularly advantageous in a closed-loop type system since the faster and more precise control of the fluid flow and/or the pressure in such systems can mean smaller accumulator sizes and a reduced risk of pump cavitation than in conventional systems. In an exemplary embodiment, a fluid system includes a variable-speed and/or a variable-torque pump, at least one proportional control valve assembly, an actuator that is operated by the fluid to control a load, and a controller to concurrently establish a speed and/or torque of the pump and an opening of the at least one proportional control valve assembly. The pump includes at least two fluid drivers that provide fluid to the actuator, which can be, e.g., a fluid-actuated cylinder, a fluid-driven motor or another type of fluid-driven actuator that controls a load (e.g., a boom of an excavator, a load attached to a hydrostatic transmission, or some other equipment or device that can be operated by an actuator). As used herein, "fluid" means a liquid or a mixture of liquid and gas containing mostly liquid with respect to volume. Each fluid driver includes a prime mover and a fluid displacement assembly. The fluid displacement assembly can be driven by the respective prime mover such that fluid is transferred from the inlet port to the outlet port of the pump. In some embodiments, a proportional control valve assembly is disposed between the pump outlet and an inlet port of the actuator. The proportional control valve assembly can include a proportional control valve and a valve actuator. In some embodiments, the proportional control valve assembly is disposed between an outlet port of the actuator and the pump inlet. In other embodiments, the system includes two proportional control valve assemblies with one valve assembly disposed between the pump outlet and actuator inlet port and the other valve assembly disposed between the actuator outlet port and the pump inlet. The controller concurrently establishes a speed and/or a torque of the prime movers and an opening of at least one proportional control valve so as to control a flow and/or a pressure in the fluid system.

In some embodiments, the pump includes two fluid divers with each fluid driver including a prime mover and a fluid displacement assembly, which includes a fluid displacement member. The fluid displacement member in each fluid driver is independently driven by the respective prime mover to transfer fluid from an inlet of the pump to an outlet of the pump. Depending on the design of the fluid displacement assembly, the displacement member can work in combination with a fixed element, e.g., pump wall, crescent, or another similar component, when transferring the fluid. Each fluid displacement member has at least one of a plurality of projections and a plurality of indents. That is, each fluid driver can be, e.g., an internal or external gear with gear teeth, a hub (e.g. a disk, cylinder, or other similar component) with projections (e.g. bumps, extensions, bulges, protrusions, other similar structures or combinations thereof), a hub (e.g. a disk, cylinder, or other similar component) with indents (e.g., cavities, depressions, voids or similar structures), a gear body with lobes, or other similar structures that can displace fluid when driven. The configuration of the fluid drivers in the pump need not be identical. For example, one fluid driver can be configured as an external gear-type fluid driver and another fluid driver can be configured as an internal gear-type fluid driver. The fluid drivers are independently operated, e.g., by an electric motor, a hydraulic motor or other fluid-driven motor, an internal-combustion, gas or other type of engine, or other similar device that can independently operate its fluid displacement member. "Independently operate," "independently operated," "independently drive" and "independently driven" means each fluid displacement member, e.g., a gear, is operated/driven by its own prime mover, e.g., an electric motor, in a one-to-one configuration. However, the fluid drivers are operated by a controller such that contact between the fluid drivers is synchronized, e.g., in order to pump the fluid and/or seal a reverse flow path. That is, along with concurrently establishing the speed and/or torque of the prime mover and an opening of a proportional control valve in at least one proportional control valve assembly, operation of the independently operated fluid drivers is synchronized by the controller such that the fluid displacement member in each fluid driver makes synchronized contact with another fluid displacement member. The contact can include at least one contact point, contact line, or contact area. Preferably, a controller establishes a position of at least one of a protrusion and an indent on a first fluid driver relative to a position of at least one of a protrusion and an indent on a second fluid driver so as to create contact between the first fluid driver and the second fluid driver to seal a fluid path from the outlet of the pump to the inlet of the pump.

Another exemplary embodiment includes a system that has a hydraulic pump, at least one proportional control valve assembly, and a controller. The hydraulic pump provides hydraulic fluid to a hydraulic actuator. In some embodiments, the hydraulic actuator is a hydraulic cylinder and in other embodiments the hydraulic actuator is a hydraulic motor. Of course, the present invention is not limited to just these examples and other types of hydraulic actuators that operate a load can be used. The hydraulic pump includes at least two motors with each motor driving a gear assembly. The gear assemblies are driven such that fluid is transferred from the inlet of the pump to the outlet of the pump.

Each proportional control valve assembly includes a proportional control valve and a valve actuator to operate the proportional control valve. In some embodiments, a proportional control valve is disposed between the pump outlet and the hydraulic actuator inlet. In some embodiments, the proportional control valve is disposed between the hydraulic actuator outlet and the pump inlet. In still other embodiments, the hydraulic system can include two proportional control valves. In this embodiment, one of the proportional control valves can be disposed between the pump outlet and the hydraulic actuator inlet, and the other proportional control valve can be disposed between the hydraulic actuator outlet and the pump inlet. In some embodiments, the control valve can be a ball-type control valve. In some embodiments, the fluid-driven actuator assembly can include a sensor array that measures various system parameters such as, for example, flow, pressure, temperature or some other system parameter. The sensor array can be disposed in the proportional control valve assembly in some exemplary embodiments. In some embodiments, the actuator of the control valve can be a servomotor. In some embodiments, the servomotor includes an encoder that provides feedback on the position of the valve.

The controller concurrently establishes a speed and/or a torque of the prime mover of each fluid driver and an opening of each proportional control valve so as to control a flow and/or a pressure in the fluid system to an operational setpoint. Thus, unlike a conventional fluid system, the pump is not run at a constant speed while a separate flow control device (e.g., directional flow control valve) independently controls the flow and/or pressure in the system. Instead, in exemplary embodiments of the present disclosure, the pump speed and/or torque is controlled concurrently with the opening of each proportional control valve. The fluid-driven actuator system and method of control thereof of the present disclosure are particularly advantageous in a closed-loop type system since the system and method of control provides for a more compact configuration without increasing the risk of pump cavitation or high fluid temperatures as in conventional systems. Thus, in some embodiments of the fluid-driven actuator assembly, the fluid-driven actuator and the at least one pump assembly form a closed-loop system.

In some embodiments, the fluid system includes a fluid-driven actuator assembly in which the fluid-driven actuator is conjoined with the at least one pump assembly. "Conjoined with" means that the devices are fixedly connected or attached so as to form one integrated unit or module. In some exemplary embodiments, at least one shaft of a fluid driver, e.g., a shaft of the prime mover and/or a shaft of the fluid displacement member and/or a common shaft of the prime mover/fluid displacement member (depending on the configuration of the pump), is of a flow-through configuration and has a through-passage that permits fluid communication between at least one of the input port and the output port of the pump and the at least one fluid storage device. In some exemplary embodiments, the casing of the pump includes at least one balancing plate with a protruding portion to align the fluid drivers with respect to each other. In some embodiments the protruding portion or another portion of the pump casing has cooling grooves to direct a portion of the fluid being pumped to bearings disposed between the fluid driver and the protruding portion or to another portion of the fluid driver.

In some embodiments, the fluid-driven actuator can include two or more pump assemblies that can be arranged in a parallel-flow configuration to provide a greater flow capacity to the system when compared to a single pump assembly system. The parallel-flow configuration can also provide a means for peak supplemental flow capability and/or to provide emergency backup operations. In some embodiments, the two or more pump assemblies can be arranged in a serial-flow configuration to provide a greater pressure capacity to the system when compared to a single pump assembly system.

An exemplary embodiment of the present disclosure includes a method that provides for precise control of the fluid flow and/or pressure in a fluid-driven actuator system by concurrently controlling at least one variable-speed and/or a variable-torque pump and at least one proportional control valve to control a load. The fluid system includes a fluid-driven actuator assembly having at least one fluid pump assembly and a fluid-driven actuator. In some embodiments, the fluid-driven actuator is conjoined with the at least one pump assembly. The method includes controlling a load using a fluid-driven actuator which is controlled by at least one pump assembly that includes a fluid pump and at least one proportional control valve assembly. In some embodiments, the method includes providing excess fluid from the fluid-driven actuator system to at least one storage device for storing fluid, and transferring fluid from the storage device to the fluid-driven actuator system when needed by the fluid-driven actuator system. The method further includes establishing at least one of a flow and a pressure in the system to maintain an operational set point for controlling the load. The at least one of a flow and a pressure is established by controlling a speed and/or torque of the pump and concurrently controlling an opening of the at least one proportional control valve to adjust the flow and/or the pressure in the system to the operational set point. The method includes establishing a position of at least one of a protrusion and an indent on a displacement assembly of a first fluid driver of the fluid pump relative to a position of at least one of a protrusion and an indent on a displacement assembly of a second fluid driver of the fluid pump so as to create contact between the first displacement assembly and the second displacement assembly to seal a fluid path from the outlet of the fluid pump to the inlet of the fluid pump. In some embodiments of the fluid-driven actuator assembly and the at least one pump assembly form a closed-loop fluid system. In some embodiments, the system is a hydraulic system and the preferred fluid-driven actuator is a hydraulic cylinder. In addition, in some exemplary embodiments, the pump is a hydraulic pump and the proportional control valves are ball valves.

The summary of the invention is provided as a general introduction to some embodiments of the invention, and is not intended to be limiting to any particular fluid-driven actuator assembly or controller system configuration. It is to be understood that various features and configurations of features described in the Summary can be combined in any suitable way to form any number of embodiments of the invention. Some additional example embodiments including variations and alternative configurations are provided herein.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the exemplary embodiments of the invention.

FIGS. 15 and 15A show cross-sectional views of preferred embodiments of a fluid-driven actuator assembly with two pump assemblies.

FIGS. 17, 17A and 17B show side views of preferred embodiments of a fluid-driven actuator assembly with two pump assemblies.

DETAILED DESCRIPTION OF THE PREFERRED EMBODIMENTS

Figure 1:
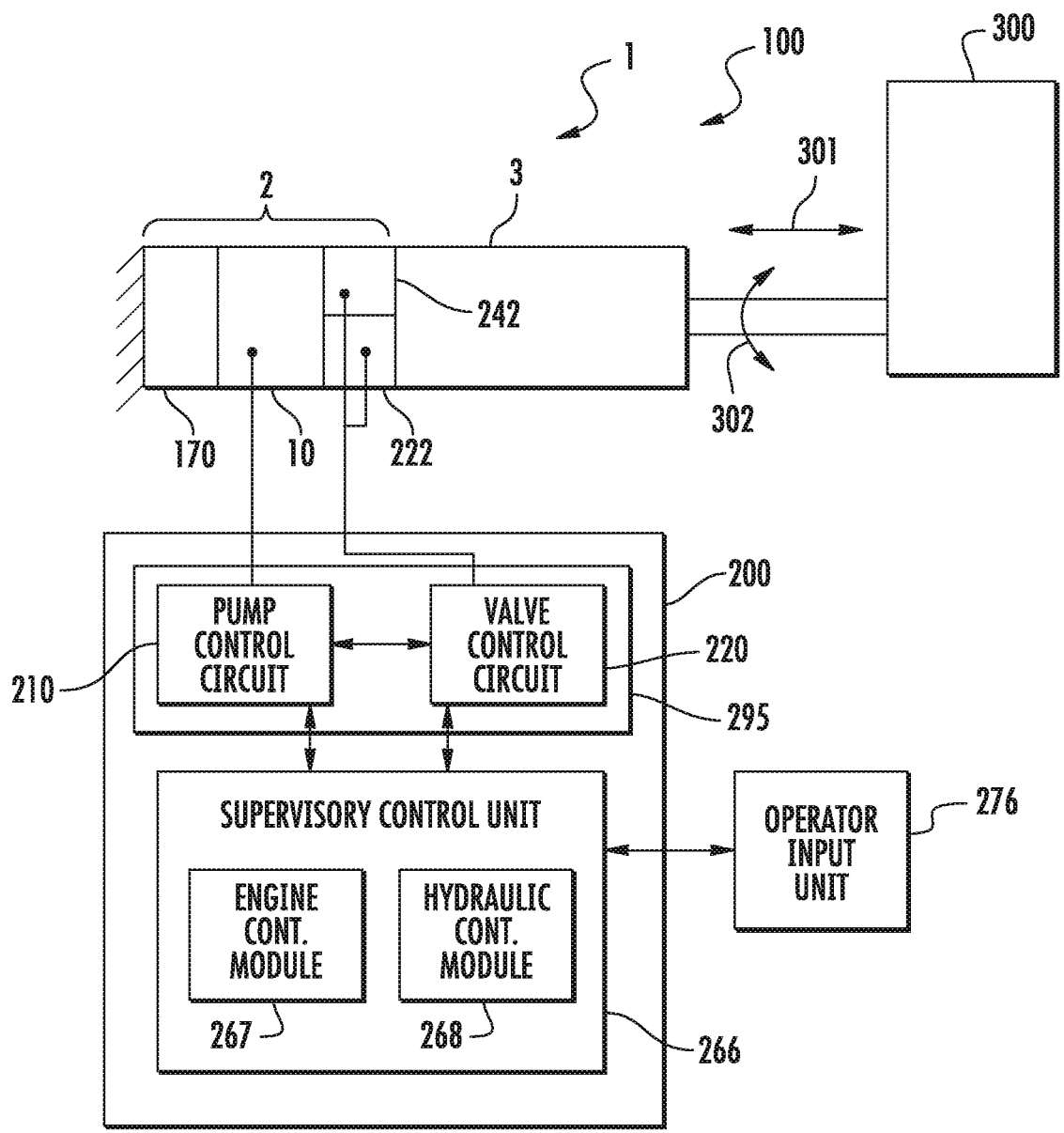
FIG. 1 is a block diagram of fluid-driven actuator system with a preferred embodiment of a fluid-driven actuator assembly and control system.

Exemplary embodiments are directed to a fluid system that includes a fluid-driven actuator assembly and a control system to operate a load. In some embodiments, the fluid-driven actuator assembly includes a fluid-driven actuator and at least one pump assembly conjoined with the fluid-driven actuator to provide fluid to operate the fluid-driven actuator. The pump assembly, which can be integrated in some embodiments, includes a pump with at least one fluid driver comprising a prime mover and a fluid displacement assembly to be driven by the prime mover such that fluid is transferred from a first port of the pump to a second port of the pump. The pump assembly also includes at least one proportional control valve assembly. In addition, in some embodiments, at least one of the pump assembly and the fluid-driven actuator can include lock valves to isolate the respective devices from the system. The fluid system also includes a controller that establishes at least one of a speed and a torque of the at least one prime mover and concurrently establishes an opening of the at least one proportional control valve assembly to adjust at least one of a flow and a pressure in the fluid-driven actuator system to an operational set point. The fluid-driven actuator system can include sensor assemblies to measure system parameters such as pressure, temperature and/or flow. When the fluid-driven actuator assembly contains more than one pump assembly, the pump assemblies can be connected in a parallel or serial configuration depending on, e.g., the requirements of the system. In some embodiments, the at least one proportional control valve assembly can be disposed separately from the at least one pump assembly, i.e., the control valve assemblies are not integrated into the pump assembly.

In some embodiments, the pump includes at least one prime mover that is disposed internal to the fluid displacement member. In other exemplary embodiments of the fluid delivery system, at least one prime mover is disposed external to the fluid displacement member but still inside the pump casing, and in still further exemplary embodiments, at least one prime mover is disposed outside the pump casing. In some exemplary embodiments, the pump includes at least two fluid drivers with each fluid driver including a prime mover and a fluid displacement member. The fluid displacement members are independently driven by the respective prime movers so as to synchronize contact between the respective fluid displacement members (drive-drive configuration). In some embodiments, the synchronized contact provides a slip coefficient in a range of 5% or less.

In some exemplary embodiments, at least one shaft of a fluid driver, e.g., a shaft of the prime mover and/or a shaft of the fluid displacement member and/or a common shaft of the prime mover/fluid displacement member (depending on the configuration of the pump), is a flow-through shaft that includes a through-passage configuration which allows fluid communication between at least one port of the pump and at least one fluid storage device. In some exemplary embodiments, the at least one fluid storage device is conjoined with the pump assembly to provide for a more compact fluid-driven actuator assembly.

The exemplary embodiments of the fluid system, including the fluid-driven actuator assembly and control system, will be described using embodiments in which the pump is an external gear pump with two fluid drivers, the prime mover is an electric motor, and the fluid displacement member is an external spur gear with gear teeth. However, those skilled in the art will readily recognize that the concepts, functions, and features described below with respect to the electric-motor driven external gear pump can be readily adapted to external gear pumps with other gear configurations (helical gears, herringbone gears, or other gear teeth configurations that can be adapted to drive fluid), internal gear pumps with various gear configurations, to pumps with more than two fluid drivers, to prime movers other than electric motors, e.g., hydraulic motors or other fluid-driven motors, internal-combustion, gas or other type of engines or other similar devices that can drive a fluid displacement member, to pumps with more than two fluid displacement members, and to fluid displacement members other than an external gear with gear teeth, e.g., internal gear with gear teeth, a hub (e.g. a disk, cylinder, or other similar component) with projections (e.g. bumps, extensions, bulges, protrusions, other similar structures, or combinations thereof), a hub (e.g. a disk, cylinder, or other similar component) with indents (e.g., cavities, depressions, voids or similar structures), a gear body with lobes, or other similar structures that can displace fluid when driven.

FIG. 1 shows an exemplary block diagram of a fluid system 100. The fluid system 100 includes a fluid-driven actuator assembly 1 that operates a load 300. As discussed in more detail below, the fluid-driven actuator assembly 1 includes a fluid-driven actuator 3, which can be, e.g., a hydraulic cylinder, a hydraulic motor or another type of fluid driven actuator that performs work on an external load, and a pump assembly 2. When the fluid-driven actuator is a linear actuator, such as a hydraulic cylinder, the load 300 can be moved in, e.g., the direction 301. If the fluid-driven actuator is a rotary actuator, such as a hydraulic motor, the load 300 can be rotated in, e.g., the direction 302. The pump assembly 2 includes pump 10, proportional control valve assemblies 222 and 242 and storage device 170. The hydraulic actuator 3 is operated by fluid from pump 10, which is controlled by a controller 200. The controller 200 includes a drive unit 295 having a pump control circuit 210 that controls pump 10 and a valve control circuit 220 that controls proportional control valve assemblies 222 and 242. As discussed below in more detail, the drive unit 295 with the pump control circuit 210 and the valve control circuit 220 include hardware and/or software that interpret process feedback signals and/or command signals, e.g., flow and/or pressure setpoints, from a supervisory control unit 266 and/or a user via input unit 276 and send the appropriate demand signals to the pump 10 and the control valve assemblies 222, 242 to position the load 300. For brevity, description of the exemplary embodiments are given with respect to a hydraulic fluid system with a hydraulic pump and a hydraulic actuator. However, the inventive features of the present disclosure are applicable to fluid systems other than hydraulic systems. In addition, the fluid-driven actuator assembly 1 of the present disclosure is applicable to various types of hydraulic actuators, which can include hydraulic cylinders and hydraulic motors. Such hydraulic cylinders can include, but are not limited to, single or double acting telescopic cylinders, plunger cylinders, differential cylinders, and position-sensing smart hydraulic cylinders. A detailed description of the components in the fluid-driven actuator assembly 1 and the control of the fluid-driven actuator assembly 1 is given below.

Figure 2:
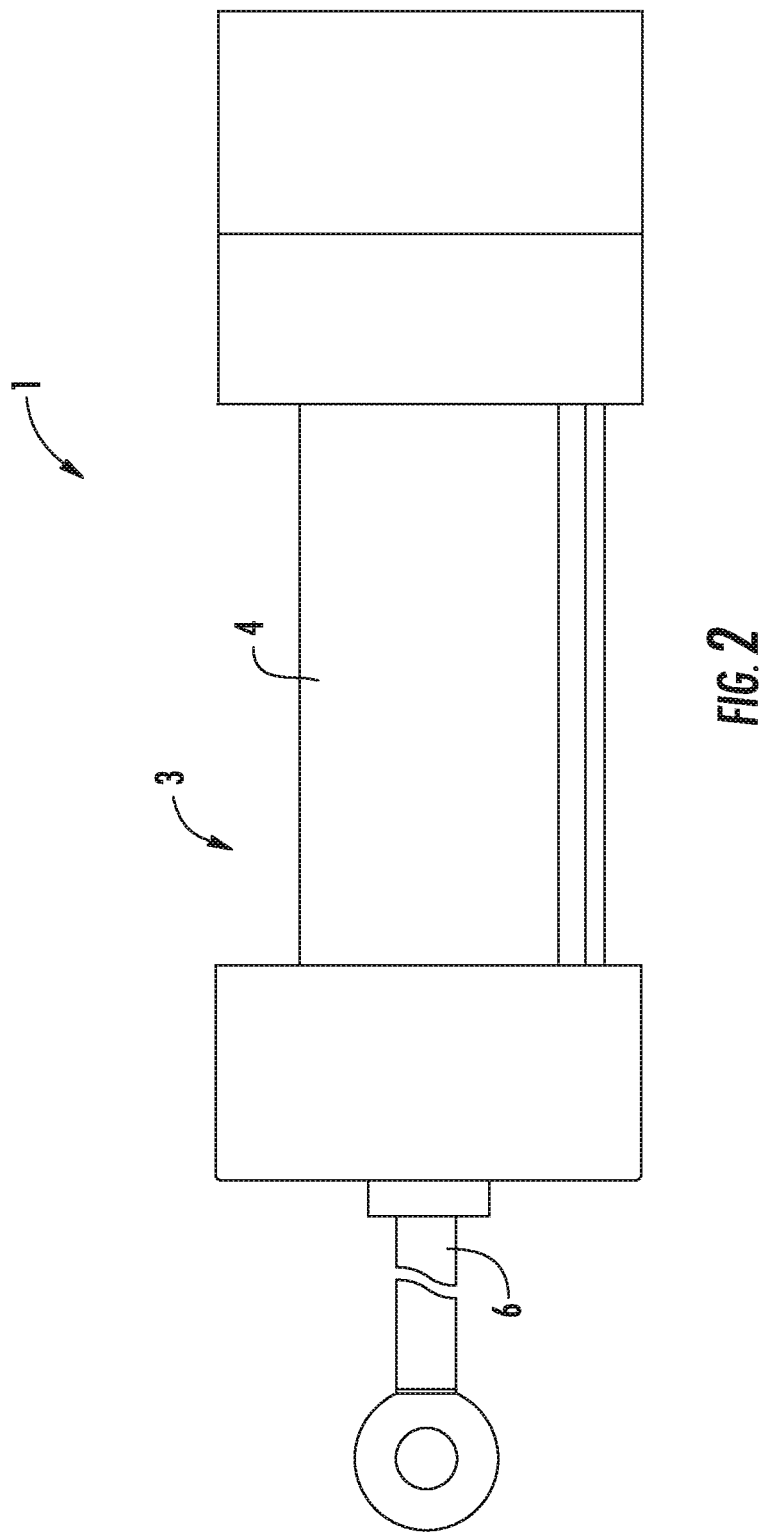
FIG. 2 is a side view of a preferred embodiment of a linear actuator assembly.
Figure 2A:
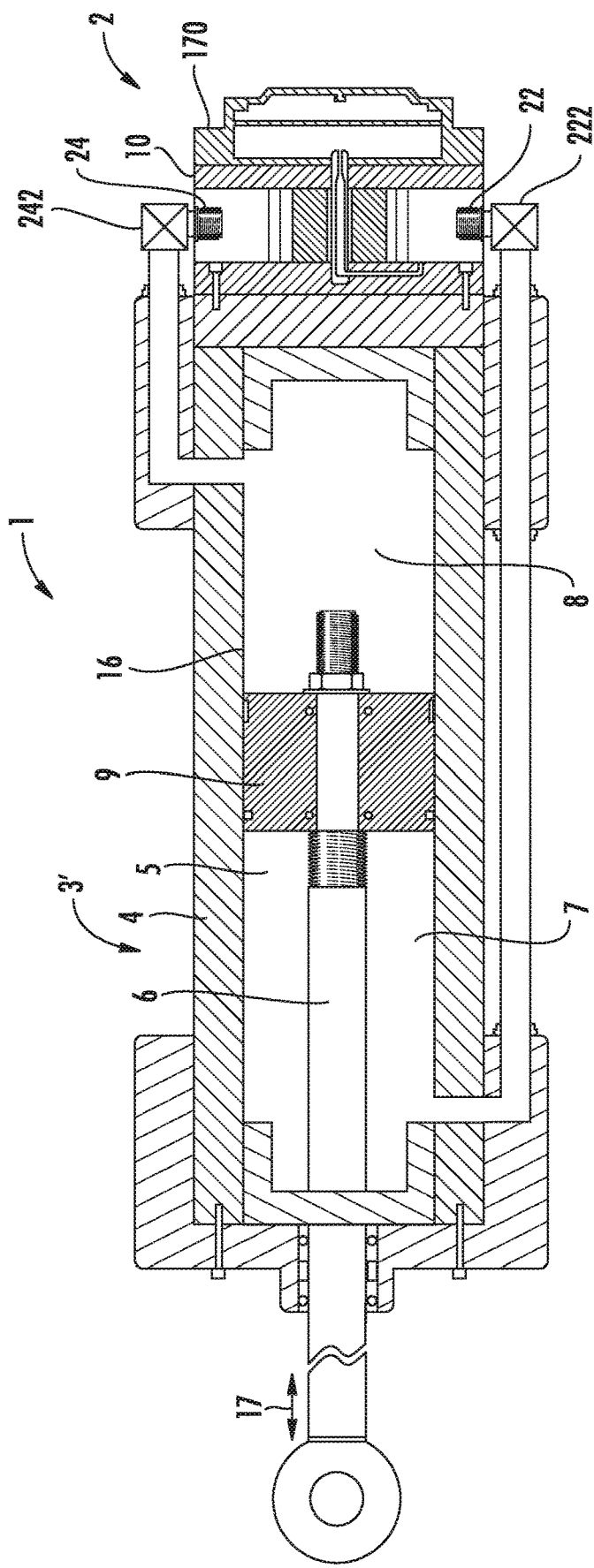
FIG. 2A shows a side cross-sectional view of the linear actuator assembly of FIG. 2.

FIG. 2 shows a preferred embodiment of the fluid-driven actuator assembly 1 when the hydraulic actuator is a hydraulic cylinder 3'. FIG. 2A shows a cross-sectional view of the fluid-driven actuator assembly 1. With reference to FIGS. 2 and 2A, the fluid-driven actuator assembly 1 includes a fluid-driven actuator, which can be, e.g., a hydraulic cylinder 3', and a fluid delivery system, which can be, e.g., a hydraulic pump assembly 2. The pump assembly 2 can include a pump 10 and proportional control valve assemblies 222 and 242. The pump 10 and valve assemblies 222, 242 control the flow and/or pressure to the hydraulic cylinder 3'. In addition, the pump assembly 2 and/or hydraulic cylinder 3' can include valves (not shown) that isolate the respective devices from the system. In some embodiments, the control valve assemblies 222 and 242 can be part of the hydraulic cylinder 3'.

The hydraulic cylinder 3' includes a cylinder housing 4, a piston 9, and a piston rod 6. The cylinder housing 4 defines an actuator chamber 5 therein, in which the piston 9 and the piston rod 6 are movably disposed. The piston 9 is fixedly attached to the piston rod 6 on one end of the piston rod 6 in the actuator chamber 5. The piston 9 can slide in either direction along the interior wall 16 of the cylinder housing 4 in either direction 17. The piston 9 defines two sub-chambers, a retraction chamber 7 and an extraction chamber 8, within the actuator chamber 5. A port 22 of the pump 10 is in fluid communication with the retraction chamber 7 via proportional control valve assembly 222, and a port 24 of the pump 10 is in fluid communication with the extraction chamber 8 via proportional control valve assembly 242. The fluid passages between hydraulic cylinder 3', pump 10, and proportional control valve assemblies 222 and 242 can be either internal or external depending on the configuration of the fluid-driven actuator assembly 1. As the piston 9 and the piston rod 6 slide either to the left or to the right due to operation of the pump 10 and control valve assemblies 222, 242, the respective volumes of the retraction and extraction chambers 7, 8 change. For example, as the piston 9 and the piston rod 6 slide to the right, the volume of the retraction chamber 7 expands whereas the volume of the extraction chamber 8 shrinks. Conversely, as the piston 9 and the piston rod 6 slide to the left, the volume of the retraction chamber 7 shrinks whereas the volume of the extraction chamber 8 expands. The respective change in the volume of the retraction and extraction chambers 7, 8 need not be the same. For example, the change in volume of the extraction chamber 8 may be greater than the corresponding change in volume of the retraction chamber 7 and, in such cases, the fluid-driven actuator assembly and/or the hydraulic system may need to account for the difference. Thus, in some exemplary embodiments, the pump assembly 2 can include a storage device 170 to store and release the hydraulic fluid as needed. The storage device 170 can also storage and release hydraulic fluid when the fluid density and thus the fluid volume changes due to, e.g., a change in the temperature of the fluid (or a change in the fluid volume for some other reason). Further, the storage device 170 can also serve to absorb hydraulic shocks in the system due to operation of the pump 10 and/or valve assemblies 222, 242.

In some embodiments, the pump assembly 2, including proportional control valve assemblies 222 and 242 and storage device 170, can be conjoined with the hydraulic cylinder assembly 3', e.g., by the use of screws, bolts or some other fastening means, thereby space occupied by the fluid-driven actuator assembly 1 is reduced. Thus, as seen in FIGS. 2 and 2A, in some exemplary embodiments, the fluid-driven actuator assembly 1 of the present disclosure has an integrated configuration that provides for a compact design. However, in other embodiments, one or all of the components in the fluid-driven actuator assembly 1, i.e., the hydraulic pump 10, the hydraulic cylinder 3' and the control valve assemblies 222 and 242, can be disposed separately and operatively connected without using an integrated configuration. For example, just the pump 10 and control valves 222, 242 can be conjoined or any other combination of devices.

Figure 3:
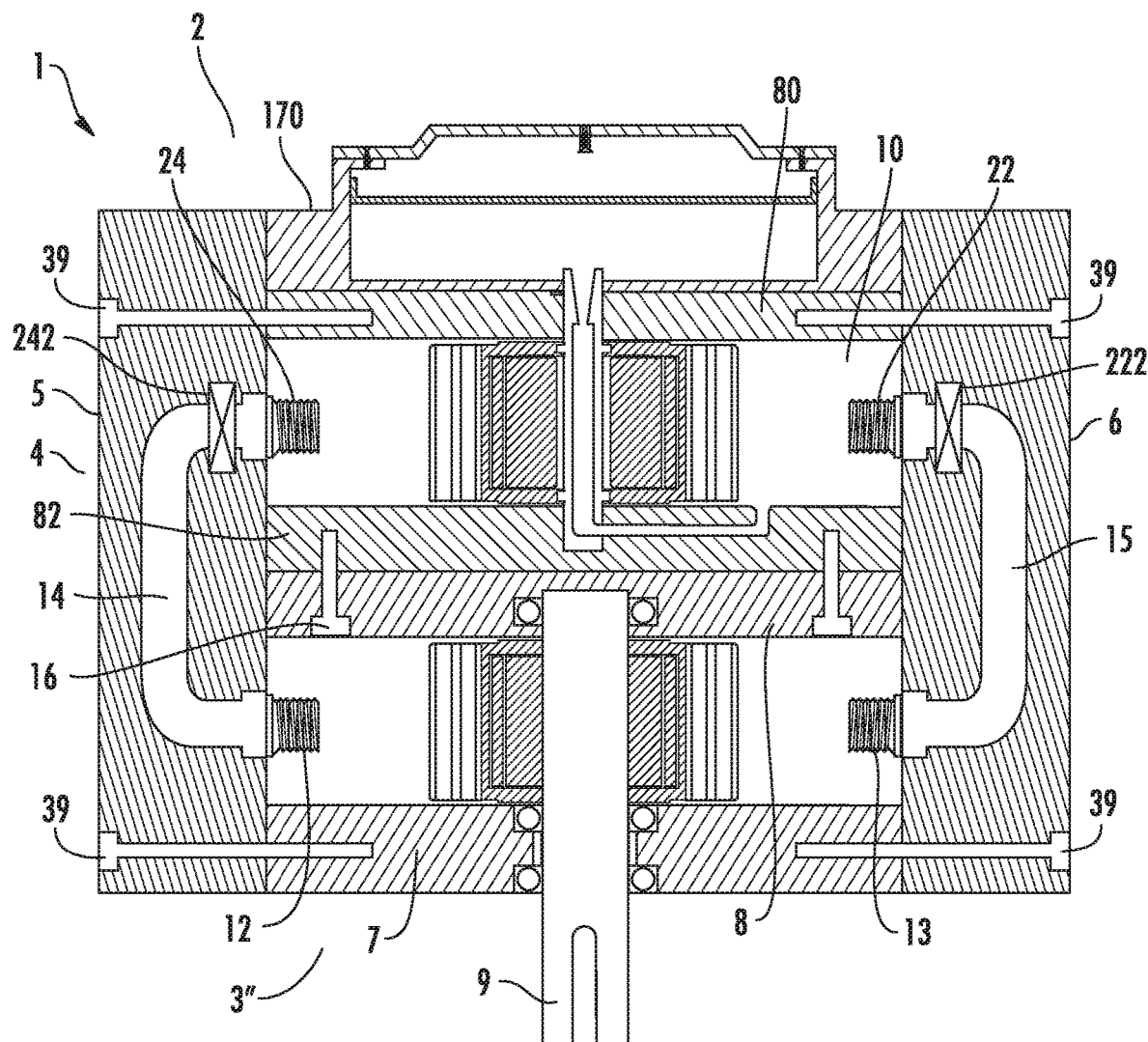
FIG. 3 is a side view of a preferred embodiment of a hydrostatic transmission assembly.

FIG. 3 shows a side cross-sectional view of a preferred embodiment of the fluid-driven actuator assembly 3 when configured as a hydrostatic transmission assembly. The hydrostatic transmission assembly includes a hydraulic pump assembly 2 conjoined with a hydraulic motor 3". The pump assembly 2 can include valve assemblies 222 and 242 and storage device 170. The pump assembly 2 and the hydraulic motor 3" can be attach to a transmission casing 4. The transmission casing 4 has casings 5 and 6. The pump assembly 2 and the hydraulic motor 3" are disposed in the transmission casing 4. The hydraulic motor 3" is driven by a hydraulic pump 10, which will be described in detail later. The hydraulic motor 3" has a motor casing 11 (shown in FIG. 3A) that includes a bottom plate 7 and a top plate 8. The motor casing 11 has a port 12 and a port 13. Internal surfaces of the top and bottom plates 8, 7 define an interior volume of the hydraulic motor 3". The bottom plate 7 is conjoined with the transmission casing 4. Specifically, in the embodiment shown in FIG. 3, the bottom plate 7 is conjoined with the casings 5, 6 through a plurality of bolts 39. The hydraulic motor 3" includes an output shaft 9 extending through the bottom plate 7. The output shaft 9 may be coupled to an external load, e.g. an excavator, to which power generated by the hydrostatic transmission assembly 1 is to be transmitted.

On the top side of the hydraulic motor 3" is disposed the pump assembly 2. The pump assembly 2 includes an external gear pump 10, valve assemblies 222 and 242 and a storage device 170. In some embodiments, the valve assemblies may be disposed separately from the pump assembly, e.g., as part of hydraulic motor 3" or hydraulic motor 3" can have an additional set of valve assemblies. The pump assembly 2, along with valve assemblies 222 and 242, is conjoined with the transmission casing 4. Specifically, in the embodiment shown in FIG. 3, the end plate 80 is conjoined with the casings 5, 6 through a plurality of bolts 39. The lower plate 82 is conjoined with the top plate 8 of the motor casing 11 through a plurality of bolts 16. The pump casing 20 has a port 22 and a port 24. The transmission casing 4 includes conduits therein, through which fluid can be communicated between the hydraulic pump 10 and the hydraulic motor 3". The pump outlet 24 is in fluid communication with the port 12 of the hydraulic motor 3" via the valve assembly 242 through a first u-shaped conduit 14 in the upper casing 5. The port 22 is in fluid communication with the port 13 of the hydraulic motor 3" via the valve assembly 222 through a second u-shaped conduit 15 in the lower casing 6. In the illustrated embodiment, the pump 10 is an external gear pump. However, as discussed below the present disclosure is not limited to an external gear pump. The fluid passages between hydraulic motor 3", pump assembly 2, and valve assemblies 222 and 242 can be either internal or external depending on the configuration of the hydrostatic transmission assembly.

Figure 3A:
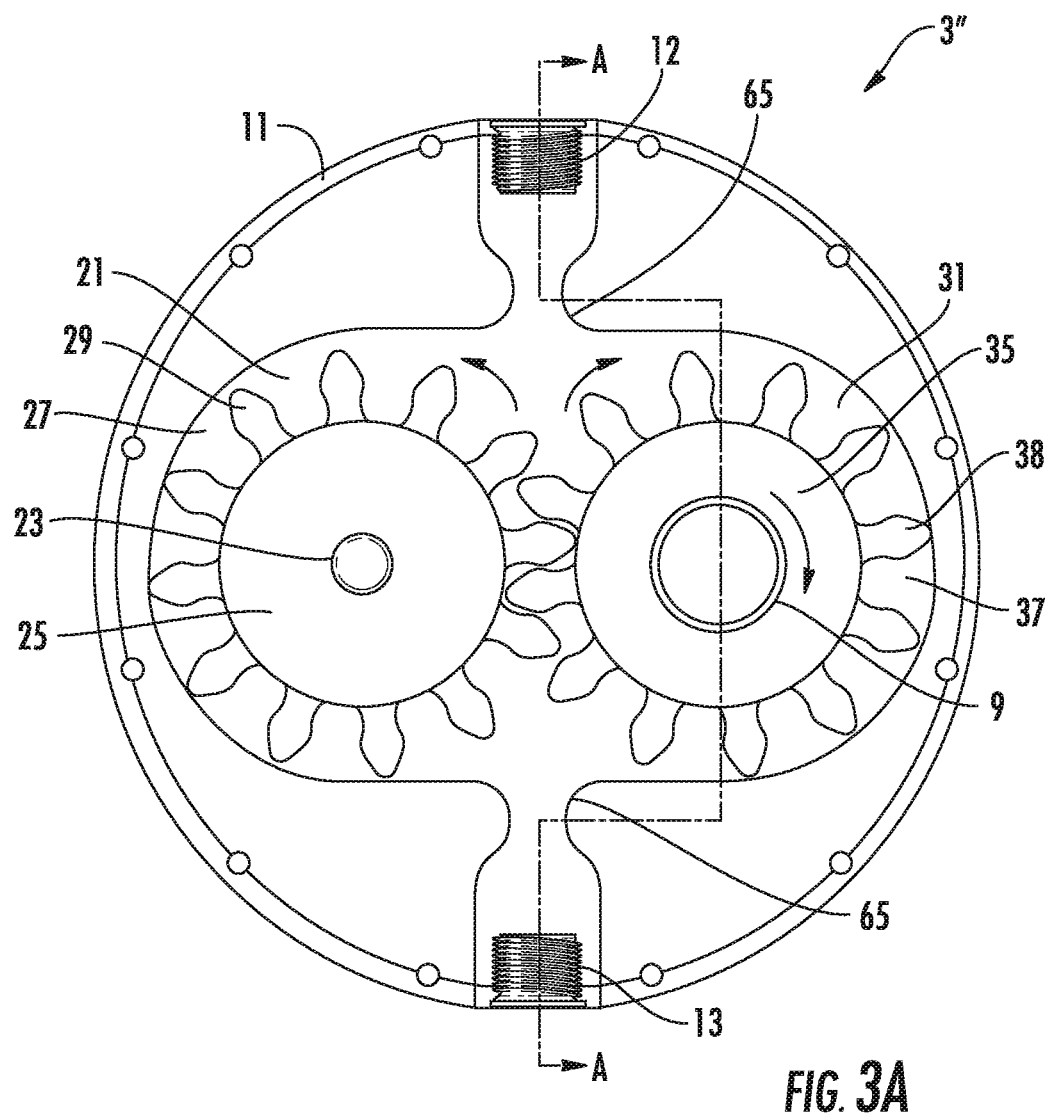
FIGS. 3A and 3B show cross-sectional views of the hydraulic motor of the hydrostatic transmission assembly of FIG. 3.
Figure 3B:
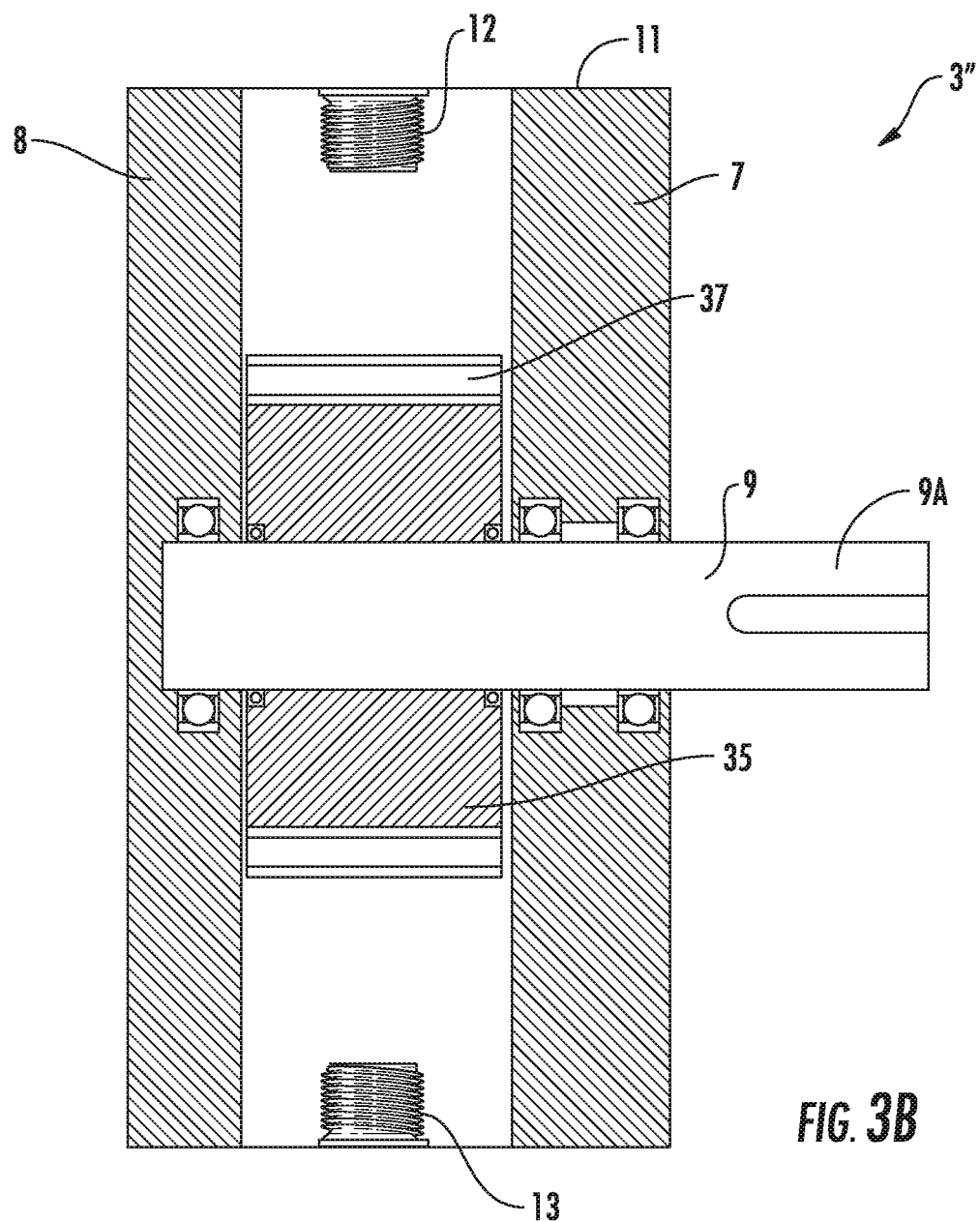

FIGS. 3A and 3B respectively show top and side cross-sectional views of the hydraulic motor 3". In the exemplary embodiment of FIG. 3A, the hydraulic motor 3" is an external gear hydraulic motor. However, the type of hydraulic motor is not limiting and other types of fluid-driven motor configurations can be used. The hydraulic motor 3" includes gear assembly 21 and gear assembly 31. The gear assembly 21 includes a shaft 23, a gear body 25, and a gear 27 having a plurality of gear teeth 29. The shaft 23 is fixedly connected to the gear body 25 such that the gear body 25 is rotatably movable with shaft 23. The gear assembly 31 includes a shaft (or output shaft) 9, a gear body 35, and a gear 37 having a plurality of gear teeth 38. The shaft 9 is fixedly connected to the gear body 25 such that the gear body 35 is rotatably movable with shaft 9. The shaft 9 extends through the plate 7 such that the other end 57 of the shaft 9 is disposed outside the motor casing 11. The end 57 may be coupled to an external device (or an external load), e.g., an excavator, to which power generated by the hydrostatic transmission assembly is to be transmitted. The motor casing 11 may include a neck portion 65 near the ports 12, 13. The neck portion 65 reduces turbulence in the fluid entering and exiting the central area where the gear assemblies 21, 31 are located. Thus, more stabilized fluid enters and exits the central area of the hydraulic motor 3", thereby improving efficiency of the hydraulic system. Depending on desired direction of rotation, high pressure fluid is delivered to the hydraulic motor 3" through either port 12 or 13 by operation of the pump assembly 2, which will be described in detail later. Operation of the hydraulic motor 3" is known to those skilled in the art and thus, for brevity, will not be further discussed.

Figure 4:
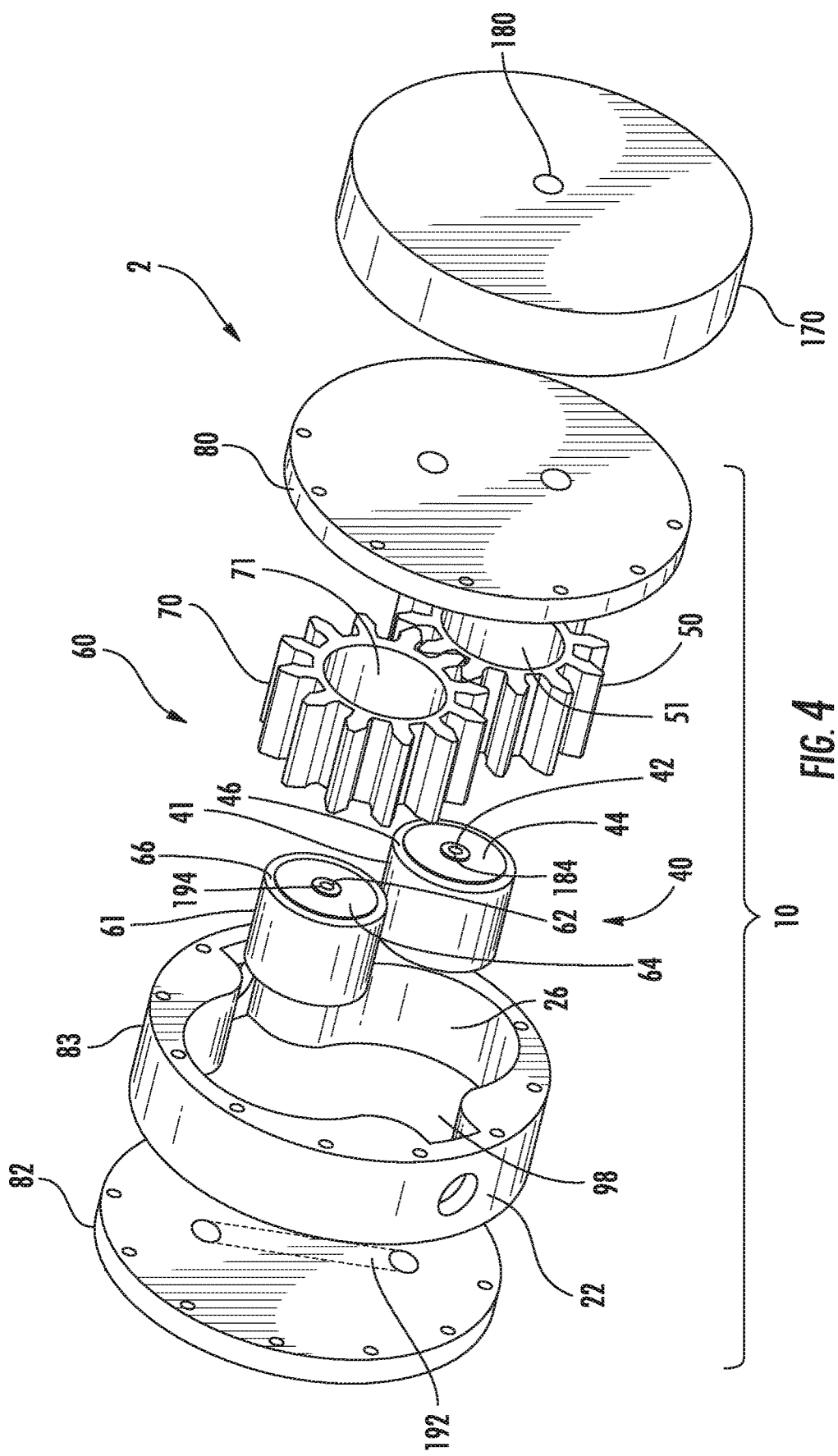
FIG. 4 shows an exploded view of an exemplary embodiment of a pump assembly having an external gear pump and a storage device.

FIG. 4 shows an exploded view of an exemplary embodiment of a pump assembly 2 that can be used in either the linear actuator assembly or the hydrostatic transmission assembly discussed above. The pump assembly 2 includes the pump 10 and the storage device 170. For clarity, the proportional control valve assemblies 222 and 242 are not shown. The configuration and operation of pump 10 and storage device 170 can be found in U.S. Pat. No. 9,228,586 (U.S. application Ser. No. 14/637,064) and co-pending International Application No. PCT/US15/27003, which are incorporated herein by reference in their entirety. Thus, for brevity, a detailed description of the configuration and operation of pump 10 and storage device 170 are omitted except as necessary to describe the present exemplary embodiments. The pump 10 includes two fluid drivers 40, 60 that respectively include prime movers and fluid displacement members. In the illustrated exemplary embodiment of FIG. 4, the prime movers are electric motors 41, 61 and the fluid displacement members are spur gears 50, 70. In this embodiment, both pump motors 41, 61 are disposed inside the cylindrical openings 51, 71 of gears 50, 70 when assembled. However, as discussed below, exemplary embodiments of the present disclosure cover other motor/gear configurations.

As seen in FIG. 4, the pump 10 represents a positive-displacement (or fixed displacement) gear pump. The pair of gears 50, 70 are disposed in the internal volume 98. Each of the gears 50, 70 has a plurality of gear teeth 52, 72 extending radially outward from the respective gear bodies. The gear teeth 52, 72, when rotated by, e.g., electric motors 41, 61, transfer fluid from the inlet to the outlet. The pump 10 can be a variable speed and/or a variable torque pump, i.e., motors 41, 61 are variable speed and/or variable torque and thus rotation of the attached gear 50, 70 can be varied to create various volume flows and pump pressures. In some embodiments, the pump 10 is bi-directional, i.e., motors 41, 61 are bi-directional. Thus, either port 22, 24 can be the inlet port, depending on the direction of rotation of gears 50, 70, and the other port will be the outlet port.

Figure 4A:
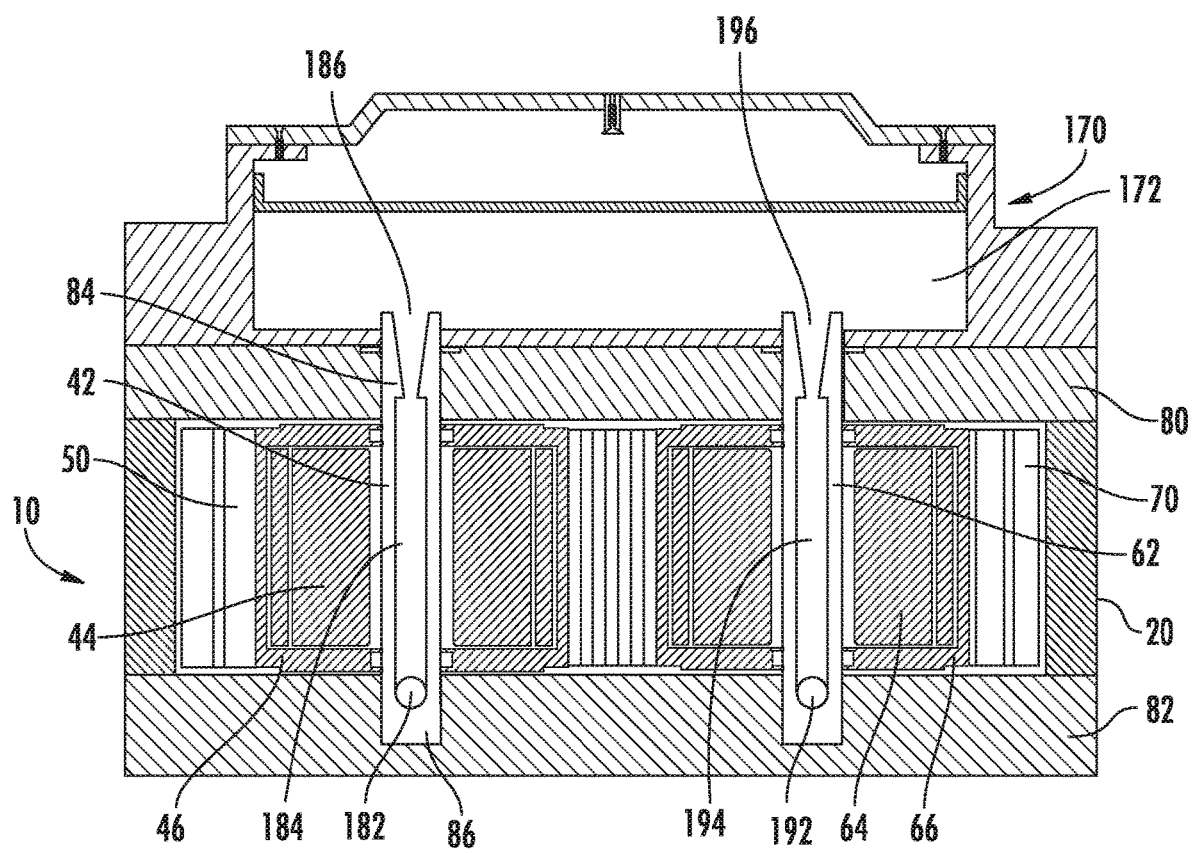
FIG. 4A shows an assembled side cross-sectional view of the exemplary embodiment of the pump assembly of FIG. 4.
Figure 4B:
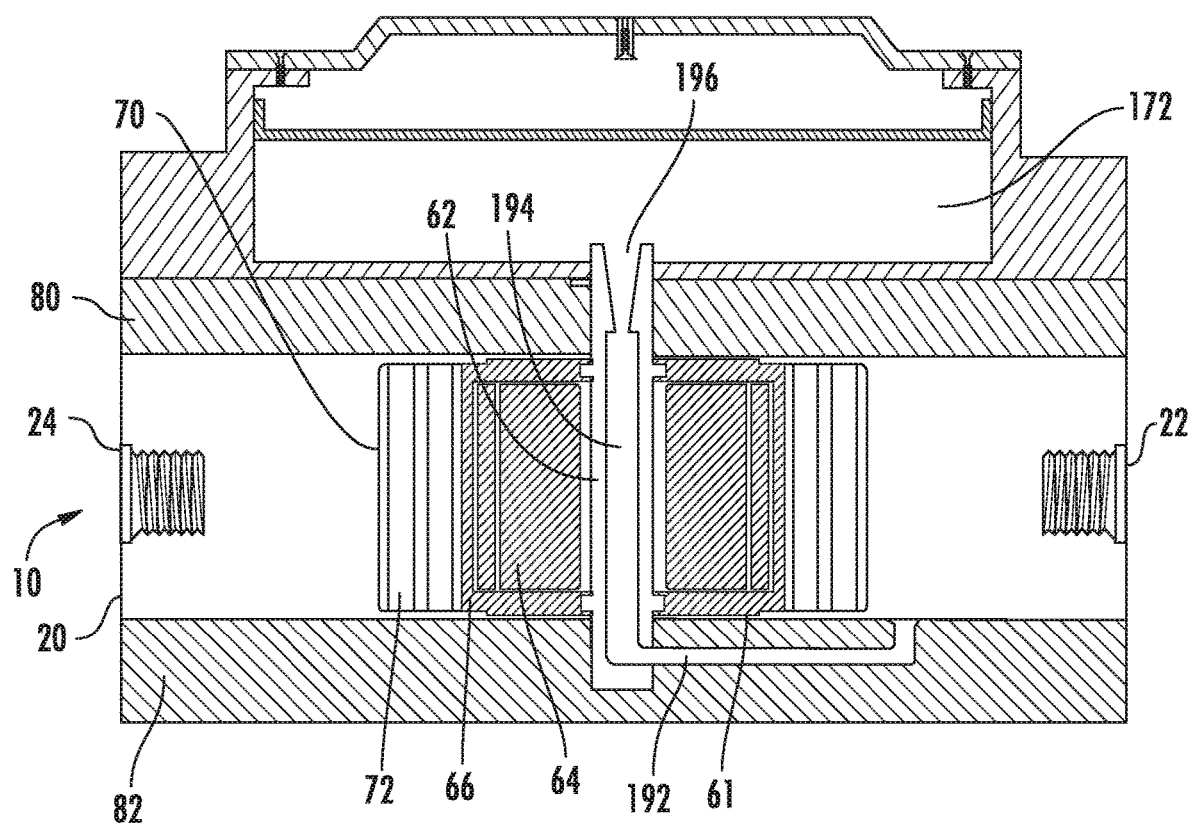
FIG. 4B shows another assembled side cross-sectional view of the exemplary embodiment of FIG. 4.

FIGS. 4A and 4B show different assembled side cross-sectional views of the external gear pump 10 of FIG. 4 but also include the corresponding cross-sectional view of the storage device 170. As seen in FIGS. 4A and 4B, fluid drivers 40, 60 are disposed in the casing 20. The shafts 42, 62 of the fluid drivers 40, 60 are disposed between the port 22 and the port 24 of the casing 20 and are supported by the plate 80 at one end 84 and the plate 82 at the other end 86. In the embodiment of FIGS. 4, 4A and 4B, each of the shafts are flow-through type shafts with each shaft having a through-passage that runs axially through the body of the shafts 42, 62. One end of each shaft connects with an opening of a channel in the end plate 82, and the channel connects to one of the ports 22, 24. For example, FIG. 4 illustrates a channel 192 (dotted line) that extends through the end plate 82. One opening of channel 192 accepts one end of the flow-through shaft 62 while the other end of channel 192 opens to port 22 of the pump 10. The other end of each flow-through shaft 42, 62 extends into the fluid chamber 172 (see FIG. 4A) via openings in end plate 80. The stators 44, 64 of motors 41, 61 are disposed radially between the respective flow-through shafts 42, 62 and the rotors 46, 66. The stators 44, 64 are fixedly connected to the respective flow-through shafts 42, 62, which are fixedly connected to the openings in the casing 20. The rotors 46, 66 are disposed radially outward of the stators 44, 64 and surround the respective stators 44, 64. Thus, the motors 41, 61 in this embodiment are of an outer-rotor motor arrangement (or an external-rotor motor arrangement), which means that that the outside of the motor rotates and the center of the motor is stationary. In contrast, in an internal-rotor motor arrangement, the rotor is attached to a central shaft that rotates.

As shown in FIG. 4, the storage device 170 can be mounted to the pump 10, e.g., on the end plate 80 to form one integrated unit. The storage device 170 can store fluid to be pumped by the pump 10 and supply fluid needed to perform a commanded operation. In some embodiments, the storage device 170 in the pump 10 is a pressurized vessel that stores the fluid for the system. In such embodiments, the storage device 170 is pressurized to a specified pressure that is appropriate for the system. In an exemplary embodiment, as shown in FIGS. 4A and 4B, the flow-through shafts 42, 62 of fluid drivers 40, 60, respectively, penetrate through openings in the end plate 80 and into the fluid chamber 172 of the pressurized vessel. The flow-through shafts 42, 62 include through-passages 184, 194 that extend through the interior of respective shaft 42, 62. The through-passages 184, 194 have ports 186, 196 such that the through-passages 184, 194 are each in fluid communication with the fluid chamber 172. At the other end of flow-through shafts 42, 62, the through-passages 184, 194 connect to fluid passages 182, 192 (see, e.g., fluid passage 192 for shaft 62 in FIG. 4) that extend through the end plate 82 and connect to either port 22 or 24 such that the through-passages 184, 194 are in fluid communication with either the port 22 or the port 24. In this way, the fluid chamber 172 is in fluid communication with a port of pump 10. Thus, during operation, if the pressure at the relevant port drops below the pressure in the fluid chamber 172, the pressurized fluid from the storage device 170 is pushed to the appropriate port via passages 184, 194 until the pressures equalize. Conversely, if the pressure at the relevant port goes higher than the pressure of fluid chamber 172, the fluid from the port is pushed to the fluid chamber 172 via through-passages 184, 194.

As the pump 10 operates, there can be pressure spikes at the inlet and outlet ports (e.g., ports 22 and 24) of the pump 10 due to, e.g., operation of hydraulic actuator 3, the load that is being operated by the hydraulic actuator 3, valves that are being operated in the system or for some other reason. These pressure spikes can cause damage to components in the fluid system. In some embodiments, the storage device 170 can be used to smooth out or dampen the pressure spikes. In addition, the fluid system in which the pump 10 operates may need to either add or remove fluid from the main fluid flow path of the fluid system due to, e.g., operation of the actuator. For example, when a hydraulic cylinder operates, the fluid volume in a closed-loop system may vary during operation because the extraction chamber volume and the retraction chamber volume may not be the same due to, e.g., the piston rod or for some other reason. Further, changes in fluid temperature can also necessitate the addition or removal of fluid in a closed-loop system. In such cases, any extra fluid in the system will need to be stored and any fluid deficiency will need to be replenished. The storage device 170 can store and release the required amount of fluid for stable operation.

Figure 10:
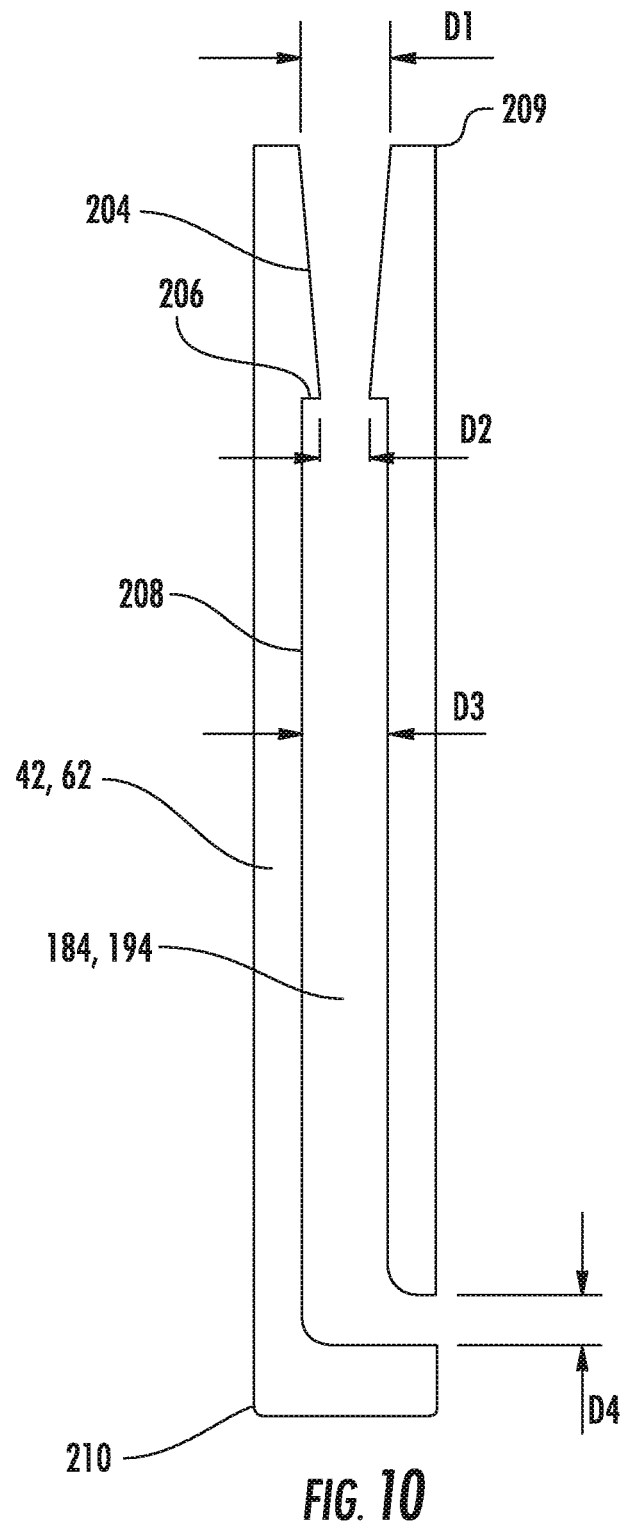
FIG. 10 shows an enlarged view of a preferred embodiment of a flow-through shaft with a through-passage.

FIG. 10 shows an enlarged view of an exemplary embodiment of the flow-through shaft 42, 62. The through-passage 184, 194 extend through the flow-through shaft 42, 62 from end 209 to end 210 and includes a tapered portion (or converging portion) 204 at the end 209 (or near the end 209) of the shaft 42, 62. The end 209 is in fluid communication with the storage device 170. The tapered portion 204 starts at the end 209 (or near the end 209) of the flow-through shaft 42, 62, and extends part-way into the through-passage 184, 194 of the flow-through shaft 42, 62 to point 206. In some embodiments, the tapered portion can extend 5% to 50% the length of the through-passage 184, 194. Within the tapered portion 204, the diameter of the through-passage 184, 194, as measured on the inside of the shaft 42, 62, is reduced as the tapered portion extends to end 206 of the flow-through shaft 42, 62. As shown in FIG. 10, the tapered portion 204 has, at end 209, a diameter D1 that is reduced to a smaller diameter D2 at point 206 and the reduction in diameter is such that flow characteristics of the fluid are measurably affected. In some embodiments, the reduction in the diameter is linear. However, the reduction in the diameter of the through-passage 184, 194 need not be a linear profile and can follow a curved profile, a stepped profile, or some other desired profile. Thus, in the case where the pressurized fluid flows from the storage device 170 and to the port of the pump via the through-passage 184, 194, the fluid encounters a reduction in diameter (D1→D2), which provides a resistance to the fluid flow and slows down discharge of the pressurized fluid from the storage device 170 to the pump port. By slowing the discharge of the fluid from the storage device 170, the storage device 170 behaves isothermally or substantially isothermally. It is known in the art that near-isothermal expansion/compression of a pressurized vessel, i.e. limited variation in temperature of the fluid in the pressurized vessel, tends to improve the thermal stability and efficiency of the pressurized vessel in a fluid system. Thus, in this exemplary embodiment, as compared to some other exemplary embodiments, the tapered portion 204 facilitates a reduction in discharge speed of the pressurized fluid from the storage device 170, which provides for thermal stability and efficiency of the storage device 170.

Figure 9:
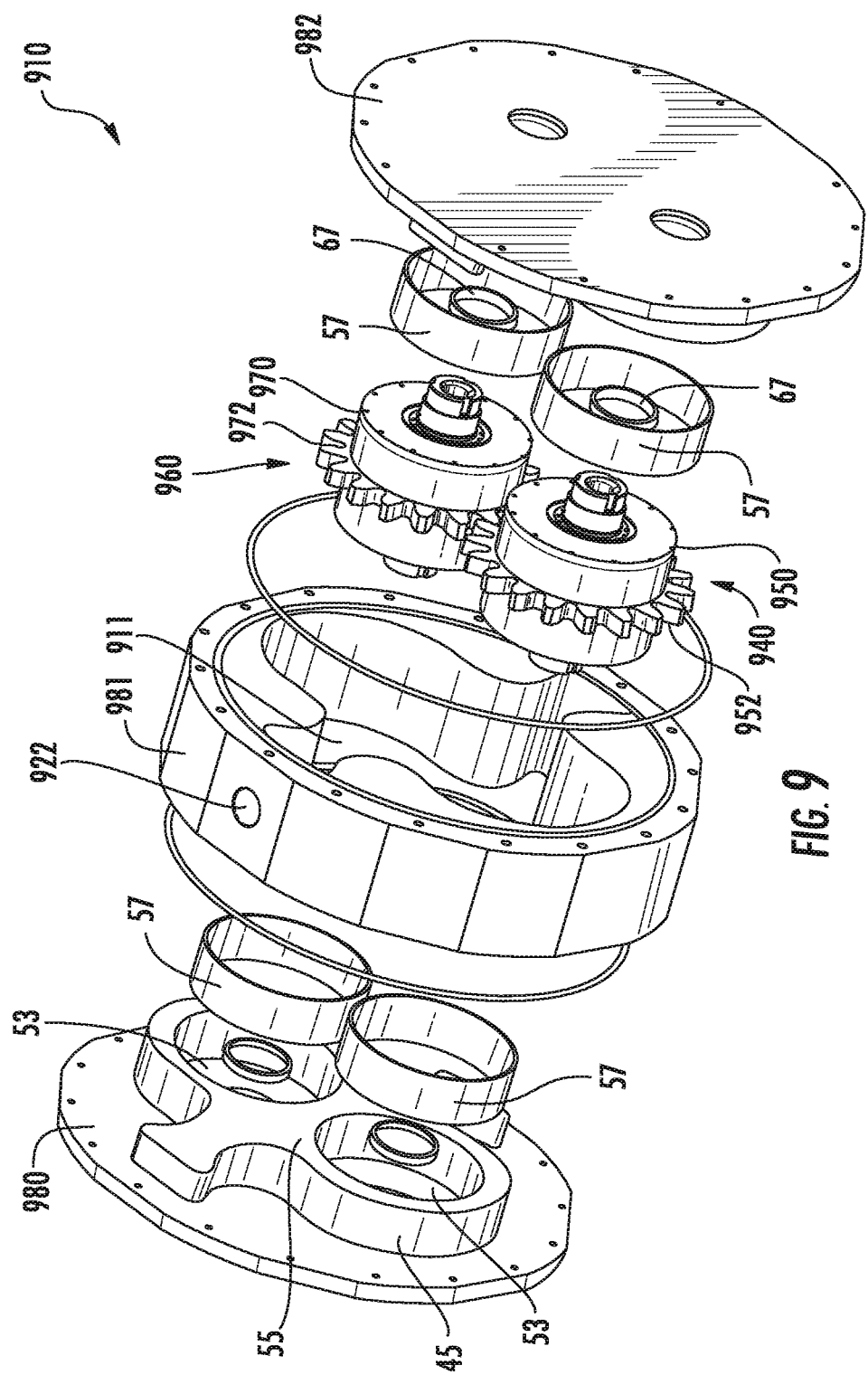
FIG. 9 shows an exploded view of an exemplary embodiment of a pump assembly having an external gear pump and a storage device.

As the pressurized fluid flows from the storage device 170 to a port of the pump 10, the fluid exits the tapered portion 204 at point 206 and enters an expansion portion (or throat portion) 208 where the diameter of the through-passage 184, 194 expands from the diameter D2 to a diameter D3, which is larger than D2, as measured to manufacturing tolerances. In the embodiment of FIG. 9, there is step-wise expansion from D2 to D3. However, the expansion profile does not have to be performed as a step and other profiles are possible so long as the expansion is done relatively quickly. However, in some embodiments, depending on factors such the fluid being pumped and the length of the through-passage 184, 194, the diameter of the expansion portion 208 at point 206 can initially be equal to diameter D2, as measured to manufacturing tolerances, and then gradually expand to diameter D3. The expansion portion 208 of the through-passage 184, 194 serves to stabilize the flow of the fluid from the storage device 170. How stabilization may be needed because the reduction in diameter in the tapered portion 204 can induce an increase in speed of the fluid due to nozzle effect (or Venturi effect), which can generate a disturbance in the fluid. However, in the exemplary embodiments of the present disclosure, as soon as the fluid leaves the tapered portion 204, the turbulence in the fluid due to the nozzle effect is mitigated by the expansion portion 208. In some embodiments, the third diameter D3 is equal to the first diameter D1, as measured to manufacturing tolerances. In the exemplary embodiments of the present disclosure, the entire length of the flow-through shafts 42, 62 can be used to incorporate the configuration of through-passages 184, 194 to stabilize the fluid flow.

The stabilized flow exits the through passage 184, 194 at end 210. The through-passage 184, 194 at end 210 can be fluidly connected to either the port 22 or port 24 of the pump 10 via, e.g., channels in the end plate 82 (e.g., channel 192 for through-passage 194—see FIGS. 4, 4A and 4B). Of course, the flow path is not limited to channels within the pump casing and other means can be used. For example, the port 210 can be connected to external pipes and/or hoses that connect to port 22 or port 24 of pump 10. In some embodiments, the through-passage 184, 194 at end 210 has a diameter D4 that is smaller than the third diameter D3 of the expansion portion 208. For example, the diameter D4 can be equal to the diameter D2, as measured to manufacturing tolerances. In some embodiments, the diameter D1 is larger than the diameter D2 by 50 to 75% and larger than diameter D4 by 50 to 75%. In some embodiments, the diameter D3 is larger than the diameter D2 by 50 to 75% and larger than diameter D4 by 50 to 75%.

The cross-sectional shape of the fluid passage is not limiting. For example, a circular-shaped passage, a rectangular-shaped passage, or some other desired shaped passage may be used. Of course, the through-passage in not limited to a configuration having a tapered portion and an expansion portion and other configurations, including through-passages having a uniform cross-sectional area along the length of the through-passage, can be used. Thus, configuration of the through-passage of the flow-through shaft can vary without departing from the scope of the present disclosure.

Figure 5:
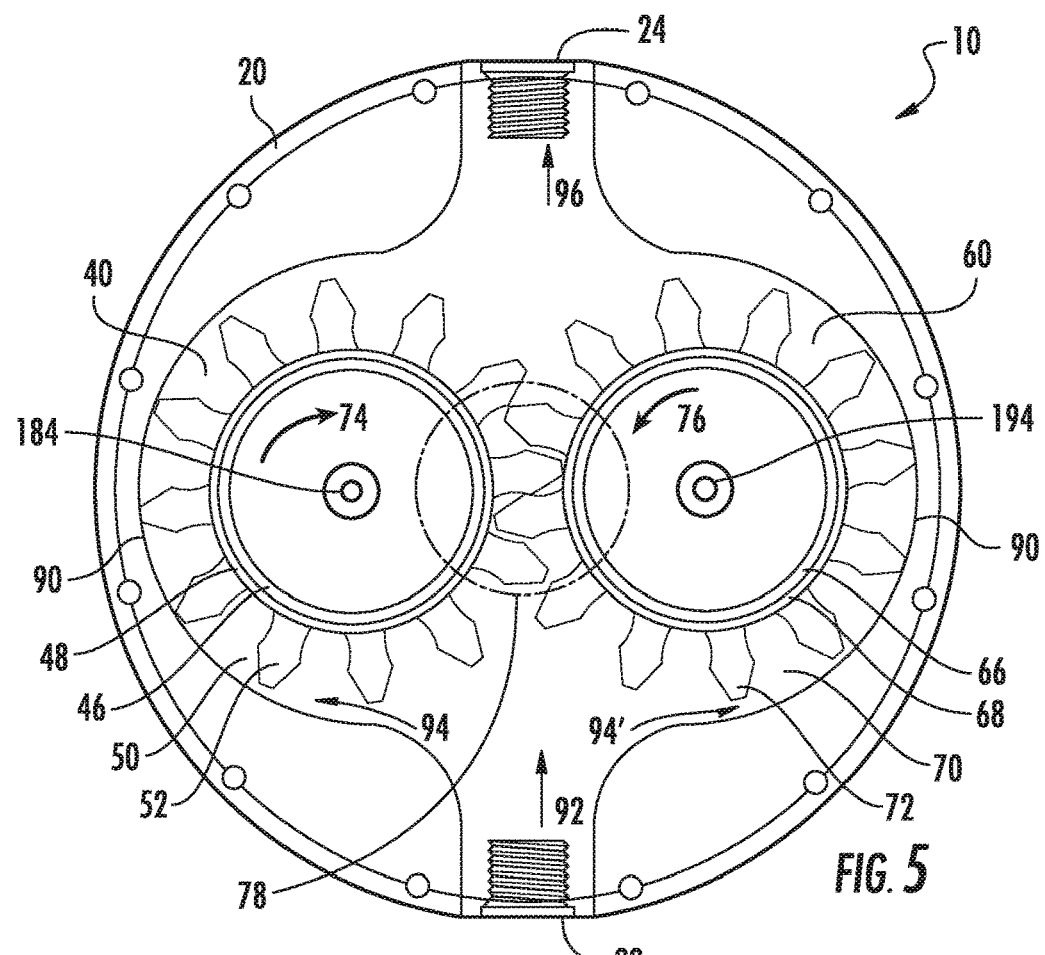
FIG. 5 illustrates an exemplary flow path of the external gear pump of FIG. 4.

FIG. 5 illustrates an exemplary fluid flow path of an exemplary embodiment of the external gear pump 10. A detailed operation of pump 10 is provided in U.S. Pat. No. 9,228,586 (U.S. application Ser. No. 14/637,064) and co-pending International Application No. PCT/US15/27003, and thus, for brevity, is omitted except as necessary to describe the present exemplary embodiments. In exemplary embodiments of the present disclosure, both gears 50, 70 are respectively independently driven by the separately provided motors 41, 61. For explanatory purposes, the gear 50 is rotatably driven clockwise 74 by motor 41 and the gear 70 is rotatably driven counter-clockwise 76 by the motor 61. With this rotational configuration, port 22 is the inlet side of the gear pump 10 and port 24 is the outlet side of the gear pump 10.

To prevent backflow, i.e., fluid leakage from the outlet side to the inlet side through the contact area 78, contact between a tooth of the first gear 50 and a tooth of the second gear 70 in the contact area 78 provides sealing against the backflow. The contact force is sufficiently large enough to provide substantial sealing but, unlike driver-driven systems, the contact force is not so large as to significantly drive the other gear. In driver-driven systems, the force applied by the driver gear turns the driven gear. That is, the driver gear meshes with (or interlocks with) the driven gear to mechanically drive the driven gear. While the force from the driver gear provides sealing at the interface point between the two teeth, this force is much higher than that necessary for sealing because this force must be sufficient enough to mechanically drive the driven gear to transfer the fluid at the desired flow and pressure.

In some exemplary embodiments, however, the gears 50, 70 of the pump 10 do not mechanically drive the other gear to any significant degree when the teeth 52, 72 form a seal in the contact area 78. Instead, the gears 50, 70 are rotatably driven independently such that the gear teeth 52, 72 do not grind against each other. That is, the gears 50, 70 are synchronously driven to provide contact but not to grind against each other. Specifically, rotation of the gears 50, 70 are synchronized at suitable rotation rates so that a tooth of the gear 50 contacts a tooth of the second gear 70 in the contact area 78 with sufficient enough force to provide substantial sealing, i.e., fluid leakage from the outlet port side to the inlet port side through the contact area 78 is substantially eliminated. However, unlike a driver-driven configuration, the contact force between the two gears is insufficient to have one gear mechanically drive the other to any significant degree. Precision control of the motors 41, 61, will ensure that the gear positons remain synchronized with respect to each other during operation.

For example, the gear 70 can be rotatably driven faster than the gear 50 by a fraction of a second, e.g., 0.01 sec/revolution. This rotational speed difference between the gear 50 and gear 70 enables one-sided contact between the two gears 50, 70, which provides substantial sealing between gear teeth of the two gears 50, 70 to seal between the inlet port and the outlet port, as described above. In some embodiments, rotation of the gears 50, 70 is at least 99% synchronized, where 100% synchronized means that both gears 50, 70 are rotated at the same rpm. However, the synchronization percentage can be varied as long as substantial sealing is provided via the contact between the gear teeth of the two gears 50, 70. In exemplary embodiments, the synchronization rate can be in a range of 95.0% to 100% based on a clearance relationship between the gear teeth 52 and the gear teeth 72. In other exemplary embodiments, the synchronization rate is in a range of 99.0% to 100% based on a clearance relationship between the gear teeth 52 and the gear teeth 72, and in still other exemplary embodiments, the synchronization rate is in a range of 99.5% to 100% based on a clearance relationship between the gear teeth 52 and the gear teeth 72. Again, precision control of the motors 41, 61, will ensure that the gear positons remain synchronized with respect to each other during operation. By appropriately synchronizing the gears 50, 70, the gear teeth 52, 72 can provide substantial sealing, e.g., a backflow or leakage rate with a slip coefficient in a range of 5% or less. For example, for typical hydraulic fluid at about 120 deg. F., the slip coefficient can be can be 5% or less for pump pressures in a range of 3000 psi to 5000 psi, 3% or less for pump pressures in a range of 2000 psi to 3000 psi, 2% or less for pump pressures in a range of 1000 psi to 2000 psi, and 1% or less for pump pressures in a range up to 1000 psi. Of course, depending on the pump type, the synchronized contact can aid in pumping the fluid. For example, in certain internal-gear georotor configurations, the synchronized contact between the two fluid drivers also aids in pumping the fluid, which is trapped between teeth of opposing gears. In some exemplary embodiments, the gears 50, 70 are synchronized by appropriately synchronizing the motors 41, 61. Synchronization of multiple motors is known in the relevant art, thus detailed explanation is omitted here.

Figure 5A:
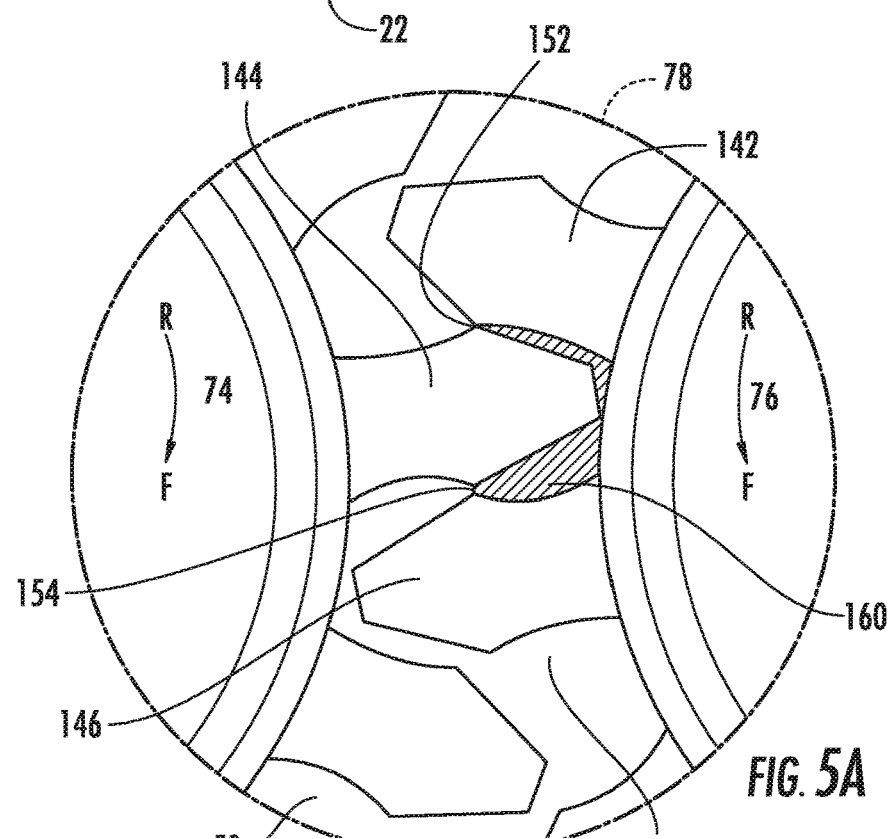
FIG. 5A shows a cross-sectional view illustrating one-sided contact between two gears in a contact area in the external gear pump of FIG. 5.

In an exemplary embodiment, the synchronizing of the gears 50, 70 provides one-sided contact between a tooth of the gear 50 and a tooth of the gear 70. FIG. 5A shows a cross-sectional view illustrating this one-sided contact between the two gears 50, 70 in the contact area 78. For illustrative purposes, gear 50 is rotatably driven clockwise 74 and the gear 70 is rotatably driven counter-clockwise 76 independently of the gear 50. Further, the gear 70 is rotatably driven faster than the gear 50 by a fraction of a second, 0.01 sec/revolution, for example. Based on the application, one fluid displacement member can be driven faster than the other fluid displacement member in a range of, e.g., 0.0001 to 0.001 de sec. This rotational speed difference between the gear 50 and gear 70 enables one-sided contact between the two gears 50, 70, which provides substantial sealing between gear teeth of the two gears 50, 70 to seal between the inlet port and the outlet port, as described above. Thus, as shown in FIG. 5A, a tooth 142 on the gear 70 contacts a tooth 144 on the gear 50 at a point of contact 152. If a face of a gear tooth that is facing forward in the rotational direction 74, 76 is defined as a front side (F), the front side (F) of the tooth 142 contacts the rear side (R) of the tooth 144 at the point of contact 152. However, the gear tooth dimensions are such that the front side (F) of the tooth 144 is not in contact with (i.e., spaced apart from) the rear side (R) of tooth 146, which is a tooth adjacent to the tooth 142 on the gear 70. Thus, the gear teeth 52, 72 are designed such that there is one-sided contact in the contact area 78 as the gears 50, 70 are driven. As the tooth 142 and the tooth 144 move away from the contact area 78 as the gears 50, 70 rotate, the one-sided contact formed between the teeth 142 and 144 phases out. As long as there is a rotational speed difference between the two gears 50, 70, this one-sided contact is formed intermittently between a tooth on the gear 50 and a tooth on the gear 70. However, because as the gears 50, 70 rotate, the next two following teeth on the respective gears form the next one-sided contact such that there is always contact and the backflow path in the contact area 78 remains substantially sealed. That is, the one-sided contact provides sealing between the ports 22 and 24 such that fluid carried from the pump inlet to the pump outlet is prevented (or substantially prevented) from flowing back to the pump inlet through the contact area 78.

In FIG. 5A, the one-sided contact between the tooth 142 and the tooth 144 is shown as being at a particular point, i.e. point of contact 152. However, a one-sided contact between gear teeth in the exemplary embodiments is not limited to contact at a particular point. For example, the one-sided contact can occur at a plurality of points or along a contact line between the tooth 142 and the tooth 144. For another example, one-sided contact can occur between surface areas of the two gear teeth. Thus, a sealing area can be formed when an area on the surface of the tooth 142 is in contact with an area on the surface of the tooth 144 during the one-sided contact. The gear teeth 52, 72 of each gear 50, 70 can be configured to have a tooth profile (or curvature) to achieve one-sided contact between the two gear teeth. In this way, one-sided contact in the present disclosure can occur at a point or points, along a line, or over surface areas. Accordingly, the point of contact 152 discussed above can be provided as part of a location (or locations) of contact, and not limited to a single point of contact.

In some exemplary embodiments, the teeth of the respective gears 50, 70 are designed so as to not trap excessive fluid pressure between the teeth in the contact area 78. As illustrated in FIG. 5A, fluid 160 can be trapped between the teeth 142, 144, 146. While the trapped fluid 160 provides a sealing effect between the pump inlet and the pump outlet, excessive pressure can accumulate as the gears 50, 70 rotate. In a preferred embodiment, the gear teeth profile is such that a small clearance (or gap) 154 is provided between the gear teeth 144, 146 to release pressurized fluid. Such a design retains the sealing effect while ensuring that excessive pressure is not built up. Of course, the point, line or area of contact is not limited to the side of one tooth face contacting the side of another tooth face. Depending on the type of fluid displacement member, the synchronized contact can be between any surface of at least one projection (e.g., bump, extension, bulge, protrusion, other similar structure or combinations thereof) on the first fluid displacement member and any surface of at least one projection (e.g., bump, extension, bulge, protrusion, other similar structure or combinations thereof) or an indent (e.g., cavity, depression, void or similar structure) on the second fluid displacement member. In some embodiments, at least one of the fluid displacement members can be made of or include a resilient material, e.g., rubber, an elastomeric material, or another resilient material, so that the contact force provides a more positive sealing area.

Figure 6:
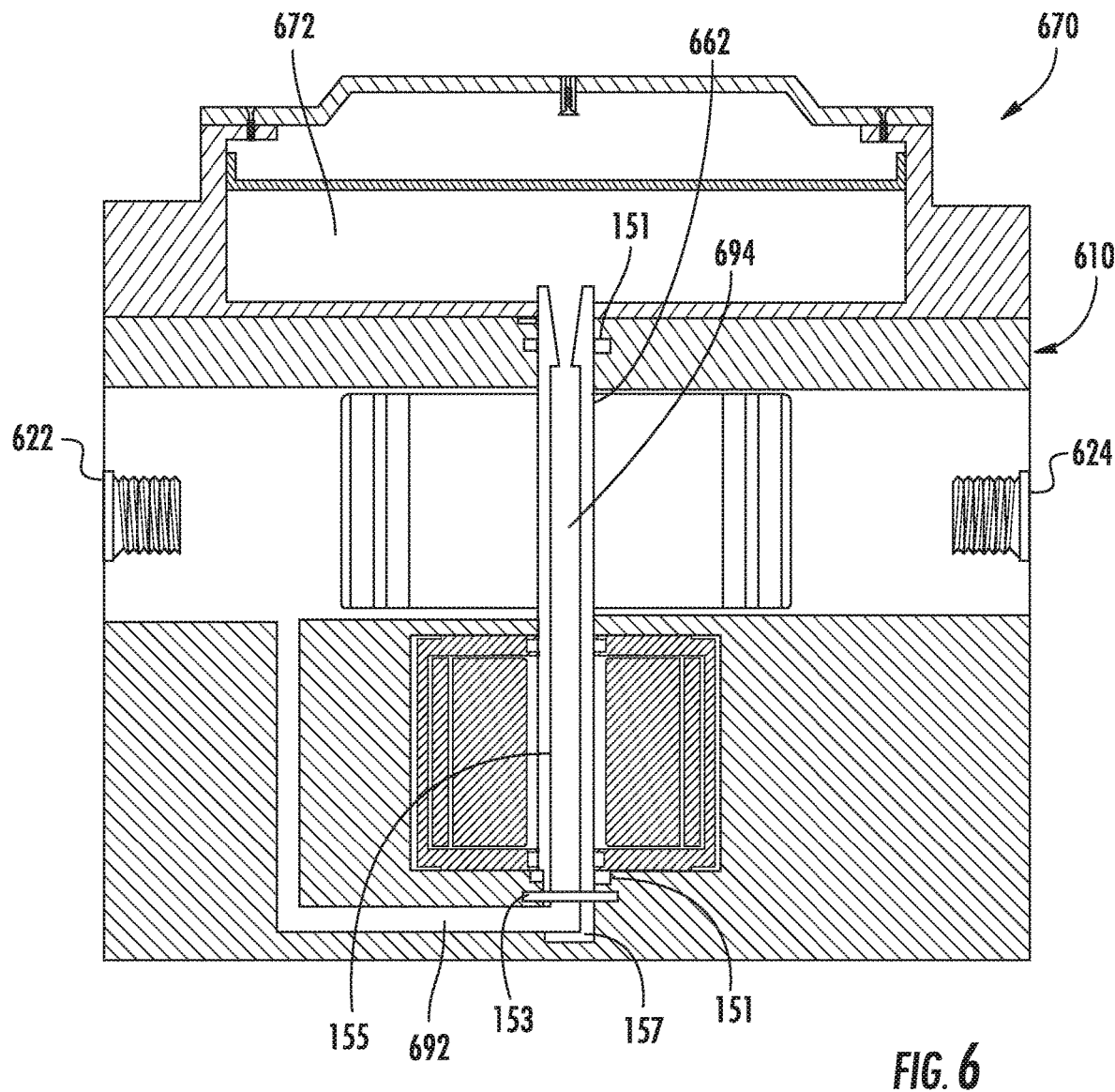
FIG. 6 shows a cross-sectional view of an exemplary embodiment of a pump assembly.

In the above exemplary embodiments, both shafts 42, 62 include a through-passage configuration. However, in some exemplary embodiments, only one of the shafts has a through-passage configuration while the other shaft can be a conventional shaft such as, e.g., a solid shaft. In addition, in some exemplary embodiments the flow-through shaft can be configured to rotate. For example, some exemplary pump configurations use a fluid driver with an inner-rotating motor. The shafts in these fluid drivers can also be configured as flow-through shafts. As seen in FIG. 6, the pump 610 includes a shaft 662 with a through-passage 694 that is in fluid communication with chamber 672 of storage device 670 and a port 622 of the pump 610 via channel 692. Thus, the fluid chamber 672 is in fluid communication with port 622 of pump 610 via through-passage 694 and channel 692.

The configuration of flow-through shaft 662 is different from that of the exemplary shafts described above because, unlike shafts 42, 62, the shaft 662 rotates. The flow-through shaft 662 can be supported by bearings 151 on both ends. In the exemplary embodiment, the flow-through shaft 662 has a rotary portion 155 that rotates with the motor rotor and a stationary portion 157 that is fixed to the motor casing. A coupling 153 can be provided between the rotary and stationary portions 155, 157 to allow fluid to travel between the rotary and stationary portions 155, 157 through the coupling 153 while the pump 610 operates.

While the above exemplary embodiments discussed above illustrate only one storage device, exemplary embodiments of the present disclosure are not limited to one storage device and can have more than one storage device. For example, in an exemplary embodiment shown in FIG. 7, storage devices 770 and 870 can be mounted to the pump 710, e.g., on the end plates 781, 780, respectively. Those skilled in the art would understand that the storage devices 770 and 870 are similar in configuration and function to storage device 170. Thus, for brevity, a detailed description of storage devices 770 and 870 is omitted, except as necessary to explain the present exemplary embodiment.

Figure 7:
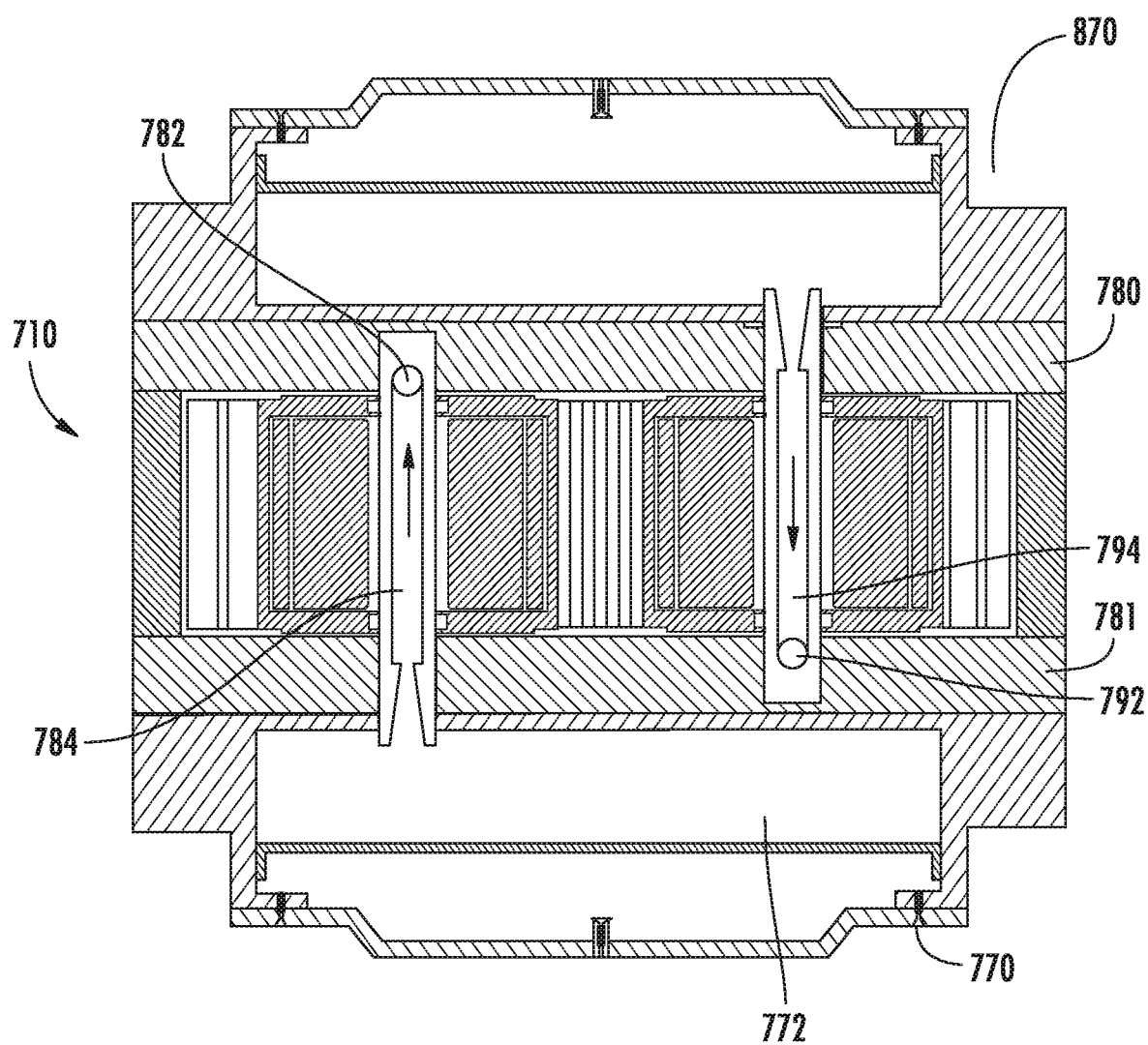
FIG. 7 shows a cross-sectional view of an exemplary embodiment of a pump assembly.

The channels 782 and 792 of through passages 784 and 794 can each be connected to the same port of the pump or to different ports. Connection to the same port can be beneficial in certain circumstances. For example, if one large storage device is impractical for any reason, it might be possible to split the storage capacity between two smaller storage devices that are mounted on opposite sides of the pump as illustrated in FIG. 7. Alternatively, connecting each storage device 770 and 870 to different ports of the pump 710 can also be beneficial in certain circumstances. For example, a dedicated storage device for each port can be beneficial in circumstances where the pump is bi-directional and in situations where the inlet of the pump and the outlet of the pump experience pressure spikes that need to be smoothened or some other flow or pressure disturbance that can be mitigated or eliminated with a storage device. Of course, each of the channels 782 and 792 can be connected to both ports of the pump 710 such that each of the storage devices 770 and 870 can be configured to communicate with a desired port using appropriate valves (not shown). In this case, the valves would need to be appropriately operated to prevent adverse pump operation. In some embodiments, the storage device or storage devices can be disposed external to the fluid-driven actuator assembly. In these embodiments, the flow-through shaft or shafts of the fluid-driven actuator assembly can connect to the storage device or devices via hoses, pipes or some other similar device.

Figure 8:
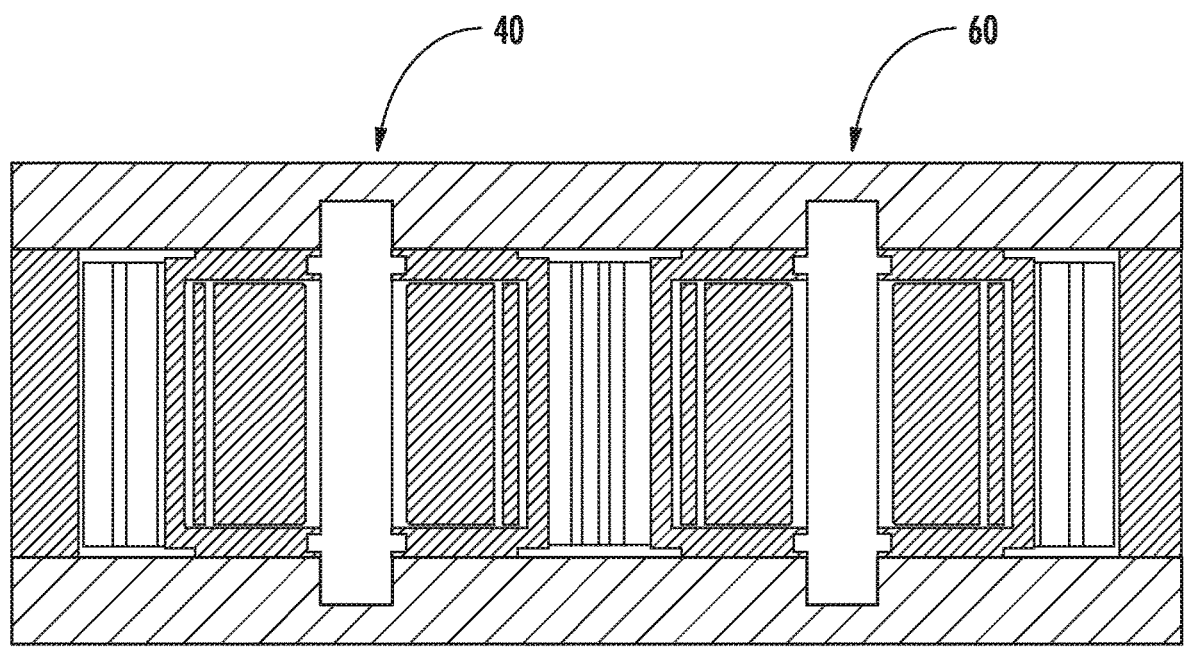
FIGS. 8 to 8E show cross-sectional views of exemplary embodiments of pumps with drive-drive configurations.
Figure 8A:
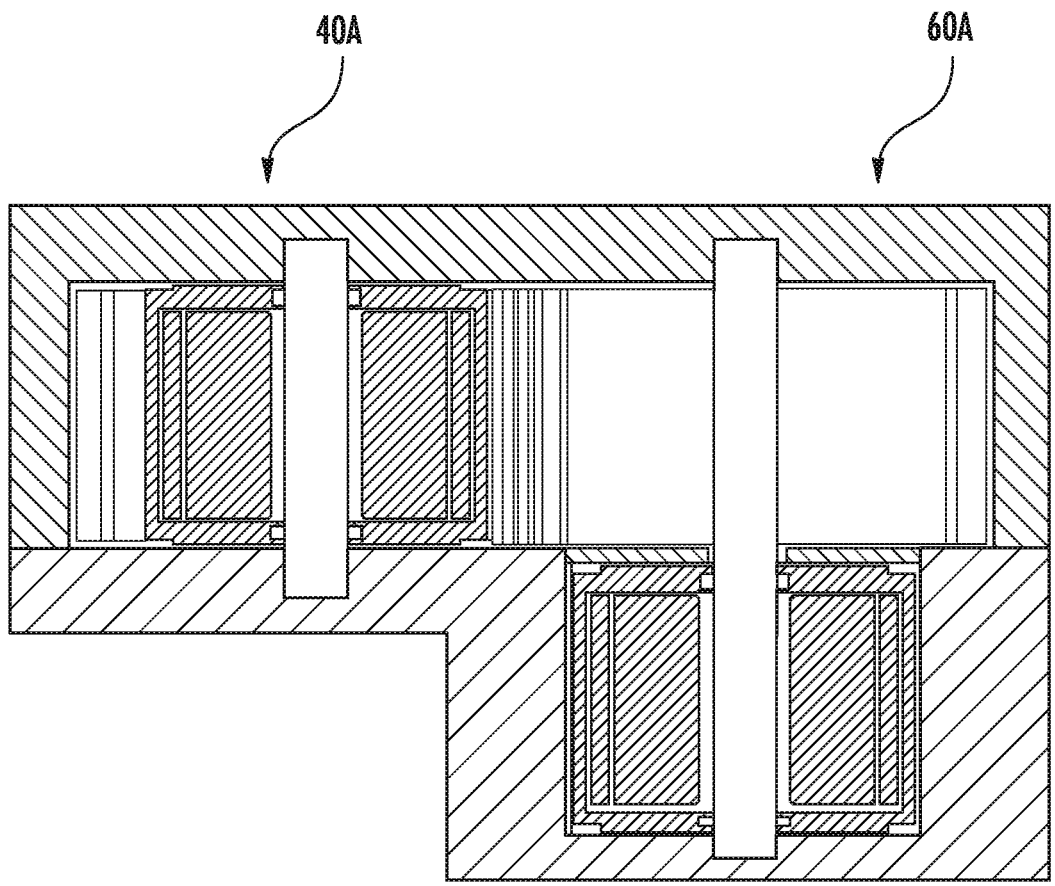
Figure 8B:
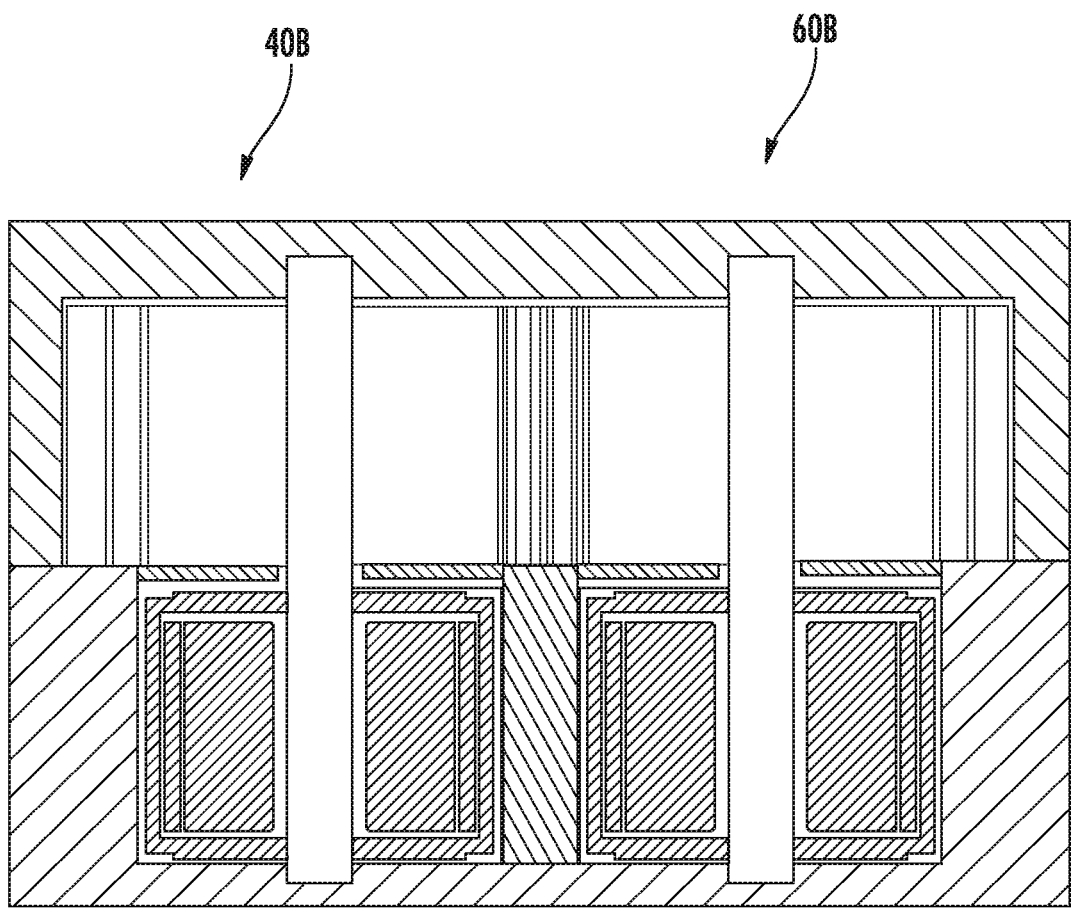
Figure 8C:
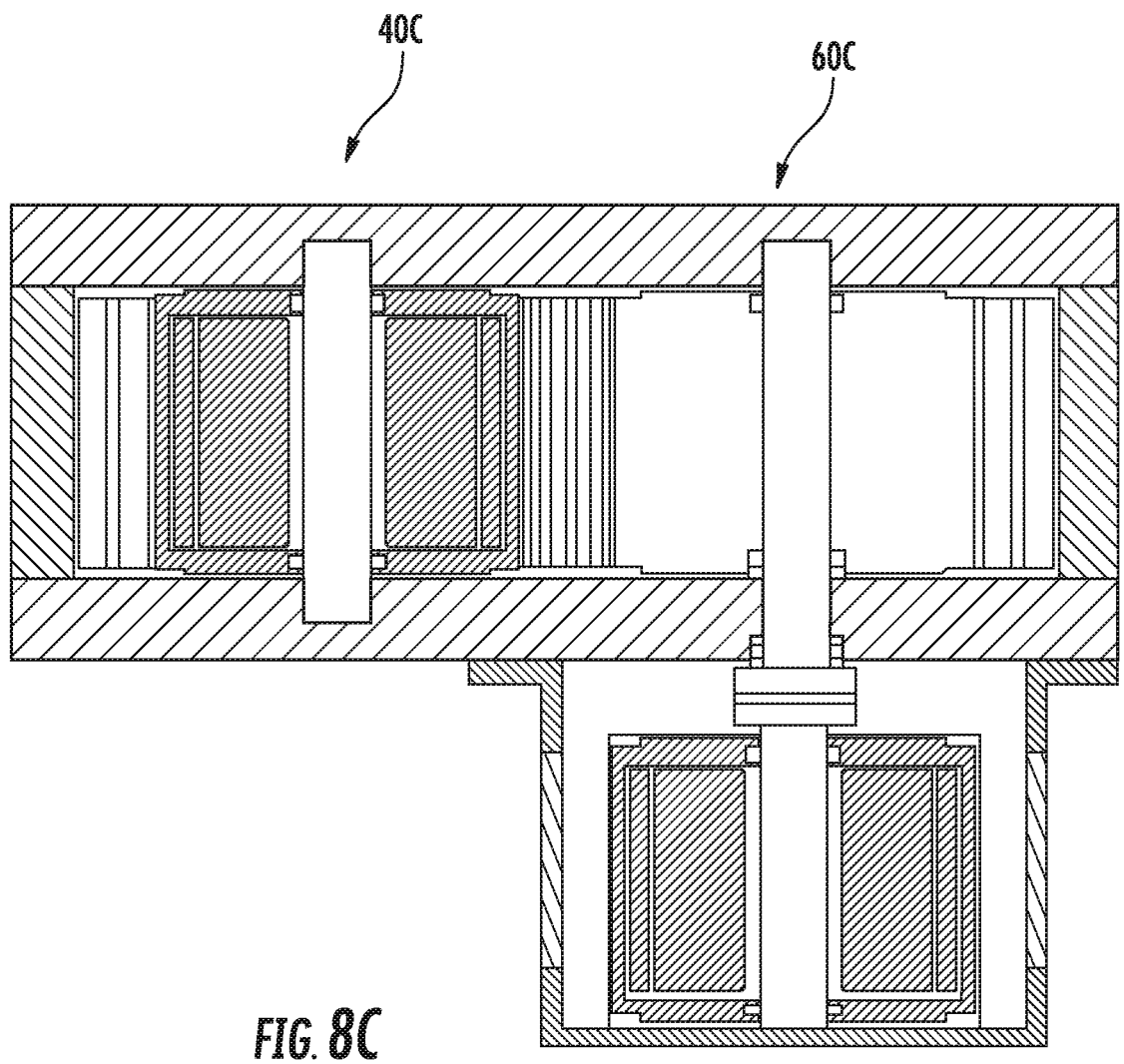
Figure 8D:
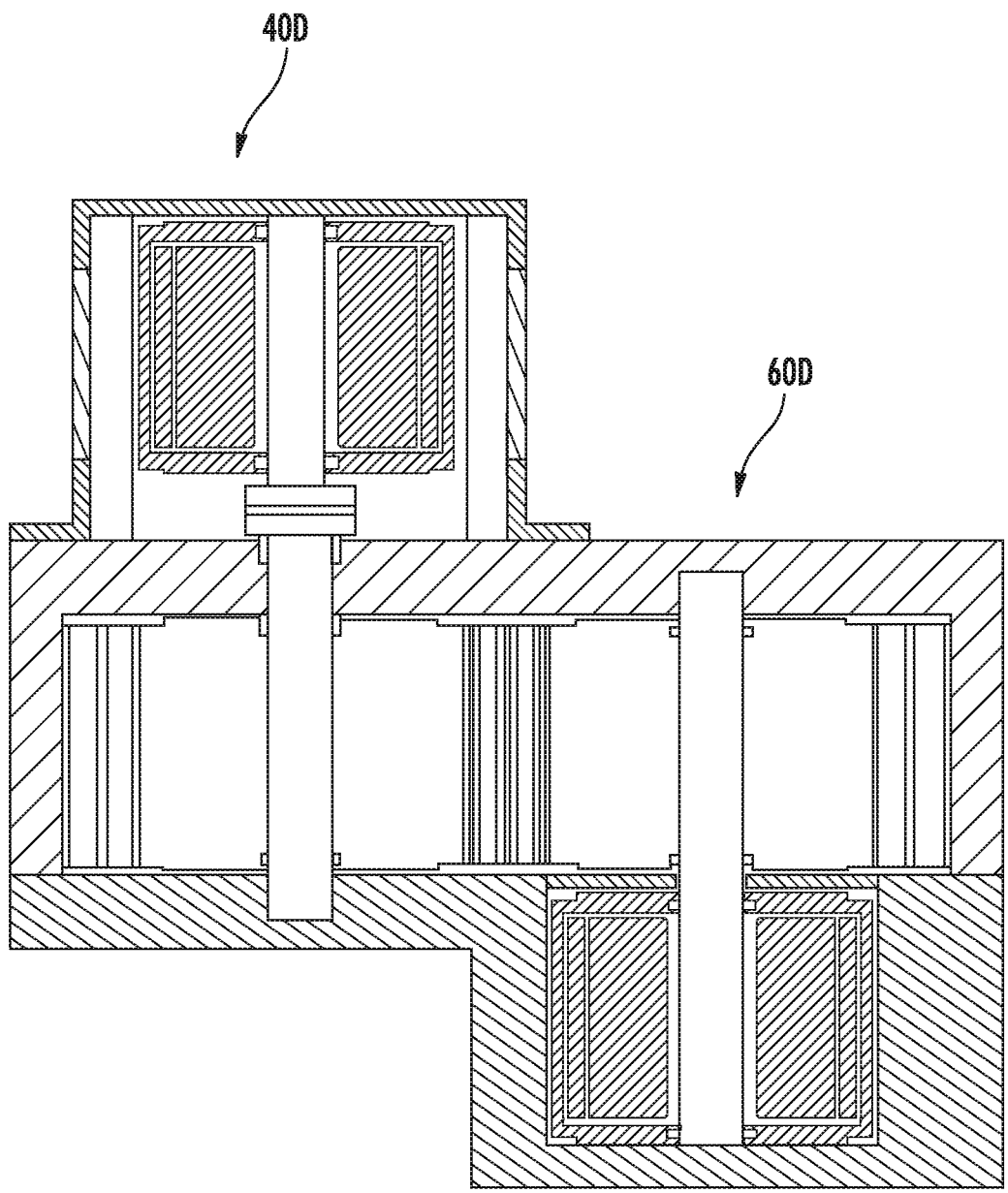
Figure 8E:
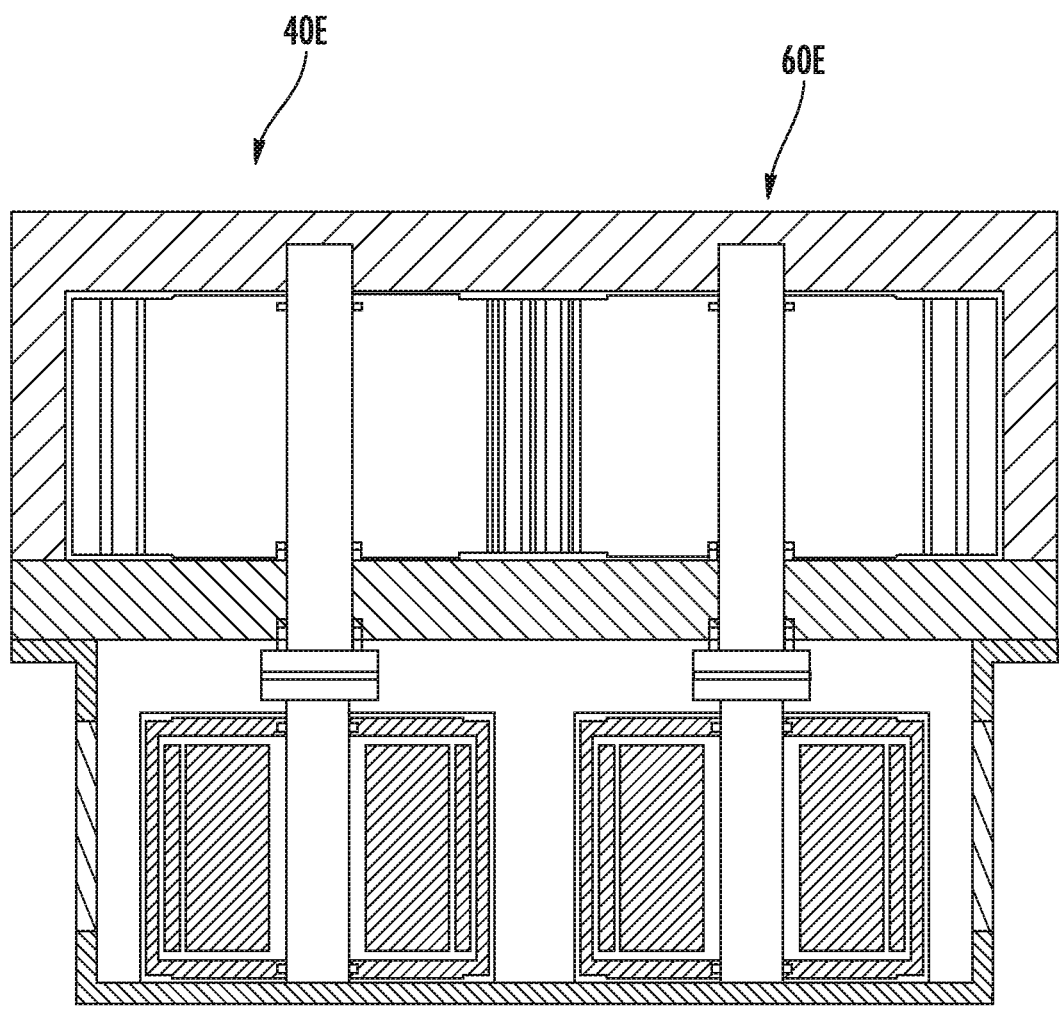

In some exemplary embodiments, the pump 10 does not include fluid drivers that have flow-through shafts. For example, FIG. 8-8E respectively illustrate various exemplary configurations of fluid drivers 40-40E/60-60E in which both shafts of the fluid drivers do not have a flow-through configuration, e.g., the shafts are solid in FIGS. 8-8E. The exemplary embodiments in FIGS. 8-8E illustrate configurations in which one or both motors are disposed within the gear, one or both motors are disposed in the internal volume of the pump but not within the gear and where one or both motors are disposed outside the pump casing. Further details of the pump of FIGS. 8-8E can be found in U.S. Pat. No.

9,228,586 (U.S. application Ser. No. 14/637,064) and co-pending international Application No. PCT/US15/27003. Of course, in some exemplary embodiments, one or both of the shafts in the pump configurations shown in FIGS. 8-8E can include flow-through shafts.

FIG. 9 shows an exploded view of another exemplary embodiment of a pump of the present disclosure. The pump 910 represents a positive-displacement (or fixed displacement) gear pump. The pump 910 is described in detail in co-pending International Application No. PCT/US2015/041612, which is incorporated herein by reference in its entirety. The operation of pump 910 is similar to pump 10. Thus, for brevity, a detailed description of pump 910 is omitted except as necessary to describe the present exemplary embodiments.

Pump 910 includes balancing plates 980, 982 which for at least part of the pump casing. The balancing plates 980, 982 have protruded portions 45 disposed on the interior portion (i.e., internal volume 911 side) of the end plates 980, 982. One feature of the protruded portions 45 is to ensure that the gears are properly aligned, a function performed by bearing blocks in conventional external gear pumps. However, unlike traditional bearing blocks, the protruded portions 45 of each end plate 980, 982 provide additional mass and structure to the casing 920 so that the pump 910 can withstand the pressure of the fluid being pumped. In conventional pumps, the mass of the bearing blocks is in addition to the mass of the casing, which is designed to hold the pump pressure. Thus, because the protruded portions 45 of the present disclosure serve to both align the gears and provide the mass required by the pump casing, the overall mass of the structure of pump 910 can be reduced in comparison to conventional pumps of a similar capacity.

Figure 9A:
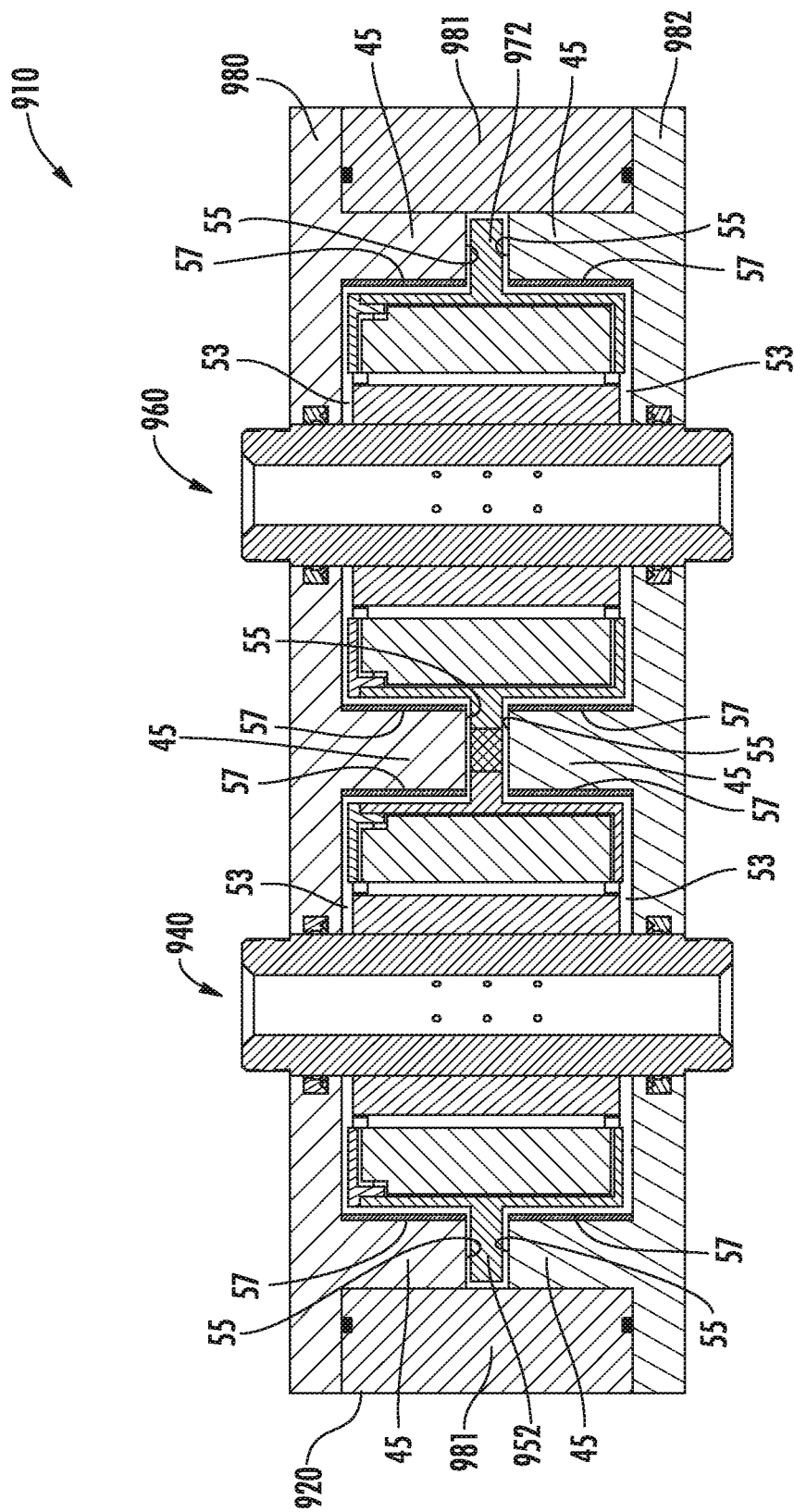
FIG. 9A shows an assembled side cross-sectional view of the external gear pump in FIG. 9.

As seen in FIGS. 9 and 9A, the fluid drivers 940, 960 include gears 950, 970 which have a plurality of gear teeth 952, 972 extending radially outward from the respective gear bodies. When the pump 910 is assembled, the gear teeth 952, 972 fit in a gap between land 55 of the protruded portion of balancing plate 980 and the land 55 of the protruded portion of balancing plate 982. Thus, the protruded portions 45 are sized to accommodate the thicknesses of gear teeth 952, 972, which can depend on various factors such as, e.g., the type of fluid being pumped and the design flow and pressure capacity of the pump. The gap between the opposing lands 55 of the protruded portions 45 is set such that there is sufficient clearance between the lands 55 and the gear teeth 952, 972 for the fluid drivers 940, 960 to rotate freely but still pump the fluid efficiently.

Figure 9B:
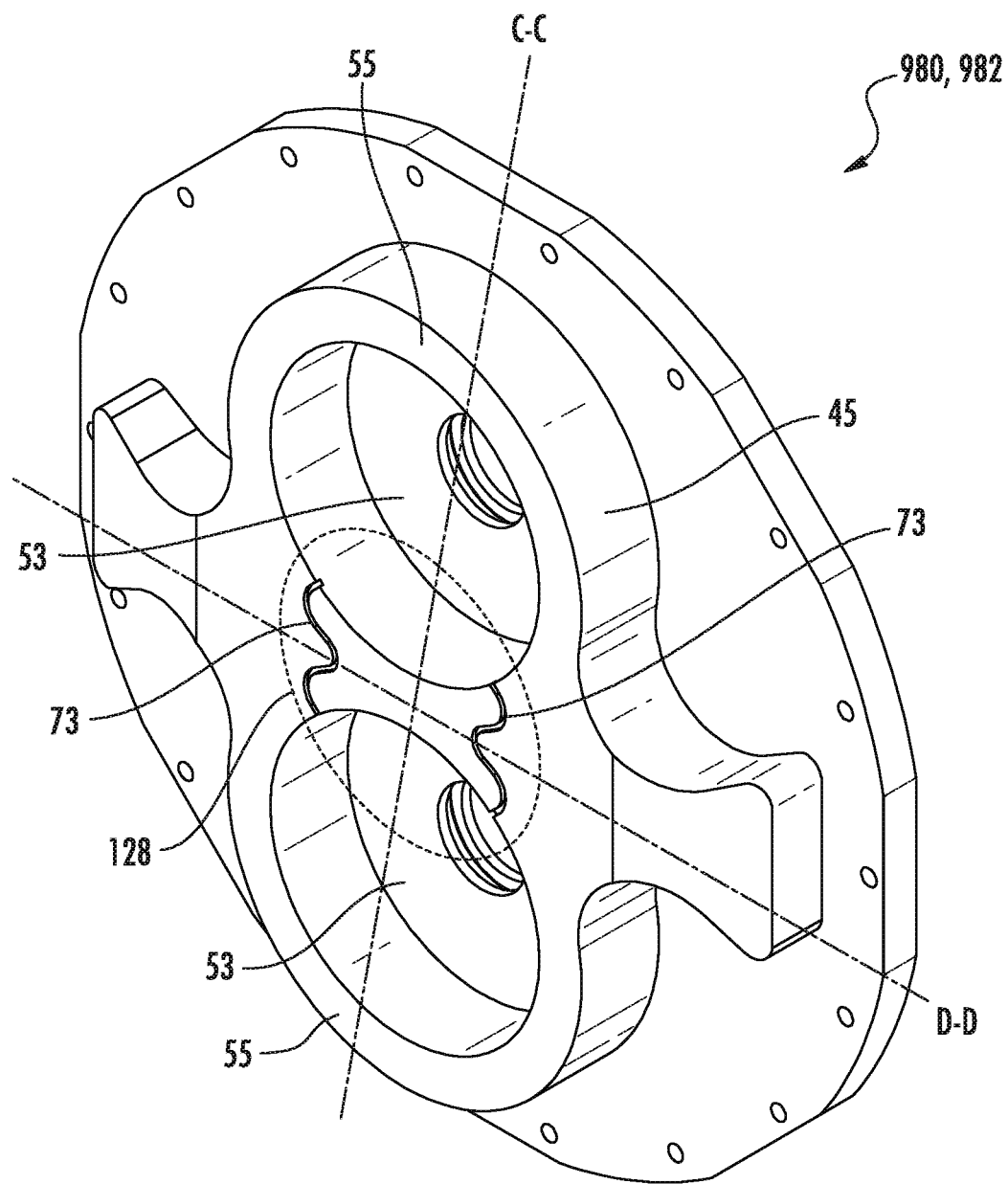
FIG. 9B shows an isometric view of a balancing plate of the pump in FIG. 9.

In some embodiments, one or more cooling grooves may be provided in each protruded portion 45 to transfer a portion of the fluid in the internal volume 911 to the recesses 53 to lubricate bearings 57. For example, as shown in FIG. 9B, cooling grooves 73 can be disposed on the surface of the land 55 of each protruded portions 45. For example, on each side of centerline C-C and along the pump flow axis D-D. At least one end of each cooling groove 73 extends to a recess 53 and opens into the recess 53 such that fluid in the cooling groove 73 will be forced to flow to the recess 53. In some embodiments, both ends of the cooling grooves extend to and open into recesses 53. For example, in FIG. 9B, the cooling grooves 73 are disposed between the recesses 53 in a gear merging area 128 such that the cooling grooves 73 extend from one recess 53 to the other recess 53. Alternatively, or in addition to the cooling grooves 73 disposed in the gear merging area 128, other portions of the land 55, i.e., portions outside of the gear merging area 128, can include cooling grooves. Although two cooling grooves are illustrated, the number of cooling grooves in each balancing plate 980, 982 can vary and still be within the scope of the present disclosure. In some exemplary embodiments (not shown), only one end of the cooling groove opens into a recess 53, with the other end terminating in the land 55 portion or against an interior wall of the pump 910 when assembled. In some embodiments, the cooling grooves can be generally "U-shaped" and both ends can open into the same recess 53. In some embodiments, only one of the two protruded portions 45 includes the cooling groove(s). For example, depending on the orientation of the pump or for some other reason, one set of bearings may not require the lubrication and/or cooling. For pump configurations that have only one protruded portion 45, in some embodiments, the end cover plate (or cover vessel) can include cooling grooves either alternatively or in addition to the cooling grooves in the protruded portion 45, to lubricate and/or cool the motor portion of the fluid drivers that is adjacent the casing cover. In the exemplary embodiments discussed above, the cooling grooves 73 have a profile that is curved and in the form of a wave shape. However, in other embodiments, the cooling grooves 73 can have other groove profiles, e.g. a zig-zag profile, an arc, a straight line, or some other profile that can transfer the fluid to recesses 53. The dimension (e.g., depth, width), groove shape and number of grooves in each balancing plate 980, 982 can vary depending on the cooling needs and/or lubrication needs of the bearings 57.

Figure 9C:
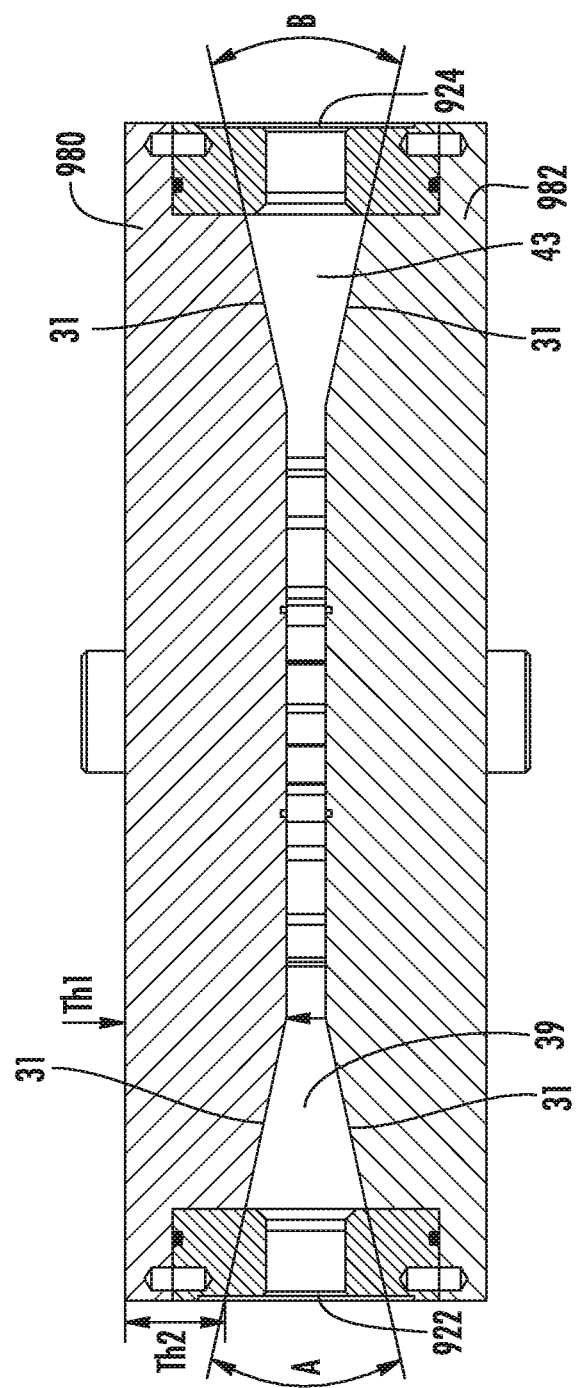
FIG. 9C shows another assembled side cross-sectional view taken of the pump in FIG. 9.

As best seen in FIG. 9C, which shows a cross-sectional view of pump 910, in some embodiments, the balancing plates 980, 982 include sloped (or slanted) segments 31 at each port 922, 924 side of the balancing plates 980, 982. In some exemplary embodiments, the sloped segments 31 are part of the protruded portions 45. In other exemplary embodiments, the sloped segment 31 can be a separate modular component that is attached to protruded portion 45. Such a modular configuration allows for easy replacement and the ability to easily change the flow characteristics of the fluid flow to the gear teeth 952, 972, if desired. The sloped segments 31 are configured such that, when the pump 10 is assembled, the inlet and outlet sides of the pump 910 will have a converging flow passage or a diverging flow passage, respectively, formed therein. Of course, either port 922 or 924 can be the inlet port and the other the outlet port depending on the direction of rotation of the gears 950, 970. The flow passages are defined by the sloped segments 31 and the pump body 981, i.e., the thickness Th2 of the sloped segments 31 at an outer end next to the port is less than the thickness Th1 an inner end next to the gears 950, 970. As seen in FIG. 9C, the difference in thicknesses forms a converging/diverging flow passage 39 at port 922 that has an angle A and a converging/diverging flow passage 43 at port 924 that has an angle B. In some exemplary embodiments, the angles A and B can be in a range from about 9 degrees to about 15 degrees, as measured to within manufacturing tolerances. The angles A and B can be the same or different depending on the system configuration. Preferably, for pumps that are bi-directional, the angles A and B are the same, as measured to within manufacturing tolerances. However, the angles can be different if different fluid flow characteristics are required or desired based on the direction of flow. For example, in a hydraulic cylinder-type application, the flow characteristics may be different depending on whether the cylinder is being extracted or retracted. The profile of the surface of the sloped section can be flat as shown in FIG. 9C, curved (not shown) or some other profile depending on the desired fluid flow characteristics of the fluid as it enters and/or exits the gears 950, 970.

During operation, as the fluid enters the inlet of the pump 910, e.g., port 922 for explanation purposes, the fluid encounters the converging flow passage 39 where the cross-sectional area of at least a portion of the passage 39 is gradually reduced as the fluid flows to the gears 950, 970. The converging flow passage 39 minimizes abrupt changes in speed and pressure of the fluid and facilitates a gradual transition of the fluid into the gears 950, 970 of pump 910. The gradual transition of the fluid into the pump 910 can reduce bubble formation or turbulent flow that may occur in or outside the pump 910, and thus can prevent or minimize cavitation. Similarly, as the fluid exits the gears 950, 970, the fluid encounters a diverging flow passage 43 in which the cross-sectional areas of at least a portion of the passage is gradually expanded as the fluid flows to the outlet port, e.g., port 924. Thus, the diverging flow passage 43 facilitates a gradual transition of the fluid from the outlet of gears 950, 970 to stabilize the fluid. In some embodiments, pump 910 can include an integrated storage device and flow-through shafts as discussed above with respect to pump 10.

In the embodiments discussed above, the storage devices were described as pressurized vessels with a separating element (or piston) inside. However, in other embodiments, a different type of pressurized vessel may be used. For example, an accumulator, e.g. a hydraulic accumulator, may be used as a pressurized vessel. Accumulators are common components in fluid systems such as hydraulic operating and control systems. The accumulators store potential energy in the form of a compressed gas or spring, or by a raised weight to be used to exert a force against a relatively incompressible fluid. It is often used to store fluid under high pressure or to absorb excessive pressure increase. Thus, when a fluid system, e.g., a hydraulic system, demands a supply of fluid exceeding the supply capacity of a pump system, typically within a relatively short responsive time, pressurized fluid can be promptly provided according to a command of the system. In this way, operating pressure and/or flow of the fluid in the system do not drop below a required minimum value. However, storage devices other than an accumulator may be used as long as needed fluid can be provided from the storage device or storage devices to the pump and/or returned from the pump to the storage device or storage devices.

The accumulator may be a pressure accumulator. This type of accumulator may include a piston, diaphragm, bladder, or member. Typically, a contained volume of a suitable gas, a spring, or a weight is provided such that the pressure of hydraulic fluid in the accumulator increases as the quantity of hydraulic fluid stored in the accumulator increases. However, the type of accumulator in the present disclosure is not limited to the pressure accumulator. The type of accumulator can vary without departing from the scope of the present disclosure.

Figure 11:
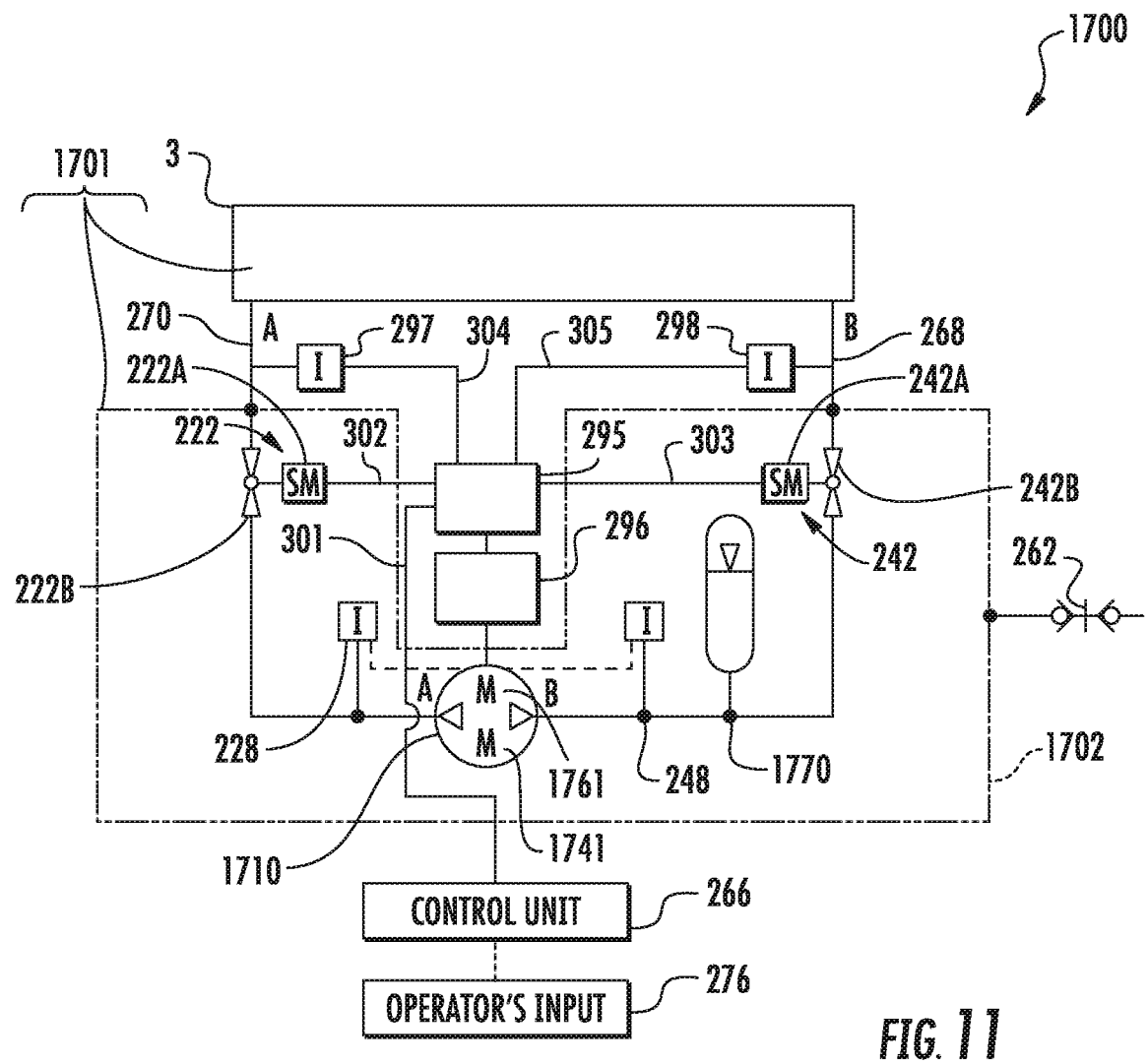
FIG. 11 is a schematic diagram illustrating an exemplary embodiment of a fluid system in a fluid-driven actuator application.

FIG. 11 illustrates an exemplary schematic of a fluid-driven system 1700 that includes liner actuator assembly 1701 having a pump assembly 1702 and hydraulic actuator 3. The pump assembly 1702 includes pump 1710, proportional control valve assemblies 222 and 242 and storage device 1770. The configuration of pump 1710 and storage device 1770 is not limited to any particular drive-drive configuration and can be any one of the exemplary embodiments discussed above. For purposes of brevity, the fluid system will be described in terms of an exemplary hydraulic system application. However, those skilled in the art will understand that the concepts and features described below are also applicable to systems that pump other (non-hydraulic) types of fluid systems. Although shown as part of pump assembly 1702, in some embodiments, the proportional control valve assemblies 222 and 242 can be separate external devices. In some embodiments, the fluid-driven system 1700 can include only one proportional control valve, e.g., in a system where the pump is not bi-directional. In some embodiments, the fluid-driven system 1700 will include lock or isolation valves shown) for the pump assembly 1702 and/or the hydraulic actuator 3. The fluid-driven system 1700 can also include sensor assemblies 297, 298. Further, in addition to sensor assemblies 297, 298 or in the alternative, the pump assembly 1702 can include sensor assemblies 228 and 248, if desired. In the exemplary embodiment of FIG. 11, the hydraulic cylinder assembly 3 and the pump assembly 1702 can be integrated into a liner actuator assembly 1701 as discussed above. However, the components that make up fluid-driven actuator assembly 1701, including the components that make up pump assembly 1702, can be disposed separately if desired, using hoses and pipes to provide the interconnections.

In an exemplary embodiment, the pump 1710 is a variable speed, variable torque pump. In some embodiments, the hydraulic pump 1710 is bi-directional. The proportional control valve assemblies 222, 242 each include an actuator 222A, 242A and a control valve 222B, 242B that are used in conjunction with the pump 1710 to control the flow or pressure during the operation. That is, during the hydraulic system operation, in some embodiments, the control unit 266 will control the speed and/or torque of the motor or motors in pump 1710 while concurrently controlling an opening of at least one of the proportional control valves 222B, 242B to adjust the flow and/or pressure in the hydraulic system. In some embodiments, the actuators 222A and 242A are servomotors that position the valves 222B and 242B to the required opening. The servomotors can include linear motors or rotational motors depending on the type of control valve 222B, 242B. In some embodiments, the servomotors include encoders to provide position feedback of the actuators and/or valves.

In the system of FIG. 11, the control valve assembly 242 is disposed between port B of the hydraulic pump 1710 and port B of the hydraulic actuator 3 and the second control valve assembly 222 is disposed between port A of the hydraulic pump 1710 and port A of the hydraulic actuator 3. The control valve assemblies are controlled by the control unit 266 via the drive unit 295. The control valves 222B, 242B can be commanded to go full open, full closed, or throttled between 0% and 100% by the control unit 266 via the drive unit 295 using the corresponding communication connection 302, 303. In some embodiments, the control unit 266 can communicate directly with each control valve assembly 222, 242 and the hydraulic pump 1710. The proportional control valve assemblies 222, 242 and hydraulic pump 1710 are powered by a common power supply 296. In some embodiments, the pump 1710 and the proportional control valve assemblies 222, 242 can be powered separately or each valve assembly 222, 242 and pump 1710 can have its own power supply.

The fluid-driven system 1700 can include one or more process sensors therein. For example sensor assemblies 297 and 298 can include one or more sensors to monitor the system operational parameters. The sensor assemblies 297, 298 can communicate with the control unit 266 and/or drive unit 295. Each sensor assembly 297, 298 can include at least one of a pressure transducer, a temperature transducer, and a flow transducer (i.e., any combination of the transducers therein). Signals from the sensor assemblies 297, 298 can be used by the control unit 266 and/or drive unit 295 for monitoring and for control purposes. The status of each valve assembly 222, 242 (e.g., the operational status of the control valves such as open, closed, percent opening, the operational status of the actuator such as current/power draw, or some other valve/actuator status indication) and the process data measured by the sensors in sensor assemblies 297, 298 (e.g., measured pressure, temperature, flow rate or other system parameters) may be communicated to the drive unit 295 via the respective communication connections 302-305. Alternatively or in addition to sensor assemblies 297 and 298, the pump assembly 1702 can include integrated sensor assemblies to monitor system parameters (e.g., measured pressure, temperature, flow rate or other system parameters). For example, as shown in FIG. 11, sensor assemblies 228 and 248 can be disposed adjacent to the ports of pump 1710 to monitor, e.g., the pump's mechanical performance. The sensors can communicate directly with the pump 1710 as shown in FIG. 11 and/or with drive unit 295 and/or control unit 266 (not shown).

The motors of pump 1710 are controlled by the control unit 266 via the drive unit 295 using communication connection 301. In some embodiments, the functions of drive unit 295 can be incorporated into one or both motors (e.g., a controller module disposed on the motor) and/or the control unit 266 such that the control unit 266 communicates directly with one or both motors. In addition, the valve assemblies 222, 242 can also be controlled (e.g., open/close, percentage opening) by the control unit 266 via the drive unit 295 using communication connections 301, 302, and 303. In some embodiments, the functions of drive unit 295 can be incorporated into the valve assemblies 222, 242 (e.g., a controller module in the valve assembly) and/or control unit 266 such that the control unit 266 communicates directly with valve assemblies 222, 242. The drive unit 295 can also process the communications between the control unit 266 and the sensor assemblies 297, 298 using communication connections 304 and 305 and/or process the communications between the control unit 266 and the sensor assemblies 228, 248 using communication connections (not shown). In some embodiments, the control unit 266 can be set up to communicate directly with the sensor assemblies 228, 248, 297 and/or 298. The data from the sensors can be used by the control unit 266 and/or drive unit 295 to control the motors of pump 1710 and/or the valve assemblies 222, 242. For example, based on the process data measured by the sensors in sensor assemblies 228, 248, 297, 298, the control unit 266 can provide command signals to control a speed and/or torque of the motors in the pump 1710 and concurrently provide command signals to the valve actuators 222A, 242A to respectively control an opening of the control valves 222B, 242B in the valve assemblies 222, 242.

The drive unit 295 includes hardware and/or software that interprets the command signals from the control unit 266 and sends the appropriate demand signals to the motors and/or valve assemblies 222, 242. For example, the drive unit 295 can include pump and/or motor curves that are specific to the hydraulic pump 1710 such that command signals from the control unit 266 will be converted to appropriate speed/torque demand signals to the hydraulic pump 1710 based on the design of the hydraulic pump 1710. Similarly, the drive unit 295 can include valve curves that are specific to the valve assemblies 222, 242 and the command signals from the control unit 266 will be converted to the appropriate demand signals based on the type of valve. The pump/motor and/or the valve curves can be implemented in hardware and/or software, e.g., in the form of hardwire circuits, software algorithms and formulas, or some other hardware and/or software system that appropriately converts the demand signals to control the pump/motor and/or the valve. In some embodiments, the drive unit 295 can include application specific hardware circuits and/or software (e.g., algorithms or any other instruction or set of instructions executed by a micro-processor or other similar device to perform a desired operation) to control the motors and/or proportional control valve assemblies 222, 242. For example, in some applications, the hydraulic actuator 3 can be a hydraulic cylinder 3' which can be installed on a boom of an excavator. In such an exemplary system, the drive unit 295 can include circuits, algorithms, protocols (e.g., safety, operational or some other type of protocols), look-up tables, or some other application data that are specific to the operation of the boom. Thus, a command signal from the control unit 266 can be interpreted by the drive unit 295 to appropriately control the motors of pump 1710 and/or the openings of control valves 222B, 222B to position the boom at a required positon or move the boom at a required speed.

The control unit 266 can receive feedback data from the motors. For example, the control unit 266 can receive speed or frequency values, torque values, current and voltage values, or other values related to the operation of the motors. In addition, the control unit 266 can receive feedback data from the valve assemblies 222, 242. For example, the control unit 266 can receive feedback data from the proportional control valves 222B, 242B and/or the valve actuators 222A, 242A. For example, the control unit 266 can receive the open and close status and/or the percent opening status of the control valves 222B, 242B. In addition, depending on the type of valve actuator, the control unit 266 can receive feedback such as speed and/or the position of the actuator and/or the current/power draw of the actuator. Further, the control unit 266 can receive feedback of process parameters such as pressure, temperature, flow, or some other process parameter. As discussed above, each sensor assembly 228, 248, 297, 298 can have one or more sensors to measure process parameters such as pressure, temperature, and flow rate of the hydraulic fluid. The illustrated sensor assemblies 228, 248, 297, 298 are shown disposed next to the hydraulic actuator 3 and the pump 1710. However, the sensor assemblies 228, 248, 297 and 298 are not limited to these locations. Alternatively, or in addition to sensor assemblies 228, 248, 297, 298, the system 1700 can have other sensors throughout the system to measure process parameters such as, e.g., pressure, temperature, flow, or some other process parameter. While the range and accuracy of the sensors will be determined by the specific application, it is contemplated that hydraulic system application with have pressure transducers that range from 0 to 5000 psi with the accuracy of +/−0.5%. These transducers can convert the measured pressure to an electrical output, e.g., a voltage ranging from 1 to 5 DC voltages. Similarly, temperature transducers can range from −4 deg. F. to 300 deg. F., and flow transducers can range from 0 gallons per minute (gpm) to 160 gpm with an accuracy of +/−1% of reading. However, the type, range and accuracy of the transducers in the present disclosure are not limited to the transducers discussed above, and the type, range and/or the accuracy of the transducers can vary without departing from the scope of the present disclosure.

Although the drive unit 295 and control unit 266 are shown as separate controllers in FIG. 11, the functions of these units can be incorporated into a single controller or further separated into multiple controllers (e.g., the motors in pump 1710 and proportional control valve assemblies 222, 242 can have a common controller or each component can have its own controller). The controllers (e.g., control unit 266, drive unit 295 and/or other controllers) can communicate with each other to coordinate the operation of the proportional control valve assemblies 222, 242 and the hydraulic pump 1710. For example, as illustrated in FIG. 11, the control unit 266 communicates with the drive unit 295 via a communication connection 301. The communications can be digital based or analog based (or a combination thereof) and can be wired or wireless (or a combination thereof). In some embodiments, the control system can be a "fly-by-wire" operation in that the control and sensor signals between the control unit 266, the drive unit 295, the valve assemblies 222, 242, hydraulic pump 1710, sensor assemblies 297, 298 are entirely electronic or nearly all electronic. That is, the control system does not use hydraulic signal lines or hydraulic feedback lines for control, e.g., the actuators in valve assemblies 222, 242 do not have hydraulic connections for pilot valves. In some exemplary embodiments, a combination of electronic and hydraulic controls can be used.

In the exemplary system of FIG. 11, when the control unit 266 receives a command to operate the load 300 (see FIG. 1), for example in response to an operator's command, the control unit 266 controls the speed and/or torque of the pump 1710 to transfer pressurized fluid a port of the hydraulic actuator 3 (e.g., transfer fluid to port A of the hydraulic actuator) and receive fluid form the other port of the hydraulic actuator 3 (e.g., receive fluid form port B of the hydraulic actuator). During this operation of the pump 1710, the pressure in the port B side of the pump 1710 can become lower than that of the storage device (i.e. pressurized vessel) 1770. When this happens, the pressurized fluid stored in the storage device 1770 is released to the port B side of the system so that the pump does not experience cavitation. The amount of the pressurized fluid released from the storage device 1770 can correspond to a difference in volume between the retraction and extraction chambers 7, 8 due to, e.g., the volume the piston rod occupies in the retraction chamber 7 if hydraulic actuator 3 is a hydraulic cylinder 3', changes in volume due to fluid temperature changes, or for some other reason.

The control unit 266 may receive inputs from an operator's input unit 276. Input unit 276 can be, e.g., the control panel of an industrial machine such as, e.g., an excavator. The control panel can include user interfaces that allow the operator to communicate with the control unit 266. For example, the control panel can include digital and/or analog displays such as, e.g., LEDs, liquid crystal displays, CRTs, touchscreens, meters, and/or another type of display which communicate information to the operator via a textual and/or graphical user interface (GUI), indicators (e.g., on/off LEDs, bulbs) and any combination thereof; and digital and/or analog input devices such as, e.g., touchscreens, pushbuttons, dials, knobs, levers, joysticks and/or other similar input devices; a computer terminal or console with a keyboard, keypad, mouse, trackball, touchscreen or other similar input devices; a portable computing device such as a laptop, personal digital assistant (PDA), cell phone, digital tablet or some other portable device; or a combination thereof. Using the input unit 276, the operator can manually control the system or select pre-programmed routines. For example, if the equipment to be operated is a backhoe, the operator an input the work or task to be performed such as e.g., digging, drilling, removing debris or some other functions of the backhoe; the environment in which the work will be performed, e.g., rocky terrain, sandy terrain or other characteristic of the environment; or some other input related to the operation to be performed. Of course, the type of task to be performed will depend on the type of equipment being operated. As seen in FIG. 1, the control unit 266 can include an engine control module 267 to control, e.g., the diesel/gasoline engine, the backhoe drive control (e.g., forward, reverse, steering) and other non-hydraulic related functions, and a hydraulic control module 268 to control the hydraulic functions such as, e.g., controlling the hydraulic cylinders and hydraulic-driven motors and related equipment on the backhoe. The engine control module 267 and the hydraulic control module 268 can be implemented in, e.g., hardware and/or algorithms and/or programming code executable by a processor. With respect to the hydraulics, the control unit 266 (e.g., hydraulic control module 268) can interpret the inputs from the input unit 276 and determines operational parameters for hydraulics for the task. For example, the control unit 266 can display information related to the machine specifications, e.g., running operational values and/or ranges for the hydraulic pressure, flow, temperature or other parameter; maximum limit values and/or ranges for the hydraulic parameters and/or any other information related to performing the selected task. The control unit 266 can also do preoperational checks such as, e.g., performing safety protocols on, e.g., the hydraulic system to ensure the pump 10 and valves 222, 242 are operating within limits and other preoperational checks. In some embodiments, the control unit 266 can determine the run-time remaining on the components, including the hydraulic pump 10 and valves 222, 242, before maintenance, repair or a replacement needs to be performed.

Based on the task selected by the operator, the control unit 266 can determine the optimum mode of operation for the task. For example, the control unit 266 (or the operator) can select a mode of operation for the system such as flow (or speed) mode, pressure (or torque) mode, or a balanced mode. Flow or speed mode can be utilized for an operation where relatively fast response of the hydraulic actuator 3 with a relatively low torque requirement is required, e.g., a relatively fast retraction or extraction of a piston rod 6 in the hydraulic cylinder 3' or a relatively fast rotation of the hydraulic motor 3". Conversely, a pressure or torque mode can be utilized for an operation where a relatively slow response of the hydraulic actuator 3 with a relatively high torque requirement is required. Preferably, the motors of pump 1710 (see FIG. 11) are variable speed/variable torque and bi-directional. Based on the mode of operation selected, the control scheme for controlling the motors of pump 1710 and the control valves 222B, 242B of proportional control valve assemblies 222, 242 can be different. That is, depending on the desired mode of operation, e.g., as set by the operator or as determined by the system based on the application (e.g., a hydraulic boom application or another type of hydraulic or fluid-operated actuator application), the flow and/or pressure to the hydraulic actuator 3 can be controlled to an operational set-point value by controlling either the speed or torque of the motors of pump 1710 and/or the opening of control valves 222B, 242B. The operation of the control valves 222B, 242B and pump 1710 are coordinated such that both the opening of the control valves 222B, 242B and the speed/torque of the motors of the pump 10 are appropriately controlled to maintain a desired flow/pressure in the system. For example, in a flow (or speed) mode operation, the control unit 266/drive unit 295 controls the flow in the system by controlling the speed of the motors of the pump 10 in combination with the opening of the control valves 222B, 242B, as described below. When the system is in a pressure (or torque) mode operation, the control unit 266/drive unit 295 controls the pressure at a desired point in the system, e.g., at port A or B of the hydraulic actuator 3, by adjusting the torque of the motors of the pump 1710 in combination with the opening of the control valves 222B, 242B, as described below. When the system is in a balanced mode of operation, the control unit 266/drive unit 295 takes both the system's pressure and hydraulic flow rate into account when controlling the motors of the pump 1710 and the control valves 222B, 242B. Thus, based on the mode of operation selected, the control scheme for controlling the motors can be different.

By controlling the speed, the pump 1710 is not run continuously at a high rpm as in conventional systems. Thus, the temperature of the fluid remains relatively low thereby eliminating the need for a large fluid reservoir such as those found in conventional systems. In addition, the use of proportional control valve assemblies 222, 242 in combination with controlling the pump 1710 provides for greater flexibility in control of the system. For example, concurrently controlling the combination of control valves 222B, 242B and the motors of the pump 1710 provides for faster and more precise control of the hydraulic system flow and pressure than with the use of a hydraulic pump alone. When the system requires an increase or decrease in the flow, the control unit 266/drive unit 295 will change the speeds of the motors of the pump 1710 accordingly. However, due to the inertia of the hydraulic pump 1710 and the fluid-driven system 1700, there can be a time delay between when the new flow demand signal is received by the motors of the pump 1710 and when there is an actual change in the fluid flow. Similarly, in pressure/torque mode, there can also be a time delay between when the new pressure demand signal is sent and when there is an actual change in the system pressure. When fast response times are required, the control valves 222B, 242B allow for the fluid-driven system 1700 to provide a near instantaneous response to changes in the flow/pressure demand signal. In some systems, the control unit 266 and/or the drive unit 295 can determine and set the proper mode of operation (e.g., flow mode, pressure mode, balanced mode) based on the application and the type of operation being performed. In some embodiments, the operator initially sets the mode of operation but the control unit 266/drive unit 295 can override the operator setting based on, e.g., predetermined operational and safety protocols.

As indicated above, the control of hydraulic pump 1710 and proportional control valve assemblies 222, 242 will vary depending on the mode of operation. Exemplary embodiments of controlling the pump and control valves in the various modes of operation are discussed below.

In pressure/torque mode operation, the power output the motors of the pump 1710 is determined based on the system application requirements using criteria such as maximizing the torque of the motors of the pump 1710. If the hydraulic pressure is less than a predetermined set-point at, for example, port A of the hydraulic actuator 3, the control unit 266/drive unit 295 will increase the torque of the motors of the pump 1710 to increase the hydraulic pressure, e.g., by increasing the motor's current (and thus the torque). Of course, the method of increasing the torque will vary depending on the type of prime mover. If the pressure at port A of the hydraulic actuator 3 is higher than the desired pressure, the control unit 266/drive unit 295 will decrease the torque from the motors of the pump 1710, e.g., by decreasing the motor's current (and thus the torque), to reduce the hydraulic pressure. While the pressure at port A of the hydraulic actuator 3 is used in the above-discussed exemplary embodiment, pressure mode operation is not limited to measuring the pressure at that location or even a single location. Instead, the control unit 266/drive unit 295 can receive pressure feedback signals from any other location or from multiple locations in the system for control. Pressure/torque mode operation can be used in a variety of applications. For example, if there is a command to extend (or extract) the hydraulic cylinder 3' or drive the hydraulic motor 3" with more torque, the control unit 266/drive unit 295 will determine that an increase in pressure at the inlet to the hydraulic actuator 3 (e.g., port A) is needed and will then send a signal to the motors of the pump 1710 and to the control valve assemblies 222, 242 that results in a pressure increase at the inlet to the extraction chamber.

In pressure/torque mode operation, the demand signal to the hydraulic pump 1710 will increase the current to the motors driving the gears of the hydraulic pump 1710, which increases the torque. However, as discussed above, there can be a time delay between when the demand signal is sent and when the pressure actually increases at, e.g., port A of the hydraulic actuator 3. To reduce or eliminate this time delay, the control unit 266/drive unit 295 will also concurrently send (e.g., simultaneously or near simultaneously) a signal to one or both of the control valve assemblies 222, 242 to further open (i.e. increase valve opening). Because the reaction time of the control valves 222B, 242B is faster than that of the pump 1710 due to the control valves 222B, 242B having less inertia, the pressure at the hydraulic actuator 3 will immediately increase as one or both of the control valves 222B, 242B starts to open further. For example, if port A of the hydraulic pump 10 is the discharge of the pump 1710, the control valve 222B can be operated to immediately control the pressure at port A of the hydraulic actuator 3 to a desired value. During the time the control valve 222B is being controlled, the motors of the pump 1710 will be increasing the pressure at the discharge of the pump 1710. As the pressure increases, the control unit 266/drive unit 295 will make appropriate corrections to the control valve 222B to maintain the desired pressure at port A of the hydraulic actuator 3.

In some embodiments, the control valve on the downstream of the hydraulic pump 10, i.e., the valve on the discharge side, will be controlled while the valve on the upstream side remains at a constant predetermined valve opening, e.g., the upstream valve can be set to 100% open (or near 100% or considerably high percent of opening) to minimize fluid resistance in the hydraulic lines. In the above example, the control unit 266/drive unit 295 can throttle (or control) the control valve 222B (i.e. downstream valve) while maintaining the control valve 242B (i.e. upstream valve) at a constant valve opening, e.g., 100% open.

In some embodiments, the upstream valve of the control valves 222B, 242B can also be controlled, e.g., in order to eliminate or reduce instabilities in the fluid-driven system 1700 or for some other reason. For example, as the hydraulic actuator 3 is used to operate a load, the load could cause flow or pressure instabilities in the fluid-driven system 3 (e.g., due to mechanical problems in the load, a shift in the weight of the load, or for some other reason). The control unit 266/drive unit 295 can be configured to control the control valves 222B, 242B to eliminate or reduce the instability. For example, if, as the pressure is being increased to the hydraulic actuator 3, the actuator 3 starts to act erratically (e.g., the hydraulic cylinder or hydraulic motor starts moving too fast or some other erratic behavior) due to an instability in the load, the control unit 266/drive unit 295 can be configured to sense the instability based on the pressure and flow sensors and to close one or both of the control valves 222B, 242B appropriately to stabilize the fluid-driven system 1710. Of course, the control unit 266/drive unit 295 can be configured with safeguards so that the upstream valve does not close so far as to starve the hydraulic pump 1710.

In some situations, the pressure at the hydraulic actuator 3 is higher than desired, which can mean that the actuator 3 will extend or retract too fast or the actuator 3 will extend or retract when it should be stationary. Of course, in other types of applications and/or situations a higher than desired pressure could lead to other undesired operating conditions. In such cases, the control unit 266/drive unit 295 can determine that there is too much pressure at the appropriate port of the hydraulic actuator 3. If so, the control unit 266/drive unit 295 will determine that a decrease in pressure at the appropriate port of the hydraulic actuator 3 is needed and will then send a signal to the pump 1710 and to the proportional control valve assemblies 222B, 242B that results in a pressure decrease. The pump demand signals to the hydraulic pump 1710 will decrease, and thus will reduce the current to the respective motors 1741, 1761, which decreases the torque. However, as discussed above, there can be a time delay between when the demand signal is sent and when the pressure at the hydraulic actuator 3 actually decreases. To reduce or eliminate this time delay, the control unit 266/drive unit 295 will also concurrently send (e.g., simultaneously or near simultaneously) a signal to one or both of the control valve assemblies 222, 242 to further close (i.e. decrease valve opening). The valve positon demand signal to at least the downstream controller will decrease, and thus reducing the opening of the downstream control valve and the pressure to the hydraulic actuator 3. Because the reaction time of the control valves 222B, 242B will be faster than that of the motors 1741, 1761 of the pump 1710 due to the control valves 222B, 242B having less inertia, the pressure at the appropriate port of the hydraulic actuator 3 will immediately decrease as one or both of the control valves 222B, 242B starts to close. As the pressure starts to decrease due to the speed of the pump 1710 decreasing, one or both of the control valves 222B, 242B will start to open to maintain the pressure setpoint at the appropriate port of the hydraulic actuator 3. The control valves 222, 242 can be operated in a range that allows for travel in either direction in order to allow for a rapid increase or decrease in the flow or the pressure at the hydraulic actuator 3. For example, the control system can be configured such that the downstream control valve is less than 100%, e.g., 85%, during steady-state operation.

An exemplary control system that allows for each mode of operation is discussed below with reference to FIG. 12. However, those skilled in the art understand that the features of the control system described below can be implemented using circuits and modules other than the ones discussed below. In addition, for brevity, the description of the control system is given in terms of the prime movers of fluid drivers 1740, 1760 being electric motors 1741, 1761 and the control valves 222, 242 being servo control valves. However, those skilled in the art would understand that the inventive control system can be appropriately adapted to prime movers other than electric motors and to control valves other than servo control valves.

As discussed above, the control system 200 can operate the hydraulic system 1 in various modes of operation such as, e.g., pressure/torque mode operation, flow/speed mode operation and balance mode operation. In some embodiments, the pump control circuit 210 and the valve control circuit 220 of the drive unit can include hardware and/or software modules directed to control of the respective devices based on the selected mode, i.e., pressure/torque mode operation, flow/speed mode operation and balance mode operation. For example, as seen in FIG. 12, mode control module 1240 pump control circuit 210 can select between three modes of operation based on a mode select input: pressure/torque mode operation, flow/speed mode operation and balance mode operation. The mode control module 1240 can be a physical switch, e.g., a pushbutton, knob, dial, lever or some other physical device, a software switch such as a program or algorithm that selects the appropriate mode based on the input, or a combination thereof. The mode select input can be a user input and/or determined by the control unit 266 and/or drive unit 295 based on, e.g., the operating conditions. For example, if an operator on an industrial machine selects an operation to be performed such as lowering the load in a bucket of a boom to the ground, the operator or control system 200 can determine that the operation occur at a certain safe speed and control the pump and controls valves in flow/speed mode operation. Based on the selected mode of operation, the output of the pump pressure controller module 1210, the pump flow controller module 1220 or the pump pressure-feedback controller module 1230 is selected for control of the pump 1710. Of course, the pump control circuit 210 can be part of the control unit 266 or some other controller.

Similar to the pump control circuit 210, the valve control circuit 220 can include a mode control module 1245 (see FIG. 12A) can select between pressure/torque mode operation, flow/speed mode operation and balance mode operation. The mode control module 1245 can be a physical switch, e.g., a pushbutton, knob, dial, lever or some other physical device, a software switch such as a program or algorithm that selects the appropriate mode based on the input, or a combination thereof. The mode select input can be a user input and/or determined by the control unit 266 and/or drive unit 295 based on, e.g., the operating conditions similar to mode select switch 1240 discussed above. In some embodiments, as shown in FIG. 12A, the valve flow controller 1225 is a common controller used for both the flow/speed mode operation and the balance mode operation. Accordingly, the mode control module 1245 selects between two positions based on the mode select input: one for the pressure/torque mode of operation and the other for the flow/speed mode operation and the balance mode operation. Based on the mode of operation, the output of the valve pressure controller module 1215 or the valve flow controller module 1225 is selected for control of the control valves 222, 242. Of course, the valve control circuit 220 can be part of the control unit 266 or some other controller. Operation of the pump motors 1741, 1761 and the control valves 222, 242 in each of the modes is discussed below. As discussed above, based on the task being performed, the operator and/or the control unit 266, (e.g., the hydraulic control module 268) selects the mode of operation that is appropriate for the task and provides the setpoints (e.g., pressure and temperature) for the pump and valve circuits 210, 220.

In pressure/torque mode operation, a pressure setpoint signal 1211 is input to the pump pressure controller module 1210 to control the motors 1741, 1761 of fluid drivers 1740, 1760, respectively. If the system requires a change in pressure, the pressure setpoint 1211 to the pump pressure controller module 1210 is changed appropriately. The pump pressure controller module 1210 outputs a signal 1213 based on the received pressure setpoint 1211. For example, the pump pressure controller module 1210 can be a proportional controller and the pump pressure controller output signal 1213 can be proportional to the received pressure setpoint 1211. As an example, a pressure setpoint range of 1000 psi to 5000 psi or 2,500 to 10,000 psi can correspond to a pump control output signal of 25% to 100% depending on the system and pump characteristics. Of course, in exemplary embodiments of the present disclosure, the pump pressure control module 1210 is not limited to a proportional controller but can include controllers with non-linear functions, step functions and/or some other function relating the input pressure setpoint to the output signal to the pump motors. In some embodiments, the function determining the pump pressure controller output signal 1213 can be based on factors such as the magnitude of the pressure setpoint, the type of application for the linear actuator assembly, feedback of the operating pressure, the type of fluid being pumped and/or some other operational parameter. In some embodiments, the pump controller output signal 1213 is sent to pump motion controller 230 via mode controller module 1240 as shown in FIG. 12. However, in some exemplary embodiments, the pump pressure controller output signal 1213 is sent to a pump characteristic module that modifies or conditions the pump pressure controller output signal 1213 based on the characteristics of the pump being controlled, e.g., the pump's mechanical performance curves and/or the pump's electrical motor curves. The pump characteristic module can be implemented as a hardware circuit, e.g., using amplifiers, limiters, offset circuits, and/or another electrical component, and/or implemented in software, e.g., using algorithms, look-up tables, datasets, or some other software implementation, to appropriately modify or condition the pump pressure controller output signal 1213. In some embodiments, all or part of the functions of the pump characteristics module can be incorporated in the pump pressure controller module 1210, in the motion controller 230 or in the respective motor controllers 1270, 1280. In some exemplary embodiments, each fluid driver can have its own pump characteristic module, e.g., to account for any differences in each pump's motor curves. However, in some embodiments, only one pump characteristic module can be used. The outputs of the motion controller 230 are sent as the pump demand signals to the respective fluid drivers 1740, 1760, e.g., as a current/torque demand for the pump. The function of motion controller 230 is discussed below. For example, pump demand signals 1251A and 1251B can be respectively sent directly to motor controllers 1270 and 1280. The motor controllers 1270 and 1280 receive the demand signals 1251A and 1251B, which can be low voltage and/or low current signals, e.g., in a range of 0 to 10 volts, 0-20 mA, or some other low voltage/current range, that represent the required current to be sent to the motors (and thus control the torque) and then output the required current to the motors. For example, the 0 to 10 volts or 0 to 20 mA can represent 0 to 100% of the motor current. Power supply 296 (see FIG. 11) or another source of power can supply the necessary power to motor controllers 1270 and 1280 so that the controllers 1270 and 1280 can output the required current to drive the motors. The motor controllers 1270, 1280 can include the hardware such as inverters, IGBT switches, SCRs and associated controllers to output the required current to the motors based on the demand signals 1251A, 1251B. Variable-speed motor controllers are known to those skilled in the art and can be "off-the-shelf" products. Thus, for brevity, the configuration of the variable-speed motor controllers will not be further discussed.

In exemplary embodiments of the present disclosure, the pressure setpoint signal 1211 is also sent to the valve control circuit 220 in order to concurrently control an opening of one or both of the control valves 222, 242. As seen in FIG. 12A, in pressure mode operation, the pressure setpoint 1211 is input to valve pressure controller module 1215. In addition, a pressure feedback signal 1217 is also input to the valve pressure controller module 1215. The valve pressure controller module 1215 performs a comparison between the pressure setpoint 1211 and the pressure feedback signal 1217 and outputs a valve pressure controller output signal 1216 based on the comparison. In exemplary embodiments of the present disclosure, the valve pressure controller module 1215 can be a proportional-integral-derivative (MD) controller, a proportional-integral (PU controller, a proportional controller or another type of controller that provides a response based on the difference between the pressure setpoint 1211 and the pressure feedback signal 1217, such as, e.g., a controller where the valve controller output signal 1216 is based on a non-linear function, a step function or some other function. In some embodiments, the function determining the valve pressure controller output signal 1216 can be based on factors such as the magnitude of the pressure setpoint, the type of application for the linear actuator assembly, the type of fluid being pumped and/or some other operational parameter. In some embodiments, e.g., as shown in FIG. 12A, in pressure/torque control mode, the mode control module 1245 sends the valve pressure controller output signal 1216 to a summer module 1247 that uses the valve controller output signal 1216 to modify or condition a downstream valve positon signal 1246. The downstream valve position signal 1246 can be an initial positon demand for the downstream valve.

In some exemplary embodiments, the downstream valve position signal 1246 can be set to ensure that there is sufficient reserve capacity to provide a fast flow response when desired. For example, the downstream control valve with respect to the hydraulic pump 10 can be operated at a percent opening that is less than 100%, i.e., at a throttled position. That is, the downstream control valve can be set to operate at, e.g., 85% of full valve opening. This throttled position allows for 15% valve travel in the open direction to rapidly increase flow to or pressure at the appropriate port of the hydraulic actuator 3 when needed. Of course, the control valve setting is not limited to 85% and the control valves 222, 242 can be operated at any desired percentage. In some embodiments, the downstream valve position signal 1246 can be set to operate at a percent opening that corresponds to a percent of maximum flow or pressure, e.g., 85% of maximum flow/pressure or some other desired value. While the travel in the closed direction can go down to 0% valve opening to decrease the flow and pressure at the hydraulic actuator 3, to maintain system stability, the valve travel in the closed direction can be limited to, e.g., a percent of valve opening and/or a percent of maximum flow/pressure. For example, the control unit 266/drive unit 295 can be configured to prevent further closing of the control valves 222, 242 if the lower limit with respect to valve opening or percent of maximum flow/pressure is reached. In some embodiments, the control unit 266/drive unit 295 can limit the control valves 222, 242 from opening further if an upper limit of the control valve opening and/or a percent of maximum flow/pressure has been reached.

As discussed above, the downstream valve position signal 1246 can be a predetermined valve position value that is less than 100%, e.g., 85%, to "reserve" some of the pump capacity during steady-state operations so that the system can immediately respond to increases in the pressure demand. The predetermined valve position value can be a user-settable value or a calculated value based on factors such as the pump demand, type of application (slow/fast acting) or some other factor related to the pressure response in the system. In the embodiment of FIG. 12A, when the pressure setpoint 1211 increases or the value of pressure feedback 1217 decreases, the valve pressure controller module 1215 increases the valve pressure controller output signal 1216. The summer module 1247 adds the increased valve pressure controller output signal 1216 to the downstream positon signal 1246.

The output signal 1248 from the summer module 1247 is then sent to a switch module 1265 as an input. The switch module 1265 also accepts an upstream valve positon demand signal 1249 as a second input. Like the downstream valve positon demand signal, the upstream valve position demand signal 1249 can be a predetermined valve position value that is user-settable or a calculated value based on factors such as the pump demand, type of application (slow/fast acting) or some other factor related to the pressure response in the system. The upstream valve position demand signal 1249 can be a predetermined position value that is, e.g., 100% to minimize fluid resistance in the system or at some other desired value. Based on the direction of rotation of the pump, the switch module 1265 will direct the downstream and upstream valve position signals 1248, 1249, respectively, to the appropriate valve characteristic modules 1255A, 1255B corresponding to control valves 222, 242. For example, in the illustrated embodiment (solid lines), the downstream valve position demand signal 1248 is sent to the valve characteristic module 1255A, which outputs valve demand signal 1266A for control valve 222 and the upstream valve position signal, e.g., 100% or another predetermined valve position, is sent to the valve characteristic module 1255B, which outputs a valve demand signal 1266B for control valve 242. However, as shown with the dotted lines, if the direction of rotation of pump 10 is reversed, the switch module 1265 will send the downstream valve position demand signal 1248 to control valve 242 and the upstream valve position signal 1249 to control valve 222.

The valve characteristic modules 1255A, 1255B modify or condition the valve demand signals 1266A, 1266B from switch module 1265 based on the respective valve characteristics of control valves 222, 242. For example, the valve characteristic modules 1255A, 1255B can be configured to account for flow/pressure characteristics that are specific to the type of control valve used in the control valve assemblies, e.g., ball valves or some other type of control valves. The valve characteristic module can be implemented as a hardware circuit, e.g., using amplifiers, limiters, offset circuits, and/or another electrical component, and/or implemented in software, e.g., using algorithms, look-up tables, datasets, or some other software implementation, to appropriately modify or condition the valve position signals 1266A, 1266B. In some embodiments, a single valve characteristic module can be used. For example, the output signal 1248 from the summer module 1247 can be sent to a common valve characteristic module and the output of the common valve characteristic module can then be sent to the switch module 1265. However, by having two valve characteristic modules, the system will be able to, e.g., account for differences between the two control valves or account for flow/pressure differences in the system when one or the other control valve is the downstream valve. The outputs of the valve characteristic modules 1255A, 1255B are then sent to the respective valve actuators 222A, 242B, which can be servomotor controllers that position the control valve portions 222B, 242B. The servomotors can be linear or rotatory motors depending on the type of valve. The servomotors can include encoders that provide feedback of the valve position and/or the valve travel speed. The encoders can be optical encoders, magnetic encoders or another type of encoder that can measure the positon and/or travel speed of the valve. Of course, exemplary embodiments of the present invention are not limited to servomotors and other types actuators can be used such as coil-type actuators, hydraulic-type actuators, pneumatic-type actuators or any combination thereof. Actuators are known to those skilled in the art and thus, for brevity, will not be further discussed.

In operation, when a controller, e.g., controller 266, and/or a user changes the pressure setpoint signal 1211, the pump control circuit 210 will appropriate change the current to the motors 1741, 1761, e.g., as described above. However, due to the inertia of the pump 1710, there will be a delay in seeing the pressure change in the system. Because the pressure setpoint signal 1211 is also sent to the valve control circuit 220, the valve control circuit 220 will concurrently change the position of the downstream valve from its steady-state positon, e.g., increase opening to provide an immediate increase (or nearly immediate increase) in the system pressure or decrease opening to provide an immediate increase (or nearly immediate decrease) in the system pressure. When the pump 1710 overcomes the inertia and the system pressure starts to reach the new setpoint value, the valve pressure controller module 1215 will appropriately change its output and the downstream valve positon will start to move back to 85% to maintain the pressure at the operational setpoint. The pump pressure controller module 1210 is configured such that, when the system reaches steady-state operations, the downstream valve is at a predetermined downstream valve positon 1246, e.g., 85% (for explanation purposes) or some other predetermined value. However, the steady-state position of the downstream control valve need not be the same during all modes of operation. For example, if the operations in the hydraulic system 1700 start to go above 85% of the capacity of the pump 1710, the value of the predetermined downstream valve positon 1246 can also be increased to improve efficiency and limit the stress on the motors 1741, 1761. For example, the value of the predetermined downstream valve positon 1246 can be 85% when the pump demand is below 85% capacity and then change (e.g., a linear ramp, non-linear ramp, a step change) from 85% to 100% (or some other predetermined value) as the pump demand goes from 85% to 100% capacity. In some embodiments, the pump control circuit 210 can receive a positon feedback from the downstream control valve to modify, e.g., the output signal 1213 from pump pressure controller module 1210 such that the downstream control valve maintains its predetermined downstream valve position value, e.g., 85% or some other predetermined positon, during steady-state operation. This adjustment may be needed if the downstream control valve does not get back to its predetermined position, e.g., 85% or some other predetermined positon, due to a discrepancy between the pump curve and the actual performance of the pump 1710, a degradation of the performance of pump 1710 or for some other reason. For example, if the positon of the downstream valve is 87% during steady state operations and the downstream valve position 1246 is at 85%, the pump control circuit 210 can include a downstream valve position controller, e.g., a PID controller, a PI controller or some other controller, to modify the pump pressure controller output signal 1213 as needed (in this case increase the value of the output signal 1213) until the downstream valve closes to 85%. Of course, the time constant on downstream valve position controller should be such that the operation of the pump control circuit 210 does not adversely affect the operation of the valve control circuit 220, e.g., the time constant should be such that the pump and/or valves do not "hunt" due to interference between the pressure and valve control circuits 210, 220.

In flow/speed mode operation, the power to the motors of the pump 1710 is determined based on the system application requirements using criteria such as how fast the motors of the pump 1710 ramp to the desired speed and how precisely the motor speed can be controlled. Because the fluid flow rate is proportional to the speed of motors/gears of the pump 1710 and the fluid flow rate determines an operation of the hydraulic actuator 3 (e.g., the travel speed of the actuator 3 or another appropriate parameter depending on the type of system and type of load), the control unit 266/drive unit 295 can be configured to control the operation of the hydraulic actuator 3 based on a control scheme that uses the speed of motors of the pump 1710, the flow rate, or some combination of the two. That is, when, e.g., a specific response time of hydraulic actuator 3 is required, e.g., a specific travel speed for the hydraulic actuator 3, the control unit 266/drive unit 295 can control the motors of the pump 1710 to achieve a predetermined speed and/or a predetermined hydraulic flow rate that corresponds to the desired specific response of hydraulic actuator 3. For example, the control unit 266/drive unit 295 can be set up with algorithms, look-up tables, datasets, or another software or hardware component to correlate the operation of the hydraulic actuator 3 (e.g., travel speed of the hydraulic cylinder 3' or the rotational speed of the hydraulic motor 3") to the speed of the hydraulic pump 1710 and/or the flow rate of the hydraulic fluid in the system 1700. Thus, if the system requires that the hydraulic actuator 3 move the load in a predetermined time period, e.g., at a desired linear speed or r.p.m., the control unit 266/drive unit 295 can be set up to control either the speed of the motors of the pump 1710 or the hydraulic flow rate in the system to achieve the desired operation of the hydraulic actuator 3.

If the control scheme uses the flow rate, the control unit 266/drive unit 295 can receive a feedback signal from a flow sensor, e.g., a flow sensor in one or more of sensor assemblies 228, 248, 297, 298, to determine the actual flow in the system. The flow in the system can be determined by measuring, e.g., the differential pressure across two points in the system, the signals from an ultrasonic flow meter, the frequency signal from a turbine flow meter, or some other flow sensor/instrument. Thus, in systems where the control scheme uses the flow rate, the control unit 266/drive unit 295 can control the flow output of the hydraulic pump 1710 to a predetermined flow set-point value that corresponds to the desired operation of the hydraulic actuator 3 (e.g., the travel speed of the hydraulic actuator 3 or another appropriate parameter depending on the type of system and type of load).

Similarly, if the control scheme uses the motor speed, the control unit 266/drive unit 295 can receive speed feedback signal(s) from the motors of the pump 1710 or the gears of pump 1710. For example, the actual speeds of the motors of the pump 1710 can be measured by sensing the rotation of the fluid displacement member. For the gears, the hydraulic pump 10 can include a magnetic sensor (not shown) that senses the gear teeth as they rotate. Alternatively, or in addition to the magnetic sensor (not shown), one or more teeth can include magnets that are sensed by a pickup located either internal or external to the hydraulic pump casing. Of course the magnets and magnetic sensors can be incorporated into other types of fluid displacement members and other types of speed sensors, such as e.g., encoders, can be used. Thus, in systems where the control scheme uses the flow rate, the control unit 266/drive unit 295 can control the actual speed of the hydraulic pump 1710 to a predetermined speed set-point that corresponds to the desired operation of the hydraulic actuator 3. Alternatively, or in addition to the controls described above, the speed of the hydraulic actuator 3 can be measured directly and compared to a desired travel speed set-point to control the speeds of motors.

If the system is in flow mode operation and the application requires a predetermined flow to hydraulic actuator 3 (e.g., to move a hydraulic cylinder at a predetermined travel speed, rotate a hydraulic motor at a predetermined r.p.m. or some other appropriate operation of the actuator 3 depending on the type of system and the type of load), the control unit 266/drive unit 295 will determine the required flow that corresponds to the desired hydraulic flow rate. If the control unit 266/drive unit 295 determines that an increase in the hydraulic flow is needed, the control unit 266/drive unit 295 and will then send a signal to the hydraulic pump 1710 and to the control valve assemblies 222, 242 that results in a flow increase. The demand signal to the hydraulic pump 1710 will increase the speed of the motors of the pump 1710 to match a speed corresponding to the required higher flow rate. However, as discussed above, there can be a time delay between when the demand signal is sent and when the flow actually increases. To reduce or eliminate this time delay, the control unit 266/drive unit 295 will also concurrently send (e.g., simultaneously or near simultaneously) a signal to one or both of the control valve assemblies 222, 242 to further open (i.e. increase valve opening). Because the reaction time of the control valves 222B, 242B will be faster than that of the motors of the pump 1710 due to the control valves 222B, 242B having less inertia, the hydraulic fluid flow in the system will immediately increase as one or both of the control valves 222B, 242B starts to open. The control unit 266/drive unit 295 will then control the control valves 222B, 242B to maintain the required flow rate. During the time the control valves 222B, 242B are being controlled, the motors of the pump 1710 will be increasing their speed to match the higher speed demand from the control unit 266/drive unit 295. As the speeds of the motors of the pump 1710 increase, the flow will also increase. However, as the flow increases, the control unit 266/drive unit 295 will make appropriate corrections to the control valves 222B, 242B to maintain the required flow rate, e.g., in this case, the control unit 266/drive unit 295 will start to close one or both of the control valves 222B, 242B to maintain the required flow rate.

In some embodiments, the control valve downstream of the hydraulic pump 1710, i.e., the valve on the discharge side, will be controlled by control unit 266/drive unit 295 while the valve on the upstream side remains at a constant predetermined valve opening, e.g., the upstream valve can be set to 100% open (or near 100% or considerably high percent of opening) to minimize fluid resistance in the hydraulic lines. Similar to the pressure mode operation discussed above, in some embodiments, the upstream control valve can also be controlled to eliminate or reduce instabilities in the fluid-driven system 1700 as discussed above.

In some situations, the flow to the hydraulic actuator 3 is higher than desired, which can mean that the actuator 3 will retract too fast or moving when the actuator should be stationary or stopped. Of course, in other types of applications and/or situations a higher than desired flow could lead to other undesired operating conditions. In such cases, the control unit 266/drive unit 295 can determine that the flow to the corresponding port of hydraulic actuator 3 is too high. If so, the control unit 266/drive unit 295 will determine that a decrease in flow to the hydraulic actuator 3 is needed and will then send a signal to the hydraulic pump 1710 and to the control valve assemblies 222, 242 to decrease flow. The pump demand signals to the hydraulic pump 1710 will decrease, and thus will reduce the speed of the respective motors of the pump 1710 to match a speed corresponding to the required lower flow rate. However, as discussed above, there can be a time delay between when the demand signal is sent and when the flow actually decreases. To reduce or eliminate this time delay, the control unit 266/drive unit 295 will also concurrently send (e.g., simultaneously or near simultaneously) a signal to at least one of the control valve assemblies 222, 242 to further close (i.e. decrease valve opening). The valve positon demand signal to at least the downstream servomotor controller will decrease, and thus reducing the opening of the downstream control valve and the flow to the hydraulic actuator 3. Because the reaction time of the control valves 222B, 242B will be faster than that of the motors of the pump 1710 due to the control valves 222B, 242B having less inertia, the system flow will immediately decrease as one or both of the control valves 222B, 242B starts to close. As the speeds of the motors of the pump 1710 start to decrease, the flow will also start to decrease. However, the control unit 266/drive unit 295 will appropriately control the control valves 222B, 242B to maintain the required flow (i.e., the control unit 266/drive unit 295 will start to open one or both of the control valves 222B, 242B as the motor speed decreases). For example, the downstream valve with respect to the hydraulic pump 1710 can be throttled to control the flow to a desired value while the upstream valve is maintained at a constant value opening, e.g., 100% open to reduce flow resistance. If, however, an even faster response is needed (or a command signal to promptly decrease the flow is received), the control unit 266/drive unit 295 can also be configured to considerably close the upstream valve. Considerably closing the upstream valve can serve to act as a "hydraulic brake" to quickly slow down the flow in the fluid-driven system 1700 by increasing the back pressure on the hydraulic actuator 3. Of course, the control unit 266/drive unit 295 can be configured with safeguards so as not to close the upstream valve so far as to starve the hydraulic pump 1710. Additionally, as discussed above, the control valves 222B, 242B can also be controlled to eliminate or reduce instabilities in the fluid-driven system 1700.

An exemplary control system for flow/speed mode is described below. As shown in FIG. 12, in flow/speed mode operation, a flow setpoint signal 1221 is input to the pump flow controller module 1220 that controls the motors 1741, 1761 of fluid drivers 1740, 1760. If the system requires a change in the flow, the flow setpoint 1221 to the pump flow controller module 1220 can be changed. The pump flow controller module 1220 outputs a signal 1223 based on the received flow setpoint 1221. For example, the pump flow controller module 1220 can be a proportional controller and the pump flow controller output signal 1223 can be proportional to the received flow setpoint 1221. As an example, a flow setpoint range of 0 gallons per minute (gpm) to 150 gpm or 0 gpm to 250 gpm, depending on the pressure requirements of the system, can correspond to a pump control output signal of 0% to 100% depending on the system and pump characteristics. Of course, in exemplary embodiments of the present disclosure, the pump flow control module 1220 is not limited to a proportional controller but can include controllers with non-linear functions, step functions and/or some other function relating the input flow setpoint to the output signal to the pump motors. In some embodiments, the function determining the pump flow controller output signal 1223 can be based on factors such as the magnitude of the flow setpoint, the type of application for the linear actuator assembly, feedback of the operating flow, the type of fluid being pumped and/or some other operational parameter. In some embodiments, the pump flow controller output signal 1223 is sent to motion controller 230 via mode controller module 1240 as shown in FIG. 12. As discussed above, in some exemplary embodiments, the pump flow controller output signal 1223 can be sent to a pump characteristic module that modifies or conditions the pump flow controller output signal 1223 based on characteristics of the pump, e.g., the pump's mechanical performance curves and/or the pump's electrical motor curves. Those skilled in the art understand that the processing of the pump flow controller output signal 1223 by the pump control circuit 210 in FIG. 12 will be similar to that of the processing of the pump pressure controller output signal 1213 discussed above. Accordingly, for brevity, the functional description of motion controller 230, which is discussed below, and variable-speed motor controllers 1270 and 1280 as it relates to the processing of output signal 1223 will not be discussed except as needed to explain the present mode of operation. In the flow/speed mode of operation, the pump demand signals to the variable-speed motor controllers 1270, 1280 relate to the speeds of the pump motors 1741, 1761.

In the flow/speed mode of operation, the flow setpoint signal 1221 is also sent to the valve flow control circuit 220 in order to concurrently control an opening of one or both of control valves 222, 242. As seen in FIG. 12A, the flow setpoint signal 1221 is input to valve flow controller module 1225. In addition, a flow feedback signal 1224 is also input to the valve flow controller module 1225. The valve flow controller module 1225 performs a comparison between the flow setpoint 1221 and the flow feedback signal 1224 and outputs a valve flow controller output signal 1226 based on the comparison. In exemplary embodiments of the present disclosure, the valve flow controller module 1225 can be a PID controller, a PI controller, a proportional controller or another type of controller that provides a response based on the difference between the flow setpoint 1221 and the flow feedback signal 1224, such as, e.g., a controller where the valve controller output signal 1226 is based on a non-linear function, a step function or some other function. In some embodiments, the function determining the valve flow controller output signal 1226 can be based on factors such as the magnitude of the flow setpoint, the type of application for the linear actuator assembly, feedback of the operating flow, the type of fluid being pumped and/or some other operational parameter. In some embodiments, e.g., as shown in FIG. 12A, in flow/speed control mode, the mode control module 1245 sends the valve flow controller output signal 1226 to a summer module 1247 that uses the valve flow controller output signal 1226 to modify or condition a downstream valve positon signal 1246. Those skilled in the art understand that the processing of the valve flow controller output signal 1226 and downstream valve position signal 1246 by the valve control circuit 210 will be similar to that of the processing of the valve pressure controller output signal 1216 discussed above. Accordingly, for brevity, the functional description of modules 1247, 1265, 1255A and 1255B and servomotor controllers 222A and 242A as it relates to the processing of output signal 1226 will not be discussed except as needed to explain the present mode of operation. In the flow/speed mode of operation, the valve demand signals to the servomotor controllers 222A, 242A relate to the flow in the system.

In operation, when a controller, e.g., controller 266, or a user changes the flow setpoint signal 1221, the pump control circuit 210 will appropriately change the speed of the motors 1741, 1761, e.g., as described above. However, due to the inertia of the pump 1710, there will be a delay in seeing the flow increase in the system. Because the flow setpoint signal 1221 is also sent to the valve control circuit 220, the valve control circuit 220 will concurrently increase the position of the downstream valve from its steady-state positon, e.g., increase opening to provide an immediate increase (or nearly immediate increase) in the system flow or decrease opening to provide an immediate increase (or nearly immediate decrease) in the system flow. When the motors 1741, 1761 overcome the inertia and the system flow starts to reach the new setpoint value, the valve flow controller module 1225 will appropriately change its output and the downstream valve positon will start to decrease its opening. The valve flow controller module 1225 is configured such that, when the system reaches steady-state operations, the downstream valve is at a predetermined downstream valve positon 1246, e.g., 85% or some other predetermined value. However, the steady-state position of the downstream control valve need not be the same during all modes of operation. For example, if the hydraulic system 1700 operations start to go above 85% of the capacity of the pump 10, the value of the predetermined downstream valve positon 1246 can also increase to improve efficiency and limit the stress on the motors 1741, 1761. For example, the value of the predetermined downstream valve positon 1246 can be 85% when the pump demand is below 85% capacity and then change (e.g., a linear ramp, non-linear ramp, a step change) from 85% to 100% or some other predetermined value as the pump demand goes from 85% to 100% capacity. In some embodiments, the pump control circuit 210 can receive feedback from the downstream control valve to modify, e.g., the output signal 1223 from pump flow controller module 1220 such that the downstream control valve maintains its predetermined downstream valve position value, e.g., 85% in the above exemplary description, during steady-state operation. This adjustment may be needed if the downstream control valve does not get back to its predetermined position, e.g., 85% or some other predetermined positon, due to a discrepancy between the pump curve and the actual performance of the pump 1710, degradation of the performance of pump 10 or for some other reason. For example, if the positon of the downstream valve is 87% during steady state operations and the downstream valve position 1246 is at 85%, the pump control circuit 210 can include a downstream valve position controller, e.g., a PID controller, a PI controller or some other controller, to modify the pump flow controller output signal 1223 as needed (in this case increase the value of the output signal 1223) until the downstream valve closes to 85%. Of course, the time constant on downstream valve position controller should be such that the operation of the pump control circuit 210 does not adversely affect the operation of the valve control circuit 220, e.g., the time constant should be such that the pump and/or valves do not "hunt" due to interference between the pressure and valve control circuits 210, 220.

In balanced mode operation, the control unit 266/drive unit 295 can be configured to take into account both the flow and pressure of the system. For example, the control unit 266/drive unit 295 can primarily control to a flow setpoint during normal operation, but the control unit 266/drive unit 295 will also ensure that the pressure in the system stays within certain upper and/or lower limits. Conversely, the control unit 266/drive unit 295 can primarily control to a pressure setpoint, but the control unit 266/drive unit 295 will also ensure that the flow stays within certain upper and/or lower limits.

In some embodiments of a balanced mode operation, the hydraulic pump 1710 and control valve assemblies 222, 242 can have dedicated functions. For example, the pressure in the system can be controlled by the hydraulic pump 1710 and the flow in the system can be controlled by the control valve assemblies 222, 242, or vice versa as desired. For example, the pump control circuit 210 can be set up to control a pressure between the outlet of pump 1710 and the downstream control valve and the valve control circuit 220 can be configured to control the flow in the fluid system. As seen in FIGS. 12 and 12A, in balanced mode operation, the mode control module 1240 can be configured to select the output signal 1233 of pump pressure controller module 1230 and the mode control module 1245 can be configured to select the output signal 1223 of valve flow controller 1225. The pressure controller module 1230 receives a pressure setpoint 1212 and a pressure feedback signal 1232. In some embodiments, the pressure feedback signal 1232 represents the pressure between the downstream control valve and the inlet to the hydraulic actuator 3. The pressure controller module 1230 performs a comparison between the pressure setpoint 1231 and the pressure feedback signal 1232 and outputs a pressure controller output signal 1233 based on the comparison. In exemplary embodiments of the present disclosure, the pump pressure controller module 1230 can be a PID controller, a PI controller, a proportional controller or another type of controller that provides a response based on the difference between the pressure setpoint 1231 and the pressure feedback signal 1232, such as, e.g., a controller where the valve controller output signal 1233 is based on a non-linear function, a step function or some other function. In some embodiments, the function determining the pump pressure controller output signal 1230 can be based on factors such as the magnitude of the pressure setpoint, the type of application for the linear actuator assembly, the type of fluid being pumped and/or some other operational parameter. The output of the pump pressure controller module 1230 is sent to the motion controller 230 via mode controller module 1240 as shown in FIG. 12. As discussed above, in some exemplary embodiments, the pump pressure controller output signal 1233 can be sent to a pump characteristic module that modifies or conditions the pump flow controller output signal 1223 based on characteristics of the pump, e.g., the pump's mechanical performance curves and/or the pump's electrical motor curves. Those skilled in the art understand that the processing of the pump pressure controller output signal 1233 by the pump control circuit 210 will be similar to that of the processing of the pump pressure controller output signal 1213 discussed above. Accordingly, for brevity, the functional description of motion controller 230, which is discussed below, and variable-speed motor controllers 1270 and 1280 as it relates to the processing of output signal 1233 will not be discussed except as needed to explain the present mode of operation. In the balanced mode of operation, the pump demand signals to the variable-speed motor controllers 1270, 1280 relate to the current and thus the torque of the pump motors 1741, 1761.

In addition, the valve control circuit 220 concurrently controls an opening of control valves 222, 242. As seen in FIG. 12A, in balanced mode, the flow setpoint 1221 is input to valve flow controller module 1225. In addition, a flow feedback signal 1224 is also input to the valve flow controller module 1225. Those skilled in the art understand that the operation of the valve control system 220 in the exemplary balanced mode operation illustrated in FIG. 12A is the same as the operation of the valve control system 220 in the flow control mode operation discussed above. Accordingly, for brevity, the operation of valve control circuit 220 in balanced mode will not be further discussed.

Figure 13:
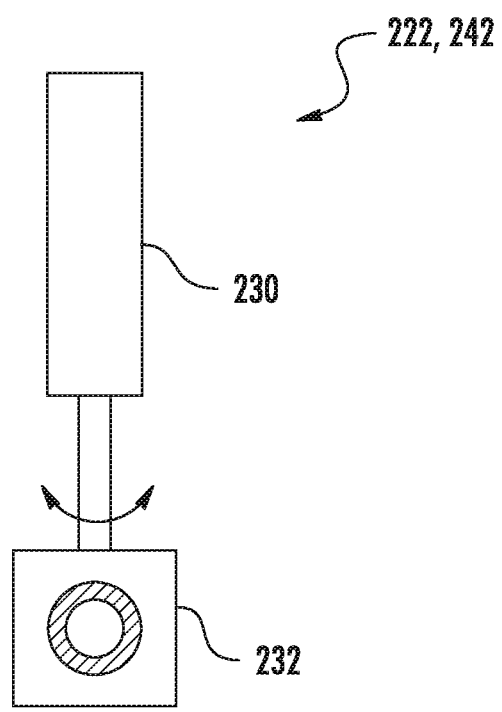
FIG. 13 illustrates an exemplary embodiment of a proportional control valve.

As discussed above, the control valve assemblies 222, 242 include the control valves 222B, 242B that can be throttled between 0% to 100% of valve opening. FIG. 13 shows an exemplary embodiment of the control valves 222B, 242B. As illustrated in FIG. 13, each of the control valves 2229, 2429 can include a ball valve 232 and a valve actuator 230. The valve actuator 230 can be an all-electric actuator, i.e., no hydraulics, that opens and closes the ball valve 232 based on signals from the control unit 266/drive unit 295 via communication connection 302, 303. For example, as discussed above, in some embodiments, the actuator 230 can be a servomotor that is a rotatory motor or a linear motor. The servomotor can include an encoder such that the position opening of the ball valve 232 can be precisely controlled. The servomotors can include encoders that provide feedback of the valve position and/or the valve travel speed. The encoders can be optical encoders, magnetic encoders or another type of encoder that can measure the positon and/or travel speed of the valve. Embodiments of the present invention, however, are not limited to all-electric actuators and other type of actuators such as electro-hydraulic actuators can be used. The control unit 266/drive unit 295 can include characteristic curves for the ball valve 232 that correlate the percent rotation of the ball valve 232 to the actual or percent cross-sectional opening of the ball valve 232. The characteristic curves can be predetermined and specific to each type and size of the ball valve 232 and stored in the control unit 266 and/or drive unit 295. In addition, the hydraulic actuator 3 can also have characteristic curves that describe the operational characteristics of the cylinder, e.g., curves that correlate pressure/flow with travel speed/position.

Embodiments of the present disclosure provide for precise control of the prime movers such that the respective fluid displacement members can be positioned and/or controlled relative to a reference positon, which can be a fixed reference position, and/or relative to fluid displacement members on the other fluid driver. As discussed above and shown in FIG. 12, the motion controller 230 receives the pump demand signal 1251 from the mode controller module 1240 and outputs the individual pump demand signals 1251A, 1251B to the respective motor controllers 1270 and 1280. As explained below, the individual pump demand signals 1251A, 1251B take into account the slip coefficient discussed above. The motion controller 230 can also a send start/stop signal 1252A and direction signal 1252B to each of the motor controllers 1270, 1280. Thus, while control unit 266 and/or drive unit 295 act as the "brains" of the control system to provide the supervisory control scheme/mode based on the selected task as discussed above, the motion controller 230 in conjunction with motor controllers 1270, 1280 precisely controls the pump 1710 based on the pump command signals from the control unit 266/drive unit 295. In addition, in some embodiments, the motion controller 230 can also be configured to control the proportional control valve assemblies 222, 242. Of course, some or all of the functions of the motion controller 230 can be performed by the control unit 266 and/or the drive unit 295.

The motion controller 230 can include position control module 1250 to precisely control the positon of the prime movers (e.g., motors 1741, 1761). As seen in FIG. 12, the position control module 1250 and 1250B receives a position feedback signals 232A, 232B from the respective positon sensors 231A, 231B. The position sensors 231A, 231B can measure the position of, e.g., the shaft of prime movers (e.g., motors 1741, 1761) to within a range of, e.g., +/−0.0010 to +/−0.0065°. The sensors 231A, 231B can be optical encoders, magnetic encoders or another type of encoder that can measure the positon of the prime movers. The sensors 231A, 231B can be disposed on the shafts of the motors 1741, 1761. Alternatively, or in addition to sensors 231A, 231B, encoders can be disposed on the shafts of gears 1750, 1770. In some embodiments, the position sensors 231A, 231B can also measure and/or calculate the angular velocity of the shaft of the motor/gear.

The position control module 1250 include the hardware and/or algorithms and/or program code that can be executed by a processor to correlate the positon of at least one protrusion and/or indent of each fluid displacement member 1750, 1770 of the respective fluid drivers 1740, 1760 relative to a reference point based on the position feedback signals 232A, 232B. For example, the position control module 1250 can determine the angular positon (0° to 360° with respect to the rotational axis of the respective motor/gear, the accuracy can be to within +/−0.0010° in some embodiments and to within +/−0.0065° in other embodiments) of at least one gear tooth 1752, 1772 relative to, e.g., a fixed point on the motor, pump or other filed reference. In some embodiments, the position control module 1250 can determine the position of at least one protrusion and/or indent on one fluid displacement member relative to at least one protrusion and/or indent on the other fluid displacement member to within, e.g., +/−0.0010° or to within +/−0.0065°. For example, the position control module 1250 can determine the position of at least one gear tooth 1752 in gear 1750 relative to at least one gear tooth 1772 in gear 1770.

Figure 12:
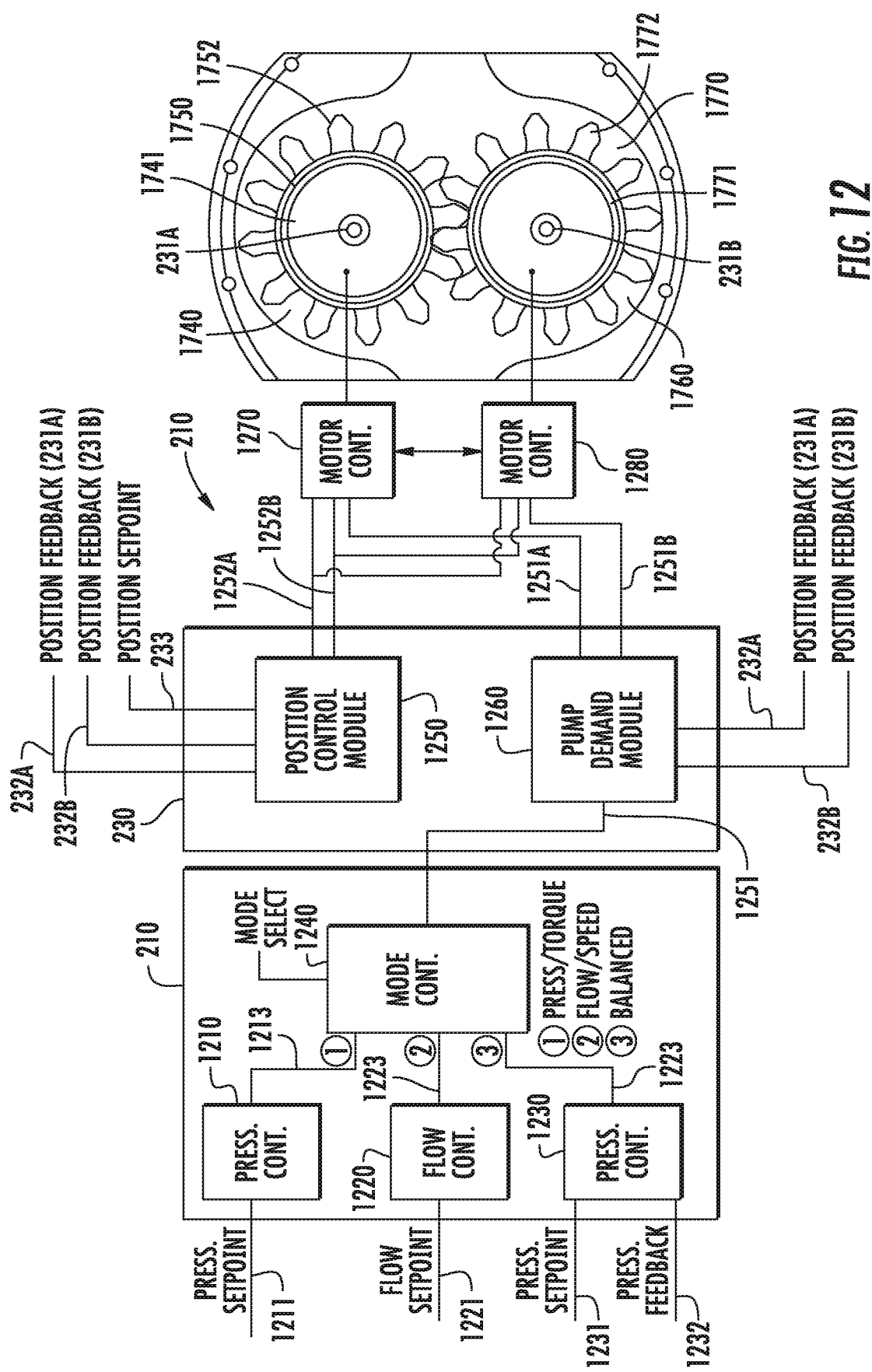
FIG. 12 is a schematic block diagram of a pump control system.
Figure 12A:
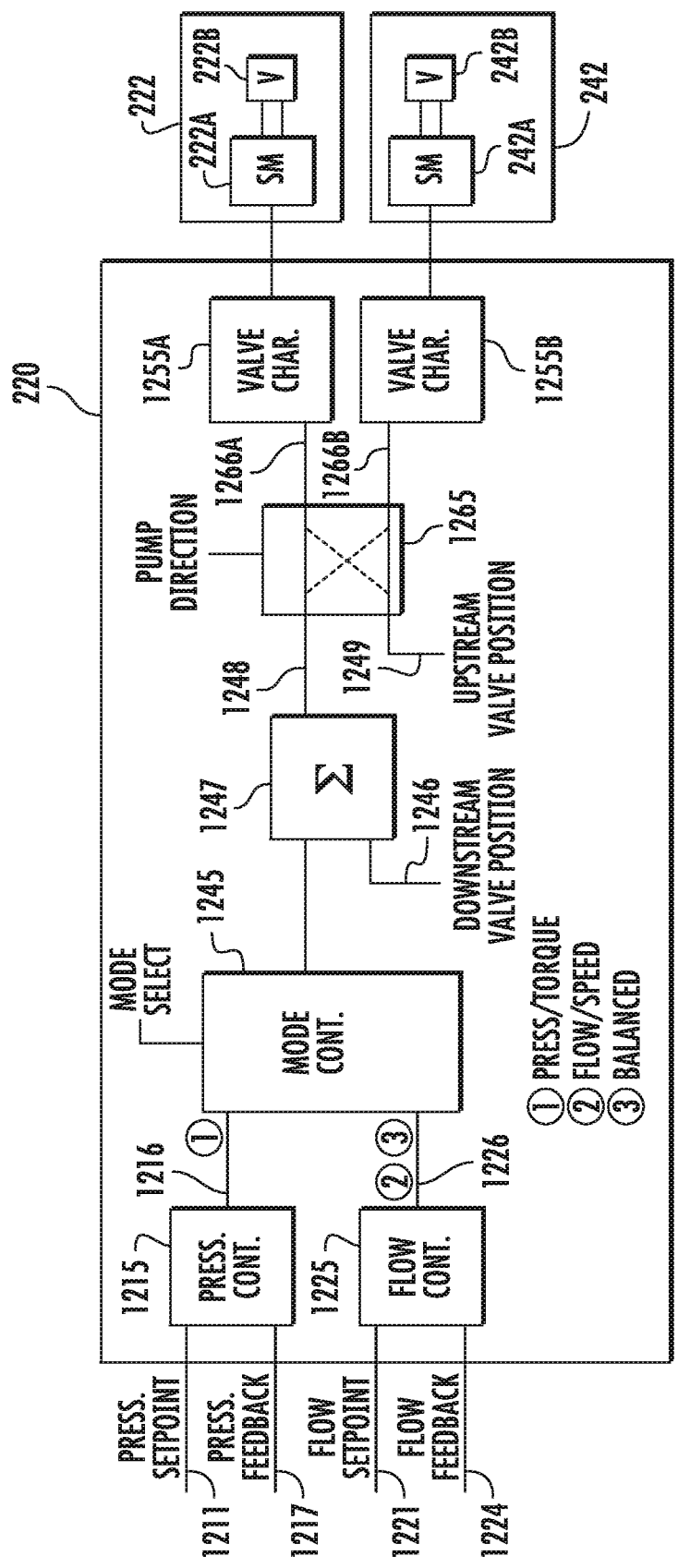
FIG. 12A is a schematic block diagram of a valve control system.

In addition to the position feedback signals, as seen in FIG. 12, the positon control module 1250 can receive a positon setpoint signal 233, which can originate from, e.g., the control unit 266 or the drive unit 295 or from some other controller. In some embodiments, the motion control module 230 can generate the positon setpoint and/or have a default positon setpoint. Based on the position setpoint signal 233, the position control module 1250 can precisely control the movement of the motors 1741, 1761 until the position feedback signals 232A, 232B match the position setpoint. In some embodiments, one of the motors/gears is a "lead" motor/gear and the positon control module uses the positon feedback from the "lead" motor/gear for control and uses the other feedback for backup and/or monitoring purposes (e.g., to trigger an alarm if the difference between the two position feedback signals is to great).

Based on the difference between the position feedback signals 232A, 232B and the position setpoint 233, the position control module 1250 will output a start/stop signal and an appropriate direction signal to the motor controllers 1270 and 1280. For example, if the hydraulic actuator 3 is required to move the load some distance (e.g., a liner distance for a hydraulic cylinder and an angular movement for a hydraulic motor), the control unit 266 can determine the precise number of rotations and/or fraction of a rotation required by the motors 1741, 1761 to achieve the desired movement of the hydraulic actuator 3. In this example, the control unit 266 may determine that, to achieve the desired movement of the hydraulic cylinder or the hydraulic motor, the pump will need to rotate +90°, with + representing, e.g., a forward direction, with the direction signal representing a direction of pump flow. In this case, the control unit 266 will add 90° to the position setpoint signal 233 going to the position control module 1250. The position control module 1250 compares the difference between the positon setpoint 233 and the position feedback signals 232A, 232B for the respective control modules and determines whether the pump should be rotated and in which direction. In this example, the position control module 1250 will output a start/stop signal 1252A and a direction signal 1252B to the motors controllers 1270, 1280 to start the motors 1741, 1761 and rotate them such that the pump flow is in forward direction with respect to the flow from the pump. When the position feedback signals 232A, 232B from the fluid drivers indicate that the motors/gears have rotated 90', the position control module 1250 will send a stop signal to the motor controllers 1270, 1280. In some embodiments, two position control modules that communicate with each other can be used, e.g., configured in a master/slave arrangement. During the time the position control module 1250 is sending a start signal to the motor controllers 1270, 1280, the motors 1741, 1761 are run using the pump demand signals 1251A and 1251B, respectively, that are output from pump demand module 1260. An exemplary embodiment of the pump demand module 1260 is described next.

The pump demand module 1260 receives the demand signal 1251 from mode control module 1240 and outputs individual pump demand signals 1251A, 1251B to the respective motor controllers 1270, 1280. The pump demand module 1260 modifies or conditions the demand signal 1251 such that the individual demand signals 1251A, 1251B provide the one-sided contact of the gears discussed above. That is the demand signal to one of the motors is slightly higher than the demand signal to the other motor. The difference in the demand signals produces a difference in the torque in a range of, e.g., about ±/−0.5 Nm in some embodiments, +/−2 Nm in some embodiments, and +/−6 Nm in some embodiments depending on the pressure of the system, which as discussed above, produces the one-sided contact between opposing gear teeth allows for substantial sealing, e.g., a slip coefficient of 5% or less, of the fluid path between the outlet port and the inlet port of the pump 1710. The gear teeth tolerances are such that that the fluid that is trapped between the meshing teeth escapes through gaps between the opposing non-contacting faces the opposing gear teeth. However, the one-sided contact and thus the gap may not be maintained due to fluctuations in the fluid pressure, mechanical vibrations of the pump, electrical/magnetic fluctuations in the motors and/or other disturbances during operation of the equipment. In such cases the fluid pressure between the teeth may build to a point that it causes mechanical problems in the pump, e.g., gear or bearing failure, excessive wear in the gears and/or bearings or some other problem. One option is to increase the gap tolerances so that there is always a gap to relieve the pressure. However, this means that the pump will be more inefficient than a pump with the proper gap tolerances.

In exemplary embodiments of the present disclosure, the pump demand module 1260 ensures that the proper alignment between teeth of the opposing gears is maintained such that there is always the proper gap tolerance. Along with producing a difference in the demand signals 1251A, 1251B as discussed above, the pump demand module 1260 monitors the positon of at least one set of opposing gear teeth on fluid drivers 1740, 1760 to ensure that the gear teeth maintain their position relative to each other and thus ensure that the one-sided contact is maintained in all operating conditions. As seen in FIG. 12, the pump demand module 1260 receives the position feedback signals 232A, 232B from the sensors 231A, 231B. The pump demand module 1260 is configured to track the position of at least one set of teeth forming the one-sided contact based on the received positon feedback signals 232A, 232B. In some embodiments, all the teeth and thus all sets of teeth forming the one-sided contacts are tracked. By tracking the teeth positons, the relative position value between teeth forming the one-sided contact can be calculated. If one of the tooth faces starts to "lift off" the one sided contact, the relative positon between the two opposing teeth with change. The pump demand module 1260 can compare the change in the relative position to a known good relative positon value that can be, e.g., stored in memory. Based on the comparison, one or both of the pump demand signals 1251A, 1251B can be appropriately changed to reestablish the one-sided contact. Because the relative positions of the set of teeth forming the one-sided contact are monitored and corrections made if necessary, there will always be a gap to relieve the fluid pressure. Thus, the gap tolerance can be smaller, which increases the efficiency of the pump. The relative positions of the set of teeth forming the one sided contact can be constantly monitored, periodically monitored or monitored based on operating conditions.

In addition to the angular positon of the motor shaft and/or gear teeth, the pump demand module 1260 can also determine the angular velocity of the of the fluid drivers 1740, 1760 (e.g. velocities of motors 1741, 1761 and/or gears 1750, 1770) based on the position feedback signals 232A, 232B. In some embodiments, the angular velocity is provided directly by the sensors 232A, 232B. The velocity feedback signals can be used in the control unit 266/drive unit 295 in the various modes of operation as discussed above. In addition, the pump demand module 1260 and/or the control unit 266/drive unit 295 monitors the angular velocities and compares the velocity feedback to the pump demand signal 1251 and/or the individual pump demand signals 1251A, 1251B. The pump demand module 1260 and/or the control unit 266/drive unit 295 can take appropriate actions based on any discrepancy in the demand signals and the velocity feedbacks. For example, the control unit 266 can notify the operator of an alarm condition and/or shut down the system if the discrepancy is too big.

The characteristic curves, whether for the control valves, e.g., control valves 222B, 242B (or any of the exemplary control valves discussed above), the prime movers, e.g., motors 1741, 1761 (or any of the exemplary motors discussed above), or the fluid-driven actuator, e.g., hydraulic actuator 3 (or any of the exemplary hydraulic cylinders discussed above), can be stored in memory, e.g. RAM, ROM, EPROM, etc. in the form of look-up tables, formulas, algorithms, datasets, or another software or hardware component that stores an appropriate relationship. For example, in the case of ball-type control valves, an exemplary relationship can be a correlation between the percent rotation of the ball valve to the actual or percent cross-sectional opening of the ball valve; in the case of electric motors, an exemplary relationship can be a correlation between the power input to the motors and an actual output speed, torque or some other motor output parameter; and in the case of the fluid-driven actuator, an exemplary relationship can be a correlation between the pressure and/or flow of the hydraulic fluid to the travel speed of the cylinder and/or the force that can be exerted by the cylinder. As discussed above, the control unit 266/drive unit 295 uses the characteristic curves to precisely control the motors 1741, 1761, the control valves 222B, 242B, and/or the hydraulic actuator 3. Alternatively, or in addition to the characteristic curves stored in control unit 266/drive unit 295, the control valve assemblies 222, 242, the pump 1710, and/or the fluid-driven actuator can also include memory, e.g. RAM, ROM, EPROM, etc. to store the characteristic curves in the form of, e.g., look-up tables, formulas, algorithms, datasets, or another software or hardware component that stores an appropriate relationship.

The control unit 266 can be provided to exclusively control the fluid-driven actuator system 1. Alternatively, the control unit 266 can be part of and/or in cooperation with another control system for a machine or an industrial application in which the fluid-driven actuator system 1 operates. The control unit 266 can include a central processing unit (CPU) which performs various processes such as commanded operations or pre-programmed routines. The process data and/or routines can be stored in a memory. The routines can also be stored on a storage medium disk such as a hard drive (HDD) or portable storage medium or can be stored remotely. However, the storage media is not limited by the media listed above. For example, the routines can be stored on CDs, DVDs, in FLASH memory, RAM, ROM, PROM, EPROM, EEPROM, hard disk or any other information processing device with which the computer aided design station communicates, such as a server or computer.

The CPU can be a Xenon or Core processor from Intel of America or an Opteron processor from AMD of America, or can be other processor types that would be recognized by one of ordinary skill in the art. Alternatively, the CPU can be implemented on an FPGA, ASIC, PLD or using discrete logic circuits, as one of ordinary skill in the art would recognize. Further, the CPU can be implemented as multiple processors cooperatively working in parallel to perform commanded operations or pre-programmed routines.

The control unit 266 can include a network controller, such as an Intel Ethernet PRO network interface card from Intel Corporation of America, for interfacing with a network. As can be appreciated, the network can be a public network, such as the Internet, or a private network such as a LAN or WAN network, or any combination thereof and can also include PSTN or ISDN sub-networks. The network can also be wired, such as an Ethernet network, or can be wireless, such as a cellular network including EDGE, 3G, and 4G wireless cellular systems. The wireless network can also be WiFi, Bluetooth, or any other wireless form of communication that is known. The control unit 266 can receive a command from an operator via a user input device such as a keyboard and/or mouse via either a wired or wireless communication. In addition, the communications between control unit 266, drive unit 295, the motor controllers 1270, 1280, and valve controllers, e.g., servomotors 222A, 222B, can be analog or via digital bus and can use known protocols such as, e.g., controller area network (CAN), Ethernet, common industrial protocol (CIP), Modbus and other well-known protocols.

Figure 14:
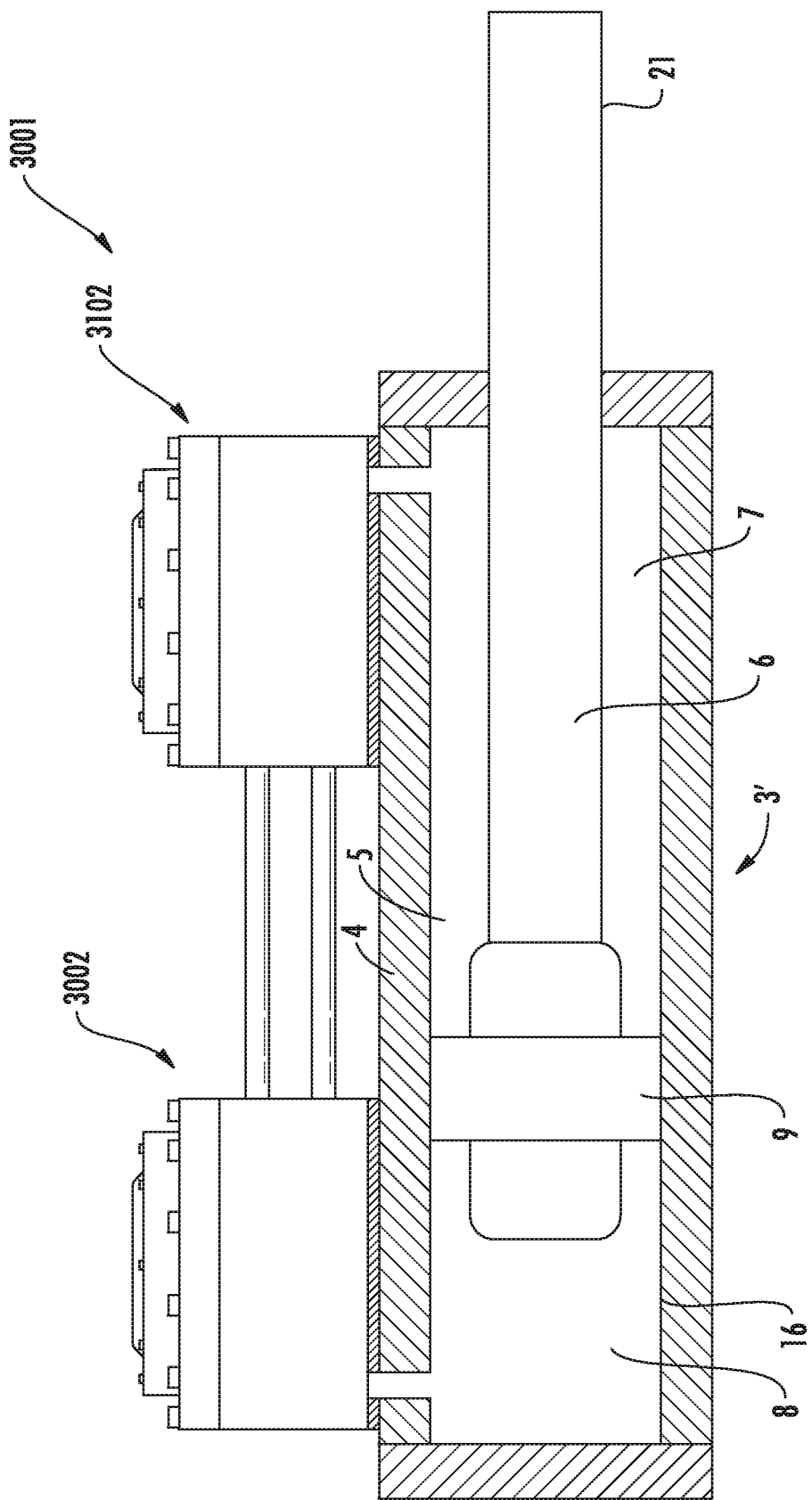
FIG. 14 shows a side view of a preferred embodiment of a fluid-driven actuator assembly with two pump assemblies.
Figure 14A:
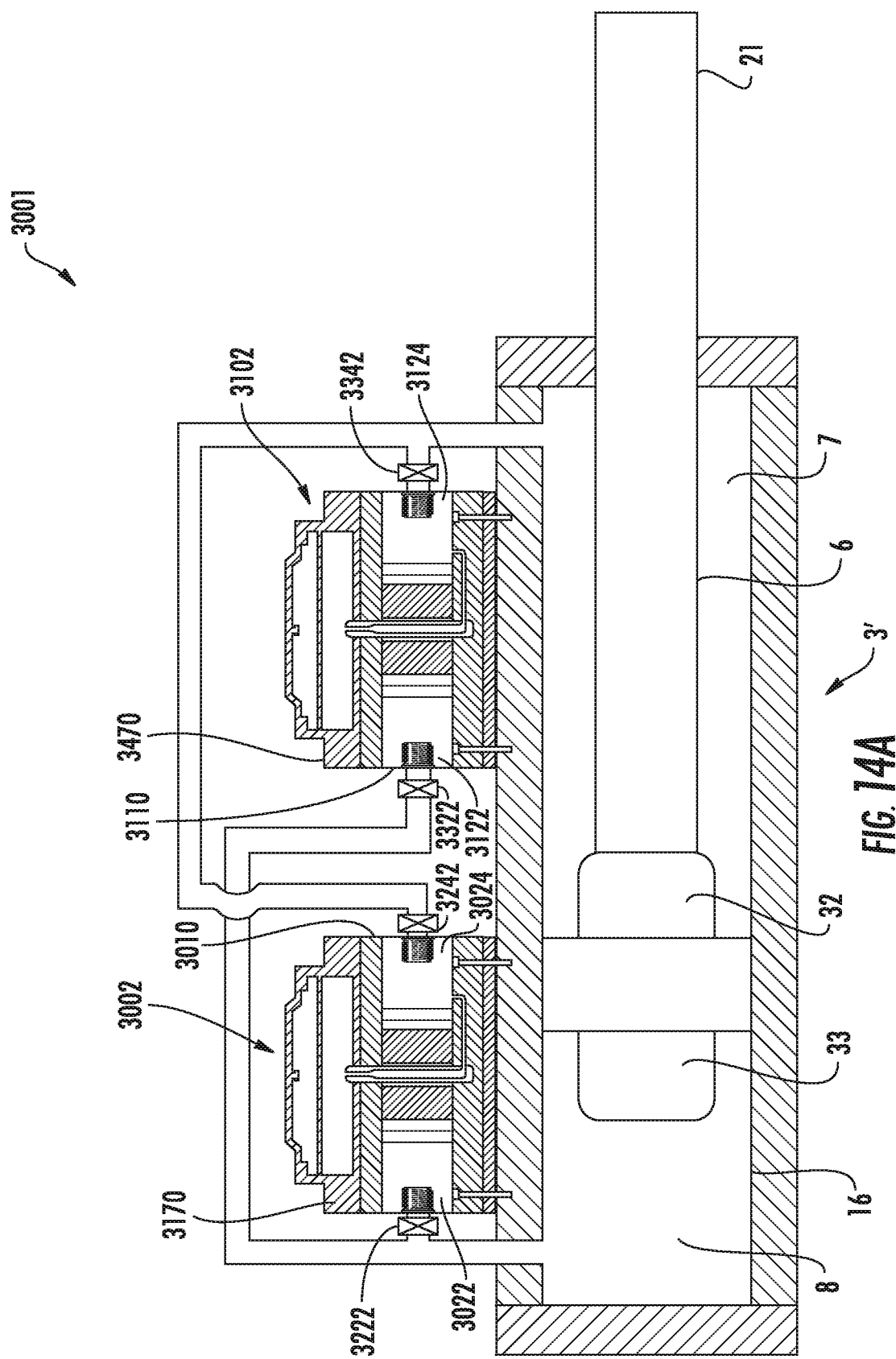
FIG. 14A shows a cross-sectional view of the fluid-driven actuator assembly of FIG. 14.

In addition, the exemplary embodiments of the fluid-driven actuator assembly discussed above have a single pump assembly, e.g., pump assembly 1702 with pump 1710, therein. However, embodiments of the present disclosure are not limited to a single pump assembly configuration and exemplary embodiments of the fluid-driven actuator assembly can have a plurality of pump assemblies. In some embodiments, the plurality of pumps can be fluidly connected in parallel to a fluid-driven actuator depending on, for example, operational needs of the fluid-driven actuator. For example, as shown in FIGS. 14 and 14A, a linear actuator assembly 3001 includes two pump assemblies 3002 and 3102 and corresponding proportional control valve assemblies 3222, 3242, 3322 and 3342 connected in a parallel flow configuration to transfer fluid to/from cylinder 3'. By fluidly connecting the pumps in parallel, the overall system flow can be increased as compared to a single pump assembly configuration. Although the description of the exemplary embodiments of parallel configurations are provided with respect to a linear hydraulic actuator, e.g., a hydraulic cylinder, those skilled in the art understand that the description will be applicable to other types of hydraulic actuators.

Figure 15:
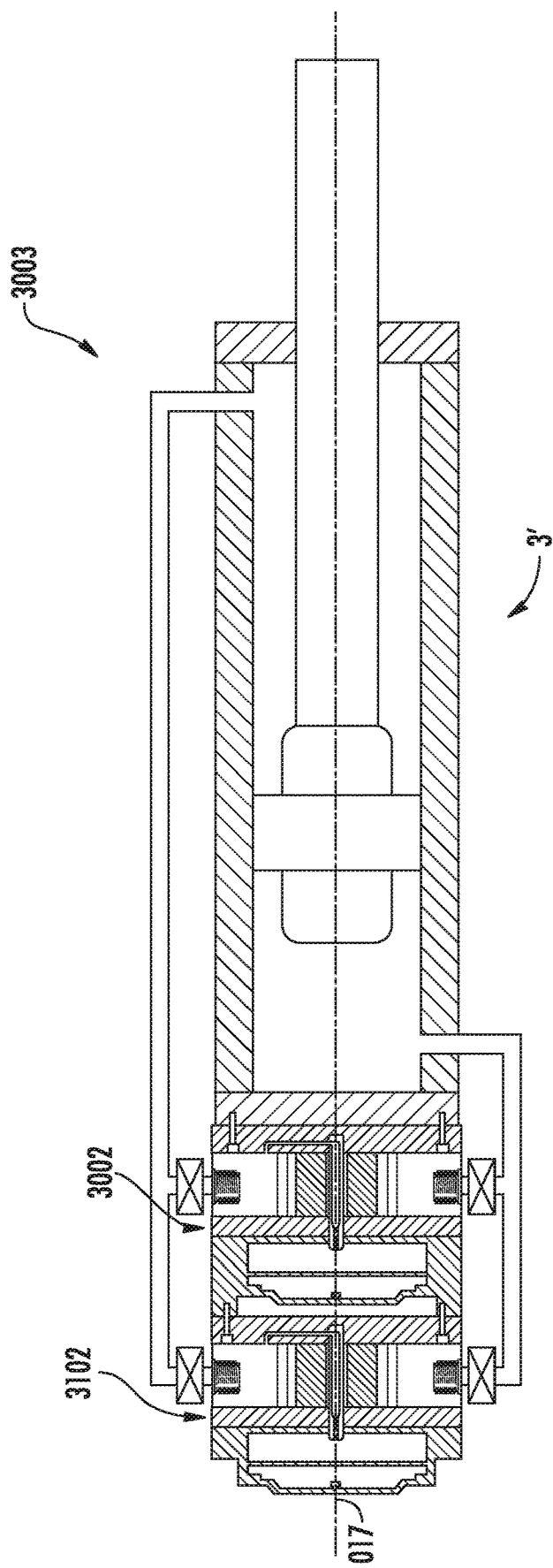

In addition to the embodiment shown in FIGS. 14 and 14A, FIGS. 15 and 15A illustrate additional exemplary embodiments of parallel-configurations. FIG. 15 shows a cross-sectional view of a linear actuator assembly 3003. Functionally, this embodiment is similar to the embodiment shown in FIGS. 14 and 14A. However, structurally, in the exemplary linear actuator assembly 3003, the pump assembly 3102 is disposed on top of the pump assembly 3002 and the combined pump assemblies are disposed in-line with a longitudinal axis of the hydraulic cylinder 3'. FIG. 15A shows a cross-sectional view of a linear actuator assembly 3005. Functionally, this embodiment is also similar to the embodiment shown in FIGS. 14 and 14A. However, structurally, in the exemplary linear actuator assembly 3005, the pump assembly 3102 is disposed on top of the pump assembly 3002 and the combined pump assemblies are disposed on a side of the hydraulic cylinder 3'. Thus, based on the application and the available space, the structural arrangements of the exemplary embodiments of the linear actuator assemblies of the present disclosure can be modified to provide a compact configuration for the particular application. Of course, the present disclosure is not limited to the structural arrangements shown in FIGS. 14-15B and these arrangements of the pump assemblies can be modified as desired.

Because the exemplary embodiments of the linear actuator assemblies in FIGS. 14-15B are functionally similar, for brevity, the parallel configuration embodiment of the present disclosure will be described with reference to FIGS. 14 and 14A. However, the those skilled in the art will recognize that the description is also applicable to the parallel assemblies of FIGS. 15 and 15A.

Figure 16:
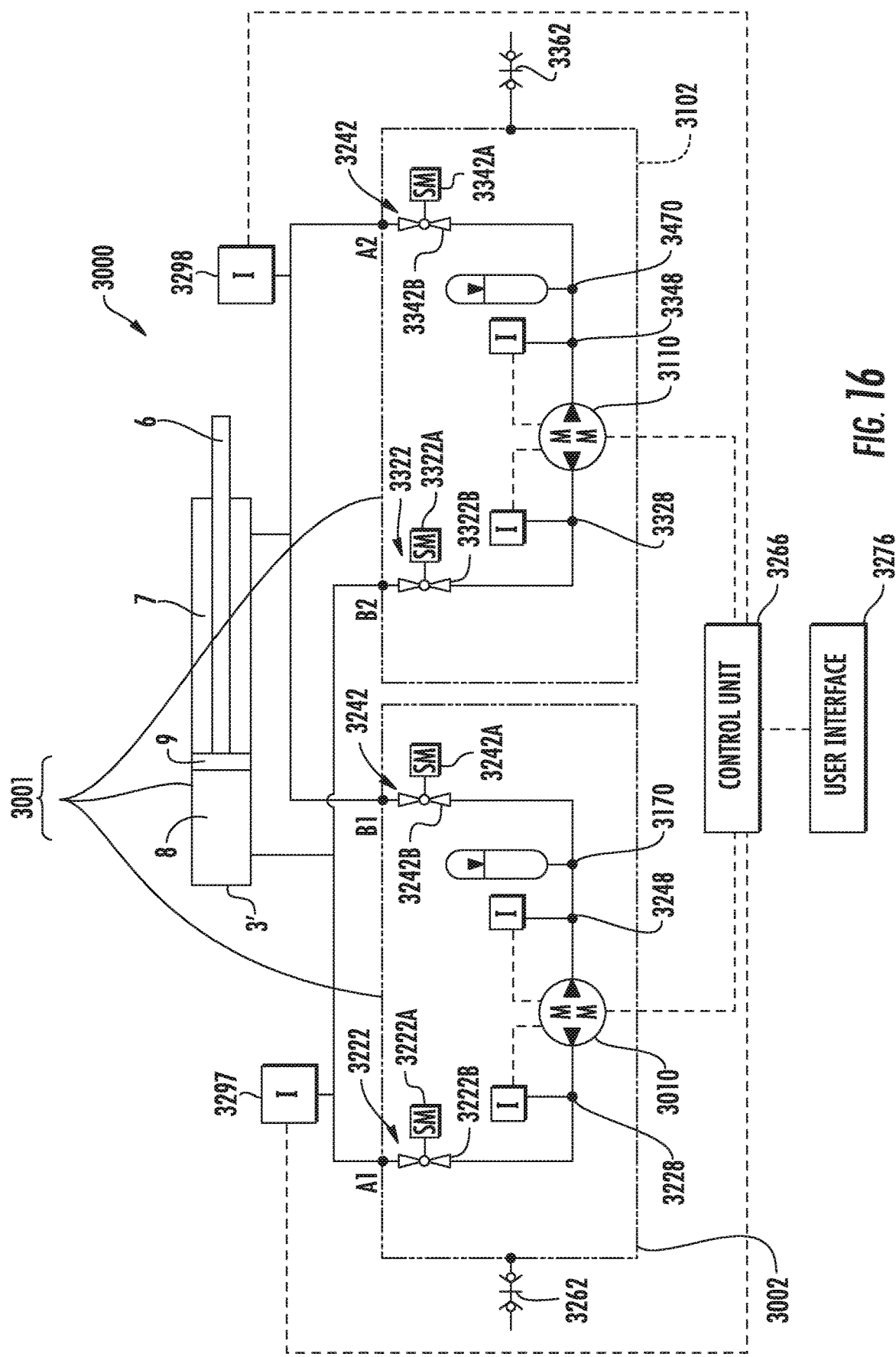
FIG. 16 is a schematic diagram illustrating an exemplary embodiment of a fluid system in a fluid-driven actuator application.

As shown in FIGS. 14, 14A and 16 linear actuator assembly 3001 includes two pump assemblies 3002, 3102 and corresponding proportional control valve assemblies 3222, 3242, 3322, and 3342, which are fluidly connected in parallel to a hydraulic cylinder assembly 3'. Each of the proportional control valve assemblies 3222, 3242, 3322, and 3342 respectively has an actuator 3222A, 3242A, 3322A, and 3342A and control valve 3222B, 3242B, 33229, and 3342B. Exemplary embodiments of actuators and control valves are discussed above, and thus, for brevity, a detailed description of actuators 3222A, 3242A, 3322A, and 3342A and control valves 3222B, 3242B, 3322B, and 3342B is omitted. The pump assembly 3002 includes pump 3010 and an integrated storage device 3170. Similarly, the pump assembly 3102 includes pump 3110 and an integrated storage device 3470. The pump assemblies 3002 and 3102 include fluid drivers which in this exemplary embodiment include motors as illustrated by the two M's in the symbols for pumps 3010 and 3110 (see FIG. 16). The integrated storage device and pump configuration of pump assemblies 3002 and 3102 are similar to that discussed above with respect to, e.g., pump assembly 2. Accordingly, the configuration and function of pumps 3010 and 3110 and storage devices 3170 and 3470 will not be further discussed except as needed to describe the present embodiment. Of course, although pump assemblies 3002 and 3102 are configured to include pumps with a drive-drive configuration with the motors disposed within the gears and with flow-through shafts, the pump assemblies 3002 and 3102 can be configured as any one of the drive-drive configurations discussed above, i.e., pumps that do not require flow-through shafts, pumps having a single prime mover and pumps with motors disposed outside the gears. In addition, although the above-embodiments include integrated storage devices, in some embodiments, the system does not include a storage device or the storage device is disposed separately from the pump.

Turing to system operations, as shown in FIG. 16, the extraction chamber 8 of the hydraulic cylinder 3' is fluidly connected port A1 of pump assembly 3002 and port B2 of pump assembly 3102. The retraction chamber 7 of the hydraulic cylinder 3' is fluidly connected to port B1 of the pump assembly 3002 and port A2 of the pump assembly 3102. Thus, the pumps 3010 and 3110 are configured to operate in a parallel flow configuration.

Similar to the exemplary embodiments discussed above, each of the valve assemblies 3222, 3242, 3322, 3342 can include proportional control valves that throttle between 0% to 100% opening or some other appropriate range based on the linear actuator application. In some embodiments, each of the valve assemblies 3222, 3242, 3322, 3342 can include lock valves (or shutoff valves) that are switchable between a fully open state and a fully closed state and/or an intermediate position. That is, in addition to controlling the flow, the valve assemblies 3222, 3242, 3322, 3342 can include shutoff valves that can be selectively operated to isolate the corresponding pump 3010, 3110 from the hydraulic cylinder 3'.

Like system 1700, the fluid system 3000 can also include sensor assemblies to monitor system parameters. For example, the sensor assemblies 3297, 3298, can include one or more transducers to measure system parameters (e.g., a pressure transducer, a temperature transducer, a flow transducer, or any combination thereof). In the exemplary embodiment of FIG. 16, the sensor assemblies 3297, 3298 are disposed between a port of the hydraulic cylinder 3' and the pump assemblies 3002 and 3102. However, alternatively, or in addition to sensor assemblies 3297, 3298, one or more sensor assemblies (e.g., pressure transducers, temperature transducers, flow transducers, or any combination thereof) can be disposed in other parts of the system 3000 as desired. For example, as shown in FIG. 16, sensor assemblies 3228 and 3248 can be disposed adjacent to the ports of pump 3010 and sensor assemblies 3328 and 3348 can be disposed adjacent to the ports of pump 3110 to monitor, e.g., the respective pump's mechanical performance. The sensors assemblies 3228, 3248, 3324 and 3348 can communicate directly with the respective pumps 3010 and 3110 as shown in FIG. 16 and/or with control unit 3266 (not shown). In some embodiments, each valve assembly and corresponding sensor assemblies can be integrated into a single assembly. That is, the valve assemblies and sensor assemblies can be packaged as a single unit.

As shown in FIG. 16, the status of each valve (e.g., the operational status of the control valves such as open, closed, percent opening, the operational status of the actuator such as current/power draw, or some other valve/actuator status indication) and the process data measured by the sensors (e.g., measured pressure, temperature, flow rate or other system parameters) may be communicated to the control unit 3266. The control unit 3266 is similar to the control unit 266/drive unit 295 with pump control circuit 210 and valve control circuit 220 discussed above with respect to FIGS. 11, 12 and 12A. Thus, for brevity, the control unit 3266 will not be discussed in detail except as necessary to describe the present embodiment. As illustrated in FIG. 16, the control unit 3266 communicates directly with the motors of pumps 3010, 3110 and/or valve assemblies 3222, 3242, 3322, 3342 and/or sensor assemblies 3228, 3248, 3324, 3348, 3297, 3298. The control unit 3266 can receive measurement data such as speeds, currents and/or power of the four motors, process data (e.g., pressures, temperatures and/or flows of the pumps 3010, 3110), and/or status of the proportional control valve assemblies 3222, 3242, 3322, 3342 (e.g., the operational status of the control valves such as open, closed, percent opening, the operational status of the actuator such as current/power draw, or some other valve/actuator status indication). Thus, in this embodiment, the functions of drive unit 295 discussed above with reference to FIG. 11 are incorporated into control unit 3266. Of course, the functions can be incorporated into one or more separate controllers if desired. The control unit 3266 can also receive an operator's input (or operator's command) via a user interface 3276 either manually or by a pre-programmed routine. A power supply (not shown) provides the power needed to operate the motors of pumps 3010, 3110 and/or control valve assemblies 3222, 3242, 3322, 3342 and/or sensor assemblies 3228, 3248, 3324, 3348, 3297, 3298.

Coupling connectors 3262, 3362 can be provided at one or more locations in the system 3000, as desired. The connectors 3262, 3362 may be used for obtaining hydraulic fluid samples, calibrating the hydraulic system pressure, adding, removing, or changing hydraulic fluid, or troubleshooting any hydraulic fluid related issues. Those skilled in the art would recognize that the pump assemblies 3002 and 3102, valve assemblies 3222, 3242, 3322, 3342 and/or sensor assemblies 3228, 3248, 3324, 3348, 3297, 3298 can include additional components such as check valves, relief valves, or another component but for clarity and brevity, a detailed description of these features is omitted.

As discussed above and seen in FIGS. 14 to 16, the pump assemblies 3002, 3102 are arranged in a parallel configuration where each of the hydraulic pumps 3010, 3110 includes two fluid drivers that are driven independently of each other. Thus, the control unit 3266 will operate two sets of motors (i.e., the motors of pumps 3010 and the motors of pump 3110) and two sets of control valves (the valves 32229 and 32429 and the valves 3322B and 3342B). The parallel configuration allows for increased overall flow in the hydraulic system compared to when only one pump assembly is used. Although two pump assemblies are used in these embodiments, the overall operation of the system, whether in pressure, flow, or balanced mode operation, will be similar to the exemplary operations discussed above with respect to one pump assembly operation of FIG. 11. Accordingly, for brevity, a detailed discussion of pressure mode, flow mode, and balanced mode operation is omitted except as necessary to describe the present embodiment.

The control unit 3266 controls to the appropriate set point required by the hydraulic cylinder 3' for the selected mode of operation (e.g., a pressure set point, flow set point, or a combination of the two) by appropriately controlling each of the pump assemblies 3002 and 3102 and the proportional control valve assemblies 3222, 3242, 3322, 3342 to maintain the operational set point. The operational set point can be determined or calculated based on a desired and/or an appropriate set point for a given mode of operation. For example, in some embodiments, the control unit 3266 may be set up such that the load of and/or flow through the pump assemblies 3002, 3102 are balanced, i.e., each shares 50% of the total load and/or flow to maintain the desired overall set point (e.g., pressure, flow). For example, in flow mode operation, the control unit 3266 will control the speed of each pump assembly to provide 50% of the total desired flow and an opening of at least each of the downstream control valves will be concurrently controlled to maintain the desired flow. Similarly, in pressure mode operation, the control unit 3266 can balance the current (and thus the torque) going to each of the pump motors to balance the load provided by each pump and an opening of at least each of the downstream control valves will be concurrently controlled to maintain the desired pressure. With the load/flow set point for each pump assembly appropriately set, the control of the individual pump/control valve combination of each pump assembly will be similar to that discussed above. In other embodiments, the control unit 3266 may be set up such that the load of or the flow through the pump assemblies 3002, 3102 can be set at any desired ratio, e.g., the pump 3010 of the pump assembly 3002 takes 50% to 99% of the total load and/or flow and the pump 3110 of the pump assembly 3102 takes the remaining portion of the total load and/or flow. In still other embodiments, the control unit 3266 may be set up such that only a pump assembly, e.g., the pump 3010 and valve assemblies 3222 and 3242, that is placed in a lead mode normally operates and a pump assembly, e.g., the pump 3110 and valve assemblies 3322 and 3342, that is placed in a backup or standby mode only operates when the lead pump/assembly reaches 100% of load/flow capacity or some other pre-determined load/flow value (e.g., a load/flow value in a range of 50% to 100% of the load/flow capacity of the pump 3010). The control unit 3266 can also be set up such that one of the backup or standby pump/assembly only operates in case the lead pump/assembly is experiencing mechanical or electrical problems, e.g., has stopped due to a failure. In some embodiments, in order to balance the mechanical wear on the pumps, the roles of lead assembly can be alternated, e.g., based on number of start cycles (for example, lead assembly is switched after each start or after n number of starts), based on run hours, or another criteria related to mechanical wear.

The pump assemblies 3002 and 3102 and the proportional control valve assemblies can be identical. For example, the pump 3010 and pump 3110 can each have the same load/flow capacity and proportional control valve assemblies 3222, 3242, 3322, and 3342 can be the same type and size. In some embodiments, the pumps and the proportional control valve assemblies can have different load/flow capacities. For example, the pump 3110 can be a smaller load/flow capacity pump as compared to pump 3010 and the size of the corresponding valve assemblies 3322 and 3342 can be smaller compared to valve assemblies 3222 and 3242. In such embodiments, the control system can be configured such that the pump 3110 and the control valve assemblies 3322, 3342 only operate when the pump 3010 reaches a predetermined load/flow capacity, as discussed above. This configuration may be more economical than having two large capacity pumps.

The hydraulic cylinder 3', the pump assembly 3002 (i.e. the pump 3010, proportional control valves assemblies 3222, 3242, and the storage device 3170), and the pump assembly 3102 (i.e. the pump 3110, proportional control valves assemblies 3322, 3342, and the storage device 3470) of the present disclosure form a closed-loop hydraulic system. In the closed-loop hydraulic system, the fluid discharged from either the retraction chamber 7 or the extraction chamber 8 is directed back to the pumps and immediately recirculated to the other chamber. In contrast, in an open-loop hydraulic system, the fluid discharged from a chamber is typically directed back to a sump and subsequently drawn from the sump by a pump or pumps.

Each of the pumps 3010, 3110 shown in FIG. 16 may have any configuration of various pumps discussed earlier, including the drive-drive and driver-driven configurations. In addition, each of the control valves assemblies 3222, 3242, 3322, and 3342 may be configured as discussed above. While the pump assemblies 3002, 3102 shown in FIGS. 14-15B each has a single storage device 3170, 3470, respectively, one or both of the pump assemblies 3002, 3102 can have two storage devices as discussed above.

Referring back to FIG. 15, in the exemplary embodiment of the linear actuator assembly 3003, the hydraulic pump assemblies 3002, 3102 are shown disposed on one end of the hydraulic cylinder assembly 3 such that the hydraulic pump assemblies 3002, 3102 are "in-line" (or aligned) with the hydraulic cylinder assembly 3 along a longitudinal axis 3017 of the hydraulic cylinder assembly 3. This allows for a compact design, which is desirable in many applications. However, the configuration of the linear actuator of the present disclosure is not limited to the in-line configuration. In some applications, an "in-line" design is not practical or may not be desirable. In such cases the pump assemblies can be mounted on another location of the cylinder that is offset from the "in-line" position, as shown in FIGS. 14, 14A and 15A.

Figure 17:
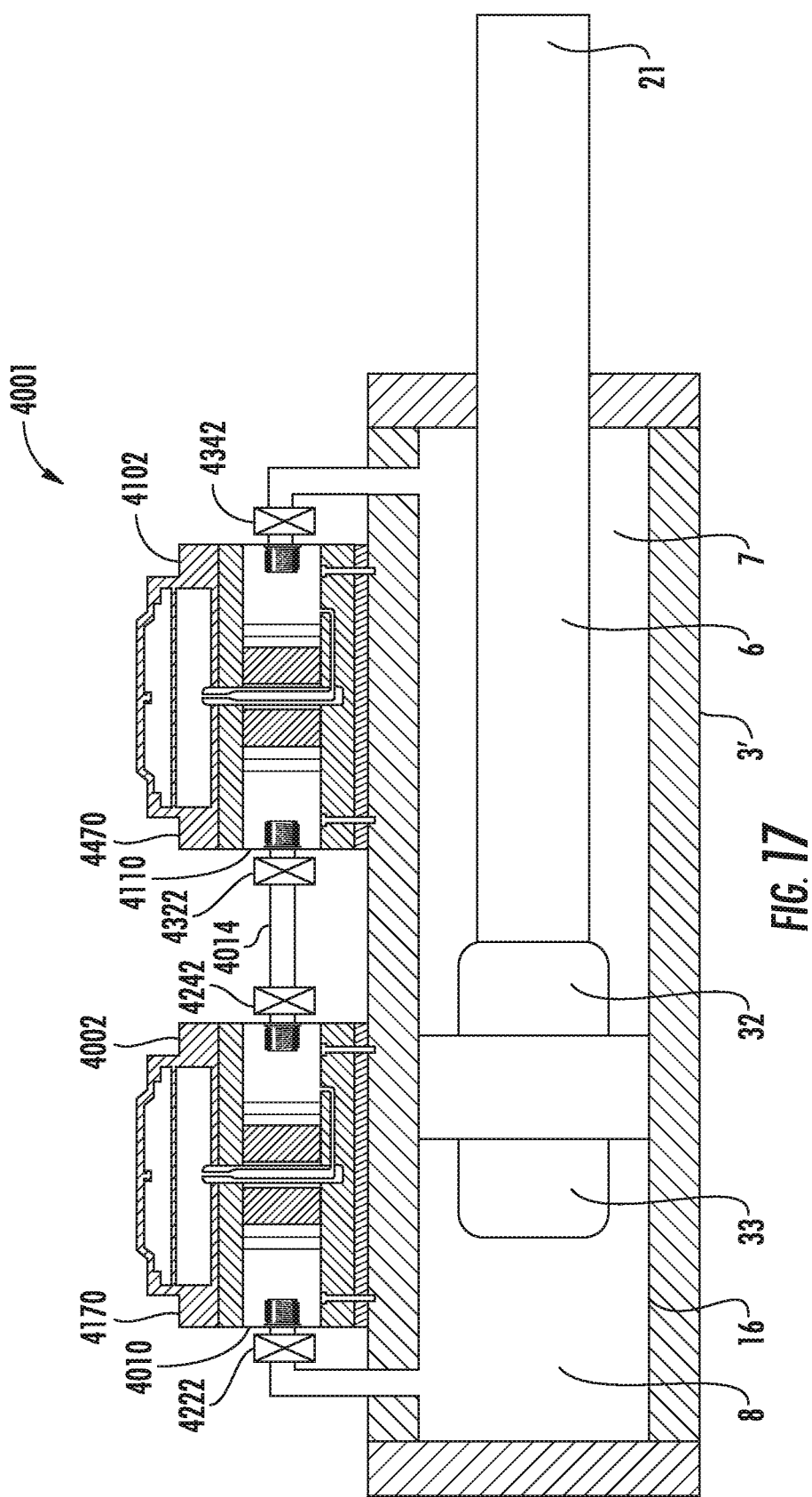
Figure 17B:
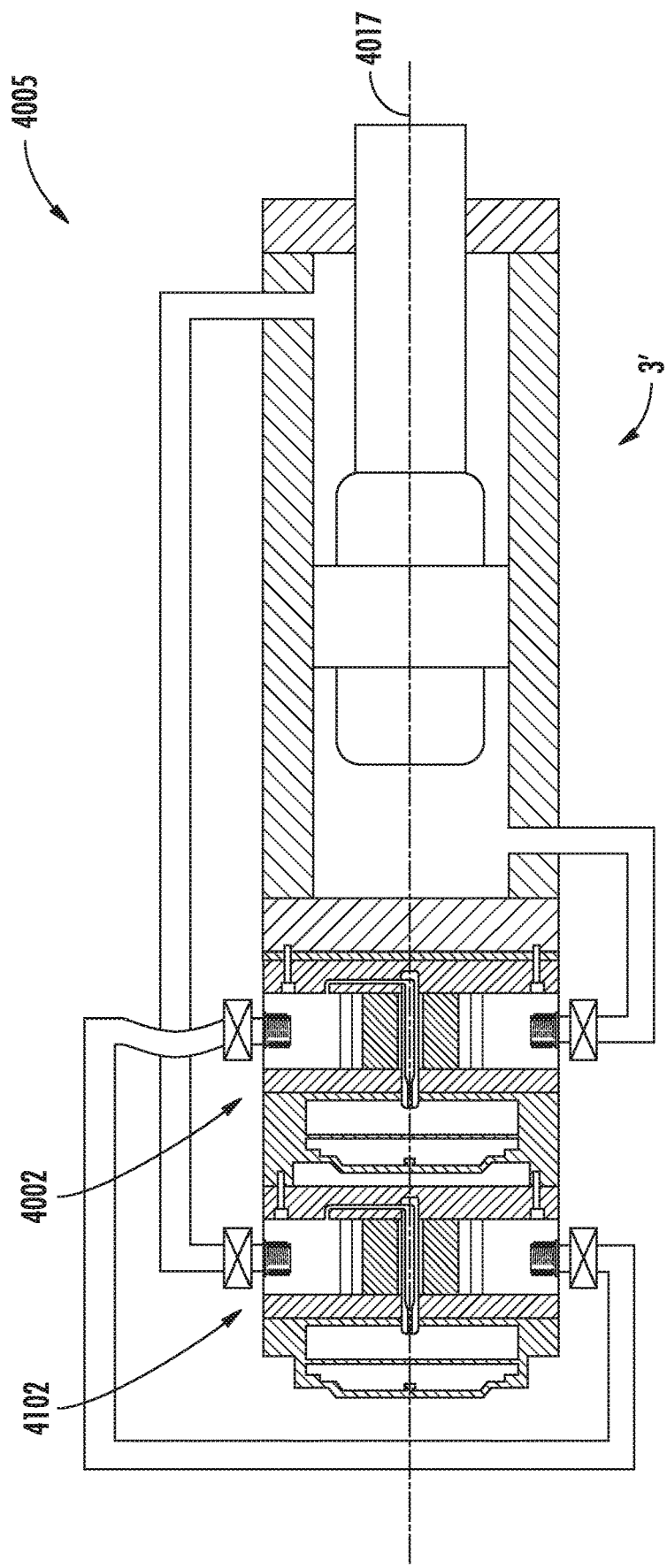
Figure 18:
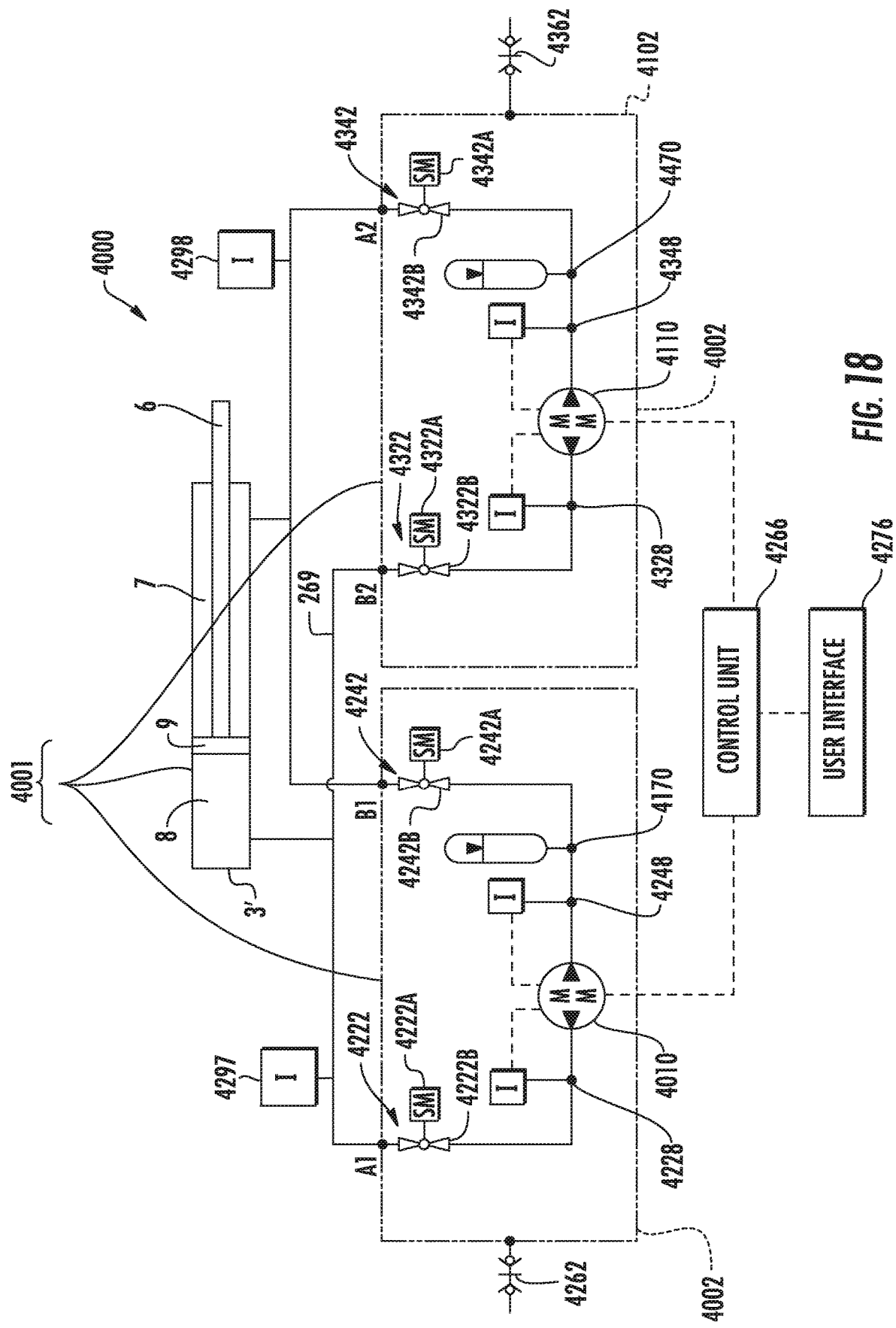
FIG. 18 is a schematic diagram illustrating an exemplary embodiment of a fluid system in a fluid-driven actuator application.

In the embodiment of FIG. 16 the pump assemblies 3002 and 3102 are configured in a parallel arrangement. However, in some applications, it can be desirable to have a plurality of pump assemblies in a series configuration as shown in FIGS. 17-17B and 18. By fluidly connecting the pumps in series, the overall system pressure can be increased. The description of the exemplary embodiments of serial configurations are provided with respect to a linear hydraulic actuator, e.g., a hydraulic cylinder. However, those skilled in the art understand that the description will be applicable to other types of hydraulic actuators. FIG. 17 illustrates an exemplary embodiment of a linear actuator assembly 4001 with serial configuration, i.e., pump assemblies 4002 and 4102 are connected in a series flow arrangement. The actuator assembly 4001 also includes hydraulic cylinder 3'. As seen in FIG. 17, the pump assemblies 4002 and 4102 are shown mounted side-by-side on a side surface of the hydraulic cylinder 3'. However, the mounting arrangements of the pump assemblies are not limited to the configuration of FIG. 17. As seen in linear actuator assembly 4003 shown in FIG. 17A, the pump assembly 4102 can be mounted on top of the pump assembly 4002 and the combined assembly can be mounted on a side of the hydraulic cylinder 3'. In the linear actuator assembly 4005 shown in FIG. 17B, the pump assembly 4102 is mounted on top of pump assembly 4002 and the combined assembly is mounted "in-line" with a longitudinal axis 4017 of the hydraulic cylinder. Of course, embodiments of serial-configurations are not limited to those illustrated in FIGS. 17-17B and the pump assemblies can be mounted on another location of the cylinder or mounted spaced apart from the cylinder as desired. The configuration of pump assemblies 4002 and 4102, including the corresponding fluid drivers and proportional control valve assemblies 4222, 4242, 4322, 4342, are similar to pump assemblies 3002 and 3102 and thus, for brevity, will not be further discussed except as necessary to describe the present embodiment. In addition, for brevity, operation of the series-configuration will be given with reference to linear actuator assembly 4001. However, those skilled in the art will recognize that the description is also applicable to linear actuator assemblies 4003 and 4005.

As seen in FIGS. 17 and 18, linear system 4000 includes a linear actuator assembly 4001 with pump assemblies 4002 and 4102 connected to hydraulic cylinder 3'. Specifically, port A1 of the pump assembly 4002 is in fluid communication with the extraction chamber 8 of the hydraulic cylinder 3'. A port B1 of the pump assembly 4002 is in fluid communication with the port 132 of the pump assembly 4102. A port A2 of the pump assembly 4102 is in fluid communication with the retraction chamber 7 of the hydraulic cylinder 3'. Coupling connectors 4262, 4362 may be provided at one or more locations in the assemblies 4020, 4040, respectively. The function of connectors 4262, 4362 is similar to that of connectors 3262 and 3362 discussed above.

As shown in FIG. 18, each of the hydraulic pumps 4010, 4110 includes two motors that are driven independently of each other. The respective motors may be controlled by the control unit 4266. In addition, the control valves 4222B, 4242B, 4322B, 4342B can also be controlled by the control unit 4266 by, e.g., operating the respective actuators 4222A, 4242A, 4322A, 4342A. Exemplary embodiments of actuators and control valves are discussed above and thus, for brevity, are not discussed further. Of course, the pump assemblies 4002 and 4102 are not limited to the illustrated drive-drive configuration and can be configured as any one of the drive-drive configurations discussed above, i.e., pumps that do not require flow-through shafts, pumps having a single prime mover and pumps with motors disposed outside the gears. In addition, although the above-embodiments include integrated storage devices, in some embodiments, the system does not include a storage device or the storage device is disposed separately from the pump. Operation and/or function of the valve assemblies 4222, 4242, 4322, 4342, sensor assemblies 4228, 4248, 4328, 4348, 4297, 4397 and the pumps 4010, 4110 can be similar to the embodiments discussed earlier, e.g., control unit 4266 can operate similar to control unit 3266, thus, for brevity, a detailed explanation is omitted here except as necessary to describe the series configuration of linear actuator assembly 4001.

As discussed above pump assemblies 4002 and 4102 are arranged in a series configuration where each of the hydraulic pumps 4010, 4110 includes two fluid drivers that are driven independently of each other. Thus, the control unit 4266 will operate two sets of motors (i.e., the motors of pumps 4010 and the motors of pump 4110) and two sets of control valves (i.e., the valves 4222B and 4242B and the valves 4322B and 4342B). This configuration allows for increased system pressure in the hydraulic system compared to when only one pump assembly is used. Although two pump assemblies are used in these embodiments, the overall operation of the system, whether in pressure, flow, or balanced mode operation, will be similar to the exemplary operations discussed above with respect to one pump assembly operation. Accordingly, only the differences with respect to individual pump operation are discussed below.

The control unit 4266 controls to the appropriate set point required by the hydraulic cylinder 3' for the selected mode of operation (i.e., a pressure set point, flow set point, or a combination of the two) by appropriately controlling each of the pump assemblies (i.e., pump/control valve combination) to maintain the desired overall set point (e.g., pressure, flow). For example, in pressure mode operation, the control unit 4266 can control the pump assemblies 4002, 4102 to provide the desired pressure at, e.g., the inlet to the extraction chamber 8 of hydraulic cylinder 3' during an extracting operation of the piston rod 6. In this case, the downstream pump assembly 4002 (i.e., the pump 4010 and control valves 4222B and 4242B) may be controlled, as discussed above, to maintain the desired pressure (or a predetermined range of a commanded pressure) at the inlet to extraction chamber 8. For example, the current (and thus the torque) of the pump 4010 and the opening of control valve 4222B may be controlled to maintain the desired pressure (or a predetermined range of a commanded pressure) at the extraction chamber 8 as discussed above with respect to single pump assembly operation. However, with respect to the upstream pump assembly 4102 (i.e., the pump 4110 and valves 4322B and 4342B), the control unit 4266 can control the pump assembly 4102 such that the flow rate through the pump assembly 4102 matches (or corresponds to, e.g., within a predetermined range of) the flow rate through the downstream pump assembly 4002 to prevent cavitation or other flow disturbances. That is, the actual flow rate through the pump assembly 4002 will act as the flow set point for the pump assembly 4102 and the control unit 4266 will operate the pump assembly 4102 in a flow control mode. The flow control mode of the pump assembly 4102 may be similar to that discussed above with respect to one pump assembly operation. Along with the flow, the inlet and outlet parameters, e.g. pressures, temperatures and flows, of the pump assemblies 4002 and 4102 can be monitored by sensor assemblies 4228, 4248, 4328, 4348 (or other system sensors) to detect signs of cavitation or other flow and pressure disturbances. The control unit 4266 may be configured to take appropriate actions based on these signs. By monitoring the other parameters such as pressures, minor differences in the flow monitor values for the pumps 4010 and 4110 due to measurement errors can be accounted for. For example, in the above case (i.e., extracting operation of the piston rod 6), if the flow monitor for the flow through the pump 4110 is reading higher than the actual flow, the pump 4010 could experience cavitation because the actual flow from the pump 4110 will be less that that required by the pump 4010. By monitoring other parameters, e.g., inlet and outlet pressures, temperatures, and/or flows of the pumps 4010 and 4110, the control unit 4266 can determine that the flow through the pump 4110 is reading higher than the actual flow and take appropriate actions to prevent cavitation by appropriately adjusting the flow set point for the pump 4110 to increase the flow from the pump 4110. Based on the temperature, pressure, and flow measurements in the system, e.g., from sensor assemblies 4228, 4248, 4328, 4348, 4297, 4298 the control unit 4266 can be configured to diagnose potential problems in the system (due to e.g., measurement errors or other problems) and appropriately adjust the pressure set point or the flow set point to provide smooth operation of the hydraulic system. Of course, the control unit 4266 can also be configured to safely shutdown the system if the temperature, pressure, or flow measurements indicate there is a major problem.

Conversely, during an retracting operation of the piston rod 6, the pump assembly 4002 (i.e., the pump 4010 and valves 4222B and 4242B) becomes an upstream pump assembly and the pump assembly 4102 (i.e., the pump 4110 and valves 4322B and 4342B) becomes a downstream pump assembly. The above-discussed control process during the extracting operation can be applicable to the control process during a retracting operation, thus detailed description is omitted herein. In addition, although the upstream pump can be configured to control the flow to the downstream pump, in some embodiments, the upstream pump can maintain the pressure at the suction of the downstream pump at an appropriate value, i.e., to eliminate or reduce the risk cavitation.

In flow mode operation, the control unit 4266 may control the speed of one or more of the pump motors to achieve the flow desired by the system. The speed of each pump and the corresponding control valves may be controlled to the desired flow set point or, similar to the pressure mode of operation discussed above, the downstream pump assembly, e.g., pump assembly 4002 in the above example, may be controlled to the desired flow set point and the upstream pump assembly, e.g., pump assembly 4102, may be controlled to match the actual flow rate through pump assembly 4002 or maintain the pressure at the suction to pump assembly 4002 at an appropriate value. As discussed above, along with the flow through each pump assembly, the inlet and outlet pressures and temperatures of each pump assembly may be monitored (or some other temperature, pressure and flow parameters) to detect signs of cavitation or other flow and pressure disturbances. As discussed above, the control unit 4266 may be configured to take appropriate actions based on these signs. In addition, although the upstream pump can be configured to control the flow to the downstream pump, in some embodiments, the upstream pump can maintain the pressure at the suction of the downstream pump at an appropriate value, i.e., to eliminate or reduce the risk cavitation.

Figure 19:
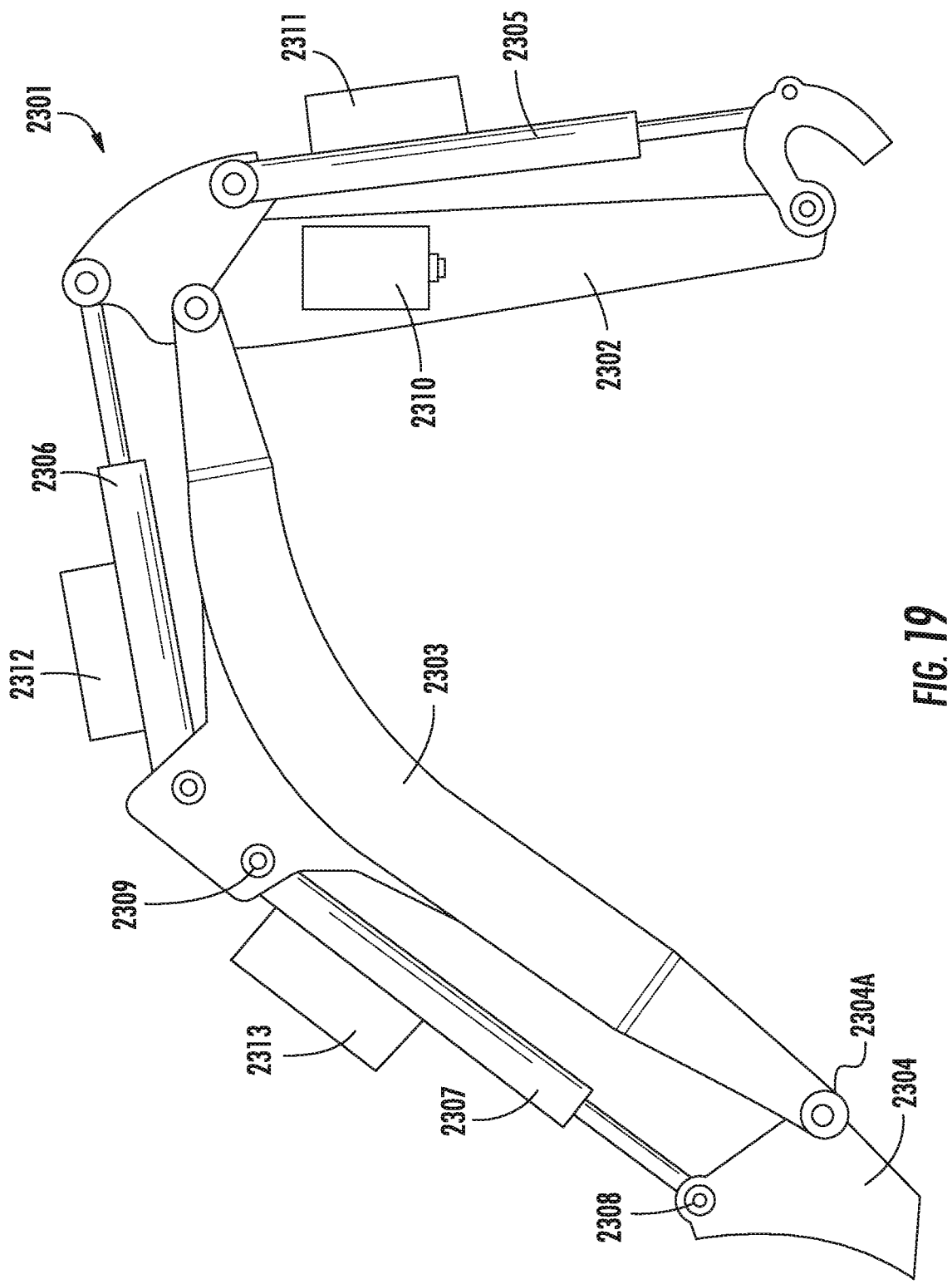
FIG. 19 shows an illustrative configuration of an articulated boom structure of an excavator when a plurality of fluid-driven actuator assemblies of the present disclosure are installed on the boom structure.

The fluid-driven actuator assemblies discussed above can be a component in systems, e.g., industrial machines, in which one structural element is moved or translated relative to another structural element. In some embodiment, the extraction and retraction of the fluid-driven actuator, e.g., hydraulic cylinder, will provide a linear or telescoping movement between the two structural elements, e.g., a hydraulic car lift. In other embodiments, where the two structures are pivotally attached, the linear actuator can provide a rotational or turning movement of one structure relative to the other structure. For example, FIG. 19 shows an exemplary configuration of an articulated boom structure 2301 of an excavator when a plurality of any of the linear actuator assemblies of the present disclosure are installed on the boom structure 2301. The boom structure 2301 may include an arm 2302, a boom 2303, and a bucket 2304. As shown in FIG. 19, the arm 2302, boom 2303, and bucket 2304 are driven by an arm actuator 2305, a boom actuator 2306, and a bucket actuator 2307, respectively. The dimensions of each linear actuator assembly 2305, 2306, 2307 can vary depending on the geometry of the boom structure 2301. For example, the axial length of the bucket actuator assembly 2307 may be larger than that of the boom actuator assembly 2306. Each actuator assembly 2305, 2306, 2307 can be mounted on the boom structure 2301 at respective mounting structures.

In the boom structure of 2301, each of the linear actuator assemblies is mounted between two structural elements such that operation of the linear actuator assembly will rotate one of the structural element relative to the other around a pivot point. For example, one end of the bucket actuator assembly 2307 can be mounted at a boom mounting structure 2309 on the boom 2303 and the other end can be mounted at a bucket mounting structure 2308 on the bucket 2304. The attachment to each mounting structure 2309 and 2303 is such that the ends of the bucket actuator assembly 2307 are free to move rotationally. The bucket 2304 and the boom 2303 are pivotally attached at pivot point 2304A. Thus, extraction and retraction of bucket actuator assembly 2307 will rotate bucket 2304 relative to boom 2303 around pivot point 2304A. Various mounting structures for linear actuators (e.g., other types of mounting structures providing relative rotational movement, mounting structures providing linear movement, and mounting structure providing combinations of rotational and linear movements) are known in the art, and thus a detailed explanation other types of mounting structures is omitted here.

Each actuator assembly 2305, 2306, 2307 may include a hydraulic pump assembly and a hydraulic cylinder and can be any of the drive-drive linear actuator assemblies discussed above. In the exemplary embodiment of the boom structure 2301, the respective hydraulic pump assemblies 2311, 2312, 2313 for actuator assemblies 2305, 2306, 2307 are mounted on the top of the corresponding hydraulic cylinder housings. However, in other embodiments, the hydraulic pump assemblies may be mounted on a different location, for example at the rear end of the cylinder housing 4 as illustrated in FIG. 2A.

In addition to linear actuator assemblies, the boom structure 2301 can also include an auxiliary pump assembly 2310 to provide hydraulic fluid to other hydraulic device such as, e.g., portable tools, i.e., for operations other than boom operation. For example, a work tool such as a jackhammer may be connected to the auxiliary pump assembly 2310 for drilling operation. The configuration of auxiliary pump assembly 2310 can be any of the drive-drive or driver-driven pump assemblies discussed above. Each actuator assembly 2305, 2306, 2307 and the auxiliary pump 2310 can be connected, via wires (not shown), to a generator (not shown) mounted on the excavator such that the electric motor(s) of each actuator and the auxiliary pump can be powered by the generator. In addition, the actuators 2305, 2306, 2307 and the auxiliary pump 2310 can be connected, via wires (not shown), to a controller (not shown) to control operations as described above with respect to control unit 266/drive unit 295. Because each of the linear actuator assemblies are closed-loop hydraulic systems, the excavator using the boom structure 2301 does not require a central hydraulic storage tank or a large central hydraulic pump, including associated flow control devices such as a variable displacement pump or directional flow control valves. In addition, hydraulic hoses and pipes do not have to be run to each actuator as in conventional systems. Accordingly, an excavator or other industrial machine using the linear actuator assemblies of the present disclosure will not only be less complex and lighter, but the potential sources of contamination into the hydraulic system will be greatly reduced.

The articulated boom structure 301 with the linear actuators 305, 306, 307 of an excavator described above is only for illustrative purpose and application of the linear actuator assembly 1 of the present disclosure is not limited to operating the boom structure of an excavator. For example, the linear actuator assembly 1 of the present disclosure can be applied to various other machinery such as backhoes, cranes, skid-steer loaders, and wheel loaders.

Embodiments of the controllers in the present disclosure can be provided as a hardwire circuit and/or as a computer program product. As a computer program product, the product may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), field programmable gate arrays (FPGAs), application-specific integrated circuits (ASICs), vehicle identity modules (VIMs), magnetic or optical cards, flash memory, or other type of media/machine-readable medium suitable for storing electronic instructions.

The term "module" refers broadly to a software, hardware, or firmware (or any combination thereof) component. Modules are typically functional components that can generate useful data or other output using specified input(s). A module may or may not be self-contained. The controllers discussed above may include one or more modules.

Although the above drive-drive embodiments were described with respect to an external gear pump arrangement with spur gears having gear teeth, it should be understood that those skilled in the art will readily recognize that the concepts, functions, and features described below can be readily adapted to external gear pumps with other gear configurations (helical gears, herringbone gears, or other gear teeth configurations that can be adapted to drive fluid), internal gear pumps with various gear configurations, to pumps having more than two prime movers, to prime movers other than electric motors, e.g., hydraulic motors or other fluid-driven motors, inter-combustion, gas or other type of engines or other similar devices that can drive a fluid displacement member, and to fluid displacement members other than an external gear with gear teeth, e.g., internal gear with gear teeth, a hub (e.g. a disk, cylinder, other similar component) with projections (e.g. bumps, extensions, bulges, protrusions, other similar structures or combinations thereof), a hub (e.g. a disk, cylinder, or other similar component) with indents (e.g., cavities, depressions, voids or other similar structures), a gear body with lobes, or other similar structures that can displace fluid when driven. Accordingly, for brevity, detailed description of the various pump configurations are omitted. In addition, those skilled in the art will recognize that, depending on the type of pump, the synchronizing contact (drive-drive) can aid in the pumping of the fluid instead of or in addition to sealing a reverse flow path. For example, in certain internal-gear georotor configurations, the synchronized contact or meshing between the two fluid displacement members also aids in pumping the fluid, which is trapped between teeth of opposing gears. Further, while the above embodiments have fluid displacement members with an external gear configuration, those skilled in the art will recognize that, depending on the type of fluid displacement member, the synchronized contact or meshing is not limited to a side-face to side-face contact and can be between any surface of at least one projection (e.g. bump, extension, bulge, protrusion, other similar structure, or combinations thereof) on one fluid displacement member and any surface of at least one projection (e.g. bump, extension, bulge, protrusion, other similar structure, or combinations thereof) or indent (e.g., cavity, depression, void or other similar structure) on another fluid displacement member.

The fluid displacement members, e.g., gears in the above embodiments, can be made entirely of any one of a metallic material or a non-metallic material. Metallic material can include, but is not limited to, steel, stainless steel, anodized aluminum, aluminum, titanium, magnesium, brass, and their respective alloys. Non-metallic material can include, but is not limited to, ceramic, plastic, composite, carbon fiber, and nano-composite material. Metallic material can be used for a pump that requires robustness to endure high pressure, for example. However, for a pump to be used in a low pressure application, non-metallic material can be used. In some embodiments, the fluid displacement members can be made of a resilient material, e.g., rubber, elastomeric material, to, for example, further enhance the sealing area.

Alternatively, the fluid displacement member, e.g., gears in the above embodiments, can be made of a combination of different materials. For example, the body can be made of aluminum and the portion that makes contact with another fluid displacement member, e.g., gear teeth in the above exemplary embodiments, can be made of steel for a pump that requires robustness to endure high pressure, a plastic for a pump for a low pressure application, a elastomeric material, or another appropriate material based on the type of application.

Exemplary embodiments of the fluid delivery system can displace a variety of fluids. For example, the pumps can be configured to pump hydraulic fluid, engine oil, crude oil, blood, liquid medicine (syrup), paints, inks, resins, adhesives, molten thermoplastics, bitumen, pitch, molasses, molten chocolate, water, acetone, benzene, methanol, or another fluid. As seen by the type of fluid that can be pumped, exemplary embodiments of the pump can be used in a variety of applications such as heavy and industrial machines, chemical industry, food industry, medical industry, commercial applications, residential applications, or another industry that uses pumps. Factors such as viscosity of the fluid, desired pressures and flow for the application, the configuration of the fluid displacement member, the size and power of the motors, physical space considerations, weight of the pump, or other factors that affect pump configuration will play a role in the pump arrangement. It is contemplated that, depending on the type of application, the exemplary embodiments of the fluid delivery system discussed above can have operating ranges that fall with a general range of, e.g., 5000 rpm. Of course, this range is not limiting and other ranges are possible.

The pump operating speed can be determined by taking into account factors such as viscosity of the fluid, the prime mover capacity (e.g., capacity of electric motor, hydraulic motor or other fluid-driven motor, internal-combustion, gas or other type of engine or other similar device that can drive a fluid displacement member), fluid displacement member dimensions (e.g., dimensions of the gear, huh with projections, hub with indents, or other similar structures that can displace fluid when driven), desired flow rate, desired operating pressure, and pump bearing load. In exemplary embodiments, for example, applications directed to typical industrial hydraulic system applications, the operating speed of the pump can be, e.g., in a range of 300 rpm to 900 rpm. In addition, the operating range can also be selected depending on the intended purpose of the pump. For example, in the above hydraulic pump example, a pump configured to operate within a range of 1-300 rpm can be selected as a stand-by pump that provides supplemental flow as needed in the hydraulic system. A pump configured to operate in a range of 300-600 rpm can be selected for continuous operation in the hydraulic system, while a pump configured to operate in a range of 600-900 rpm can be selected for peak flow operation. Of course, a single, general pump can be configured to provide all three types of operation.

The applications of the exemplary embodiments can include, but are not limited to, reach stackers, wheel loaders, forklifts, mining, aerial work platforms, waste handling, agriculture, truck crane, construction, forestry, and machine shop industry. For applications that are categorized as light size industries, exemplary embodiments of the pump discussed above can displace from 2 $cm^3$/rev (cubic centimeters per revolution) to 150 $cm^3$/rev with pressures in a range of 1500 psi to 3000 psi, for example. The fluid gap, i.e., tolerance between the gear teeth and the gear housing which defines the efficiency and slip coefficient, in these pumps can be in a range of +0.00-0.05 min, for example. For applications that are categorized as medium size industries, exemplary embodiments of the pump discussed above can displace from 150 cm$^3$/rev to 300 cm$^3$/rev with pressures in a range of 3000 psi to 5000 psi and a fluid gap in a range of +0.00-0.07 mm, for example. For applications that are categorized as heavy size industries, exemplary embodiments of the pump discussed above can displace from 300 cm$^3$/rev to 600 cm$^3$/rev with pressures in a range of 3000 psi to 12,000 psi and a fluid gap in a range of +0.00-0.0125 mm, for example.

In addition, the dimensions of the fluid displacement members can vary depending on the application of the pump. For example, when gears are used as the fluid displacement members, the circular pitch of the gears can range from less than 1 mm (e.g., a nano-composite material of nylon) to a few meters wide in industrial applications. The thickness of the gears will depend on the desired pressures and flows for the application.

In some embodiments, the speed of the prime mover, e.g., a motor, that rotates the fluid displacement members, e.g., a pair of gears, can be varied to control the flow from the pump. In addition, in some embodiments the torque of the prime mover, e.g., motor, can be varied to control the output pressure of the pump.

Listing of Certain Embodiments

1. A hydraulic system comprising:
a hydraulic pump to provide fluid to a hydraulic actuator having first and second ports, the pump including,
   a first motor to rotate a first gear having a plurality of first gear teeth, the first motor being at least one of a variable-speed and a variable-torque motor, and
   a second motor to rotate a second gear having a plurality of second gear teeth, the second motor being at least one of a variable-speed and a variable-torque motor, the first gear and second gear disposed so as to transfer fluid from an inlet port of the hydraulic pump to an outlet port of the hydraulic pump;
a control valve assembly including,
   a control valve disposed on a side of the outlet port with respect to a direction of fluid flow, the control valve in fluid communication with the first port and the outlet port, and
   a control valve actuator to operate the control valve; and
a controller having a hydraulic control module for controlling hydraulic functions in the hydraulic system, the controller communicating with a pump control circuit to establish at least one of a speed and a torque of the first and second motors to adjust at least one of a flow in the hydraulic system to a flow set point and a pressure in the hydraulic system to a pressure set point, and communicating with a valve control circuit to concurrently establish an opening of the control valve to adjust at least one of the flow to the flow set point and the pressure to the pressure set point,
   wherein the controller establishes a position of at least one first tooth of the plurality of first gear teeth relative to a position of at least one second tooth of the plurality of second gear teeth so as to create synchronized contact between the first gear and the second gear to seal a fluid path from the outlet of the pump to the inlet of the pump.

2. The hydraulic system of embodiment 1, wherein the controller includes a plurality of operational modes including at least one of a flow control mode, a pressure control mode, and a balanced control mode.

3. The hydraulic system of embodiment 2, wherein, in the balanced control mode, the pump control circuit controls the first and second motors to adjust the pressure in the system to the pressure set point and the valve control circuit concurrently controls the control valve to adjust the flow in the system to the flow set point.

4. The hydraulic system of embodiment 2, wherein, in the pressure control mode, the pump control circuit controls the first and second motors to adjust the pressure in the system to the pressure set point and the valve control circuit concurrently controls the control valve to adjust the pressure in the system to the pressure set point.

5. The hydraulic system of embodiment 2, wherein, in the flow control mode, the pump control circuit controls the first and second motors to adjust the flow in the system to the flow set point and the valve control circuit concurrently controls the control valve to adjust the flow in the system to the flow set point.

6. The hydraulic system of any one of embodiments 1 to 5, wherein the pump control circuit includes a motion control module that, based on at least one of the flow and the pressure in the hydraulic system, provides a first demand signal to the first motor and a second demand signal to the second motor, and
   wherein the motion control module adjusts at least one of the first demand signal and the second demand signal based on at least one of a first position feedback signal relating to the position of the at least one first tooth and a second position feedback signal relating to the position of the at least one second tooth.

7. The hydraulic system of any one of embodiments 1 to 6, wherein the hydraulic actuator is a hydraulic cylinder or a hydraulic motor.

8. The hydraulic system of embodiment 7, wherein the hydraulic system s a closed-loop system.

9. The hydraulic system of any one of embodiments 1 to 8, further comprising:
a second control valve assembly including,
   a second control valve disposed on a side of the inlet port with respect to the direction of fluid flow, the second control valve in fluid communication with the second port and the inlet port, and
   a second control valve actuator to operate the second control valve,
wherein the controller establishes the opening of the control valve and an opening of the second control valve to adjust the at least one of the flow to the flow set point and the pressure to the pressure set point.

10. The hydraulic system of any one of embodiments 1 to 9, further comprising:
at least one of a pressure transducer, a temperature transducer, and a flow transducer.

11. The hydraulic system of any one of embodiments 1 to 10, wherein the first and second valves are ball valves.

12. The hydraulic system of embodiment 11, wherein the controller includes one or more characteristic curves for the ball valves, which correlate a rotational position of each ball valve to a cross-sectional opening of the ball valves.

13. The hydraulic system of any one of embodiments 1 to 12, wherein the synchronized contact is such that a slip coefficient is 5% or less.

14. The hydraulic system of any one of embodiments 1 to 13, wherein the first and second motors have an outer-rotor configuration.

15. The hydraulic system of any one of embodiments 1 to 14, wherein the first gear and the second gear rotate in a same direction.

16. The hydraulic system of any one of embodiments 1 to 15, wherein the first gear and the second gear rotate in opposite directions.

17. The hydraulic system of any one of embodiments 1 to 16, wherein the hydraulic pump, the control valve and the hydraulic actuator are conjoined to form an integrated unit.

18. The hydraulic system of embodiment 17, wherein the hydraulic pump, the control valve, the second control valve and the hydraulic actuator are conjoined to form an integrated unit.

19. The hydraulic system of any one of embodiments 1 to 18, wherein at least one of the first motor and the second motor is respectively disposed within the first gear and the second gear.

20. The hydraulic system of embodiment 19, wherein each of the first motor and the second motor is respectively disposed within the first gear and the second gear.

21. The hydraulic system of any one of embodiments 1 to 20, further comprising a storage device in fluid communication with the hydraulic pump to store hydraulic fluid.

22. The hydraulic system of embodiment 21, wherein the hydraulic pump, the control valve, the second control valve, the storage device and the hydraulic actuator are conjoined to form an integrated unit.

23. The hydraulic system of any one of embodiments 18, 19 and 21, wherein the hydraulic pump is conjoined along a longitudinal axis of the hydraulic actuator.

24. The hydraulic system of any one of embodiments 1 to 23, wherein the controller includes one or more characteristic curves for the hydraulic pump.

25. The hydraulic system of any one of embodiments 1 to 18, wherein at least one of the first motor and the second motor is respectively disposed within the first gear and includes a flow-through shaft connecting a storage device to at least one of the input and output of the hydraulic pump.

26. The hydraulic system of any one of embodiments 1 to 25, wherein the hydraulic pump operates in a range of 1 rpm to 5000 rpm.

27. The hydraulic system of embodiment 1 to 25, wherein the hydraulic pump operates in a range of 300 rpm to 900 rpm.

28. The hydraulic system of any one of embodiments 1 to 27, wherein the first motor and the second motor are bi-directional.

29. The hydraulic system of any one of embodiments 1 to 28, wherein at least one of the first gear and the second gear is made of a metallic material.

30. The hydraulic system of any one of embodiments 1 to 29, wherein at least one of the first gear and the second gear is made of a non-metallic material.

31. The hydraulic system of embodiment 29, wherein the metallic material comprises at least one of steel, stainless steel, anodized aluminum, aluminum, titanium, magnesium, brass, and respective alloys thereof.

32. The hydraulic system of embodiment 30, wherein the non-metallic material comprises at least one of ceramic, plastic, composite, carbon fiber, nano-composite material, rubber, and an elastomeric.

33. The hydraulic system of any one of embodiments 13 to 32, wherein the synchronized contact is such that the slip coefficient is at least one of 5% or less for a pump pressure in a range of 3000 psi to 5000 psi, 3% or less for a pump pressure in a range of 2000 psi to 3000 psi, 2% or less for a pump pressure in a range of 1000 psi to 2000 psi and 1% or less for a pump pressure in a range up to 1000 psi.

34. The hydraulic system of any one of embodiments 1 to 33, wherein the hydraulic pump includes at least one of balancing plates, cooling grooves, sloped inlet segment and sloped outlet segment.

35. A method for controlling a fluid flow in a fluid system, the fluid system including a fluid pump and at least one control valve throttleable between a closed position and an open position, the fluid pump to provide fluid to an actuator that controls a load, the fluid pump including at a first motor to rotate a first fluid displacement member and a second motor to rotate a second fluid displacement member, the method comprising:
  initiating at least one of a variable-speed and variable-torque operation of the fluid pump;
  establishing a pump demand signal to control at least one of a speed and a torque of the first and second motors to adjust at least one of a flow in the fluid system to a flow set point and a pressure in the fluid system to a pressure set point;
  establishing, concurrently with the pump demand signal, a valve demand signal to control an opening of the at least one control valve to adjust at least one of the flow to the flow set point and the pressure to the pressure set point; and
  providing a first motor demand signal to the first motor and a second motor demand signal to the second motor based on the pump demand signal;
  establishing concurrently with the pump demand signal a valve demand signal to control an opening of the at least one control valve to adjust at least one of the flow to the flow set point and the pressure to the pressure set point; and
  establishing a first position of at least one of a first protrusion and indent on the first fluid displacement member relative to a second position of at least one of a second protrusion and indent on the second fluid displacement member so as to create synchronized contact between the first fluid displacement member and the second fluid displacement member to seal a fluid path from the outlet of the pump to the inlet of the pump.

36. The method of embodiment 35, further comprising:
  establishing a plurality of operational modes in the fluid system including at least one of a flow control mode, a pressure control mode, and a balanced control mode.

37. The method of embodiment 36, wherein, in the balanced control mode, the first and second motors adjust the pressure in the system to the pressure set point and the control valve concurrently adjusts the flow in the system to the flow set point.

38. The method of embodiment 36, wherein, in the pressure control mode, the first and second motors adjust the pressure in the system to the pressure set point and the control valve concurrently adjusts the pressure in the system to the pressure set point.

39. The method of embodiment 36, wherein, in the flow control mode, the first and second motors adjust the flow in the system to the flow set point and the control valve concurrently adjusts the flow in the system to the flow set point.

40. The method of any one of embodiments 35 to 39, further comprising:
adjusting at least one of the first motor demand signal and the second motor demand signal based on at least one of a first position feedback signal relating to the first position and a second position feedback signal relating to the second position.

41. The method of any one of embodiments 35 to 40, wherein the operation of the fluid pump is initiated in a closed-loop system.

42. The method of any one of embodiments 35 to 41, wherein the synchronized contact is such that a slip coefficient is 5% or less.

43. The method of any one of embodiments 35 to 42, wherein the at least one control valve includes a first control valve disposed at an outlet of the pump and a second control valve disposed at an inlet of the pump.

44. The method of any one of embodiments 35 to 43, wherein the first fluid displacement member and the second fluid displacement member are rotated in a same direction.

45. The method of any one of embodiments 35 to 43, wherein the first fluid displacement member and the second fluid displacement member are rotated in opposite directions.

46. The method of any one of embodiments 35 to 45, wherein the hydraulic pump is operated in a range of 1 rpm to 5000 rpm.

47. The method of embodiment 46, wherein the fluid pump is operated in a range of 300 rpm to 900 rpm.

48. The method of any one of embodiments 35 to 47, wherein the first motor and the second motor are bi-directional.

49. The method of any one of embodiments 35 to 48, wherein the synchronized contact is such that the slip coefficient is at least one of 5% or less for a pump pressure in a range of 3000 psi to 5000 psi, 3% or less for a pump pressure in a range of 2000 psi to 3000 psi, 2% or less for a pump pressure in a range of 1000 psi to 2000 psi and 1% or less for a pump pressure in a range up to 1000 psi.

50. A fluid pumping system comprising:
a pump to provide fluid to an actuator that is operated by the fluid, the pump including,
a first fluid driver including,
a first prime mover, the first prime mover being at least one of a variable-speed and a variable-torque prime mover, and
a first fluid displacement member to be driven by the first prime mover;
a second fluid driver including;
a second prime mover, the second prime mover being at least one of a variable-speed and a variable-torque prime mover, and
a second fluid displacement member to be driven by the second prime mover, the first fluid displacement member and the second fluid displacement member being disposed so as to transfer fluid from an inlet port of the pump to an outlet port of the pump;
a proportional control valve assembly including,
a proportional control valve disposed in the fluid pumping system such that the proportional control valve is in fluid communication with the pump, and
a valve actuator to operate the proportional control valve; and
a controller having a fluid control module for controlling fluid-related functions in the system, the controller communicating with a pump control circuit to establish at least one of a speed and a torque of the first and second prime movers to adjust at least one of a flow in the system to a flow set point and a pressure in the system to a pressure set point, and communicating with a valve control circuit to concurrently establish an opening of the proportional control valve to adjust at least one of the flow to the flow set point and the pressure to the pressure set point,
wherein the controller establishes a first position of at least one of a first protrusion and indent on the first fluid displacement member relative to a second position of at least one of a second protrusion and indent on the second fluid displacement member so as to create synchronized contact between the first fluid displacement member and the second fluid displacement member to seal a fluid path from the outlet of the pump to the inlet of the pump.

51. The fluid pumping system of embodiment 50, wherein the controller includes a plurality of operational modes including at least one of a flow control mode, a pressure control mode, and a balanced control mode.

52. The fluid pumping system of embodiment 51, wherein, in the balanced control mode, the pump control circuit controls the first and second prime movers to adjust the pressure in the system to the pressure set point and the valve control circuit concurrently controls the proportional control valve to adjust the flow in the system to the flow set point.

53. The fluid pumping system of embodiment 51, wherein, in the pressure control mode, the pump control circuit controls the first and second prime movers to adjust the pressure in the system to the pressure set point and the valve control circuit concurrently controls the proportional control valve to adjust the pressure in the system to the pressure set point.

54. The fluid pumping system of embodiment 51, wherein, in the flow control mode, the pump control circuit controls the first and second prime movers to adjust the flow in the system to the flow set point and the valve control circuit concurrently controls the proportional control valve to adjust the flow in the system to the flow set point.

55. The fluid pumping system of any one of embodiments 50 to 54, wherein the pump control circuit includes a motion control module that, based on at least one of the flow and the pressure in the hydraulic system, provides a first demand signal to the first prime mover and a second demand signal to the second prime mover, and
wherein the motion control module adjusts at least one of the first demand signal and the second demand signal based on at least one of a first position feedback signal relating to the position of the at least one of a first protrusion and indent on the first fluid displacement member and a second position feedback signal relating to the position of the at least one of a second protrusion and indent on the second fluid displacement member.

56. The fluid pumping system of any one of embodiments 50 to 55, wherein the first fluid displacement member and the second fluid displacement member are each independently driven by the respective first and second prime movers.

57. The fluid pumping system of any one of embodiments 50 to 56, wherein the first prime mover is disposed within the first fluid displacement member and the second prime mover is disposed within the second fluid displacement member.

58. The fluid pumping system of any one of embodiments 50 to 57, wherein the actuator is one of a fluid-driven cylinder and a fluid-driven motor.

59. The fluid pumping system of embodiment 58, wherein the fluid pumping system is a closed-loop system.

60. The fluid pumping system of any one of embodiments 50 to 59, further comprising:
a second proportional control valve assembly including,
a second proportional control valve, and
a second valve actuator to operate the second proportional control valve,
wherein the controller establishes the opening of the proportional control valve and an opening of the second proportional control valve to adjust the at least one of the flow to the flow set point and the pressure to the pressure set point.

61. The fluid pumping system of embodiment 60, wherein the proportional control valve assembly is disposed downstream of the pump with respect to a fluid flow and the second proportional control valve assembly is disposed upstream of the pump with respect to the fluid flow.

62. The fluid pumping system of embodiment 61, wherein the controller maintains a constant opening on the second proportional control and establishes the opening of the proportional control valve.

63. The fluid pumping system of any one of embodiments 50 to 62, wherein the synchronized contact is such that a slip coefficient is 5% or less.

64. The fluid pumping system of embodiment 63, wherein the slip coefficient is one of 5% or less for pump pressures in a range of 3000 psi to 5000 psi, 3% or less for pump pressures in a range of 2000 psi to 3000 psi, 2% or less for pump pressures in a range of 1000 psi to 2000 psi, and 1% or less for pump pressures in a range up to 1000 psi.

65. The fluid pumping system of any one of embodiments 50 to 64, wherein the first fluid driver and the second fluid driver rotate in a same direction.

66. The fluid pumping system of any one of embodiments 50 to 64, wherein the first fluid driver and the second fluid driver rotate in opposite directions.

67. The fluid pumping system of any one of embodiments 50 to 66, wherein the fluid is hydraulic fluid.

68. The fluid pumping system of any one of embodiments 50 to 66, wherein the fluid is water.

69. A hydraulic system comprising:
a fluid-driven hydraulic actuator having first and second ports;
a first hydraulic pump assembly connected to the fluid-driven hydraulic actuator, the first hydraulic pump assembly to provide hydraulic fluid to operate the fluid-driven hydraulic actuator, the first hydraulic pump assembly including,
a first hydraulic pump having a casing defining a first interior volume, the casing having a third port in fluid communication with the first interior volume, and a fourth port in fluid communication with the first interior volume, the first hydraulic pump having a first fluid driver and a second fluid driver disposed inside the first interior volume, each of the first and second fluid drivers having at least one of a variable-speed and a variable torque motor;
a first proportional control valve assembly in fluid communication with the first and third ports, and
a second proportional valve assembly in fluid communication with the second and fourth ports; and
a second hydraulic pump assembly connected to the fluid-driven hydraulic actuator, the first hydraulic pump assembly and the second hydraulic pump assembly arranged in a parallel flow configuration to provide hydraulic fluid to operate the fluid-driven hydraulic actuator, the second hydraulic pump assembly including,
a second hydraulic pump having a casing defining a second interior volume, the casing having a fifth port in fluid communication with the second interior volume, and a sixth port in fluid communication with the second interior volume, the second hydraulic pump having a third fluid driver and a fourth fluid driver disposed inside the second interior volume, each of the third and fourth fluid drivers having at least one of a variable-speed and a variable torque motor;
a third valve assembly in fluid communication with the first and fifth ports, and
a fourth valve assembly in fluid communication with the second and sixth ports; and
a controller having a hydraulic control module for controlling hydraulic functions in the hydraulic system, the controller communicating with a pump control circuit to establish at least one of a speed and a torque of each motor in the first, second, third and fourth fluid drivers to adjust at least one of a flow in the hydraulic system to a flow set point and a pressure in the hydraulic system to a pressure set point, and communicating with a valve control circuit to concurrently establish respective openings of the first, second, third and fourth valve assemblies to adjust at least one of the flow to the flow set point and the pressure to the pressure set point,
wherein the controller establishes a first position of at least one of a first protrusion and indent on the first fluid driver relative to a second position of at least one of a second protrusion and indent on the second fluid driver so as to create synchronized contact between the first fluid driver and the second fluid driver to seal a fluid path from an outlet of the first hydraulic pump to an inlet of the first hydraulic pump, and
wherein the controller establishes a third position of at least one of a third protrusion and indent on the third fluid driver relative to a fourth position of at least one of a fourth protrusion and indent on the fourth fluid driver so as to create synchronized contact between the third fluid driver and the fourth fluid driver to seal a fluid path from an outlet of the second hydraulic pump to an inlet of the second hydraulic pump.

70. The hydraulic system of embodiment 69, wherein the controller includes a plurality of operational modes including at least one of a flow control mode, a pressure control mode, and a balanced control mode.

71. The hydraulic system of embodiment 70, wherein, in the balanced control mode, the pump control circuit controls each motor in the first, second, third and fourth fluid drivers to adjust the pressure in the system to the pressure set point and the valve control circuit concurrently controls the first, second, third and fourth valve assemblies to adjust the flow in the system to the flow set point.

72. The hydraulic system of embodiment 70, wherein, in the pressure control mode, the pump control circuit controls each motor in the first, second, third and fourth fluid drivers to adjust the pressure in the system to the pressure set point and the valve control circuit concurrently controls the first, second, third and fourth valve assemblies to adjust the pressure in the system to the pressure set point.

73. The hydraulic system of embodiment 70, wherein, in the flow control mode, the pump control circuit controls each motor in the first, second, third and fourth fluid drivers to adjust the flow in the system to the flow set point and the valve control circuit concurrently controls the first, second, third and fourth valve assemblies to adjust the flow in the system to the flow set point.

74. The hydraulic system of any one of embodiments 69 to 73, wherein the pump control circuit includes a motion control module that, based on at least one of the flow and the pressure in the hydraulic system, provides a first demand signal to the first fluid driver and a second demand signal to the second fluid driver,
  wherein the motion control module adjusts at least one of the first demand signal and the second demand signal based on at least one of a first position feedback signal relating to the first position and a second position feedback signal relating to the second position,
  wherein the pump control circuit provides a third demand signal to the third fluid driver and a fourth demand signal to the fourth fluid driver, and
  wherein the motion control module adjusts at least one of the third demand signal and the fourth demand signal based on at least one of a third position feedback signal relating to the third position and a fourth position feedback signal relating to the fourth position.

75. The hydraulic system of any one of embodiments 69 to 74, wherein either the first or second hydraulic pump assemblies is set up as a lead pump assembly and the other of the first or second hydraulic pump assembly is set up as lag pump assembly to provide flow based on a predetermined criteria.

76. The hydraulic system of embodiment 75, wherein predetermined criteria is at least one of the lead pump assembly reaching a predetermined flow and the lead pump has experienced a mechanical or electrical problem.

77. The hydraulic system of embodiment 76, wherein the lead pump assembly and the lag pump assembly have a same load capacity.

78. The hydraulic system of embodiment 76, wherein the lag pump assembly has a smaller load capacity than the lead pump assembly.

79. The hydraulic system of any one of embodiments 69 to 78, wherein the fluid-driven actuator is a fluid driven cylinder.

80. The hydraulic system of any one of embodiments 69 to 78, wherein the fluid-driven actuator is a fluid driven motor.

81. A hydraulic system comprising:
  a fluid-driven hydraulic actuator having first and second ports;
  a first hydraulic pump assembly connected to the fluid-driven hydraulic actuator, the first hydraulic pump assembly to provide hydraulic fluid to operate the fluid-driven hydraulic actuator, the first integrated hydraulic pump assembly including,
    a first hydraulic pump having a casing defining a first interior volume, the casing having a third port in fluid communication with the first interior volume, and a fourth port in fluid communication with the first interior volume, the first hydraulic pump having a first fluid diver and a second fluid driver disposed inside the first interior volume, each first and second fluid drivers having at least one of a variable-speed and a variable torque motor;
    a first proportional control valve assembly in fluid communication with the first and third ports, and
    a second proportional valve assembly in fluid communication with the fourth port; and
  a second hydraulic pump assembly connected to the fluid-driven hydraulic actuator, the first pump assembly and the second pump assembly arranged in a serial flow configuration to provide hydraulic fluid to operate the fluid-driven hydraulic actuator, the second hydraulic pump assembly including
    a second hydraulic pump having a casing defining a second interior volume, the casing having a fifth port in fluid communication with the second interior volume, and a sixth port in fluid communication with the second interior volume, the second hydraulic pump having a third fluid driver and a fourth fluid driver disposed inside the second interior volume, each third and fourth fluid drivers having at least one of a variable-speed and a variable torque motor;
    a third valve assembly in fluid communication with the second valve assembly and the fifth port, and
    a fourth valve assembly in fluid communication with the second and sixth ports; and
  a controller having a hydraulic control module for controlling hydraulic functions in the hydraulic system, the controller communicating with a pump control circuit to establish at least one of a speed and a torque of each motor in a downstream hydraulic pump assembly of the first and second hydraulic pump assemblies to adjust at least one of a flow in the hydraulic system to a flow set point and a pressure in the hydraulic system to a pressure set point, and communicating with a valve control circuit to concurrently establish respective openings of valve assemblies in the downstream hydraulic pump assembly to adjust at least one of the flow to the flow set point and the pressure to the pressure set point,
    wherein the controller establishes a first position of at least one of a first protrusion and indent on the first fluid driver relative to a second position of at least one of a second protrusion and indent on the second fluid driver so as to create synchronized contact between the first fluid driver and the second fluid driver to seal a fluid path from an outlet of the first hydraulic pump to an inlet of the first hydraulic pump, and
    wherein the controller establishes a third position of at least one of a third protrusion and indent on the third fluid driver relative to a fourth position of at least one of a fourth protrusion and indent on the fourth fluid driver so as to create synchronized contact between the third fluid driver and the fourth fluid driver to seal a fluid path from an outlet of the second hydraulic pump to an inlet of the second hydraulic pump.

82. The hydraulic system of embodiment 81, wherein the controller includes a plurality of operational modes including at least one of a flow control mode, a pressure control mode, and a balanced control mode.

83. The hydraulic system of embodiment 82, wherein, in the balanced control mode, the pump control circuit controls each motor in the downstream hydraulic pump assembly to adjust the pressure in the system to the pressure set point and the valve control circuit concurrently controls the valve assemblies in the downstream pump assembly to adjust the flow in the system to the flow set point.

84. The hydraulic system of embodiment 82, wherein, in the pressure control mode, the pump control circuit controls each motor in the downstream hydraulic pump assembly to adjust the pressure in the system to the pressure set point and the valve control circuit concurrently controls the valve assemblies in the downstream hydraulic pump assembly to adjust the pressure in the system to the pressure set point.

85. The hydraulic system of embodiment 82, wherein, in the flow control mode, the pump control circuit controls each motor in the downstream hydraulic pump assembly to adjust the flow in the system to the flow set point and the valve control circuit concurrently controls the valve assemblies in the downstream hydraulic pump assembly to adjust the flow in the system to the flow set point.

86. The hydraulic system of any one of embodiments 81 to 85, wherein the pump control circuit includes a motion control module that, based on at least one of the flow and the pressure in the hydraulic system, provides a first demand signal to the first fluid driver and a second demand signal to the second fluid driver,
wherein the motion control module adjusts at least one of the first demand signal and the second demand signal based on at least one of a first position feedback signal relating to the first position and a second position feedback signal relating to the second position,
wherein the pump control circuit provides a third demand signal to the third fluid driver and a fourth demand signal to the fourth fluid driver, and
wherein the motion control module adjusts at least one of the third demand signal and the fourth demand signal based on at least one of a third position feedback signal relating to the third position and a fourth position feedback signal relating to the fourth position.

87. The hydraulic system of any one of embodiments 81 to 86, wherein the pump control circuit regulates a flow of an upstream pump assembly of the first and second integrated hydraulic pump assemblies in relation to a flow of the downstream pump assembly.

88. A method for controlling a fluid flow in a hydraulic system, the hydraulic system including a first hydraulic pump fluidly connected to a first proportional control valve and a second hydraulic pump fluidly connected to a second proportional control valve, the first and second hydraulic pumps configured in a parallel flow configuration to provide hydraulic fluid to a fluid-driven hydraulic actuator that controls a load, each of the first and second hydraulic pumps including two motors and two fluid displacement members to be driven by the respective motors, the method comprising:
placing the first hydraulic pump in a lead mode;
placing the second hydraulic pump in a backup mode;
initiating operation of the first hydraulic pump;
establishing a first pump demand signal to control at least one of a speed and a torque of each motor in the first hydraulic pump to adjust at least one of a flow in the hydraulic system to a flow set point and a pressure in the hydraulic system to a pressure set point;
establishing concurrently with the first pump demand signal a first valve demand signal to control an opening of the first proportional control valve to adjust at least one of the flow to the flow set point and the pressure to the pressure set point;
establishing a first position of at least one of a first protrusion and indent on a first fluid displacement member of the first hydraulic pump relative to a second position of at least one of a second protrusion and indent on a second fluid displacement member of the first hydraulic pump so as to create synchronized contact between the first fluid displacement member and the second fluid displacement member to seal a fluid path from an outlet of the first hydraulic pump to an inlet of the first hydraulic pump.

89. The method of embodiment 88, further comprising:
initiating operation of the second pump when the first pump has at least one of reached a predetermined flow value and experienced a mechanical or electrical problem; and
establishing a second pump demand signal to control at least one of a speed and a torque of each motor in the second hydraulic pump to adjust at least one of the flow in the fluid system to the flow set point and the pressure in the fluid system to the pressure set point;
establishing concurrently with the second pump demand signal a second valve demand signal to control an opening of the second proportional control valve to adjust at least one of the flow to the flow set point and the pressure to the pressure set point;
establishing a third position of at least one of a third protrusion and indent on a third fluid displacement member of the second hydraulic pump relative to a fourth position of at least one of a fourth protrusion and indent on a fourth fluid displacement member of the second hydraulic pump so as to create synchronized contact between the third fluid displacement member and the fourth fluid displacement member to seal a fluid path from an outlet of the second hydraulic pump to an inlet of the second hydraulic pump.

90. The method of embodiment 89, further comprising:
providing a first motor demand signal to a first motor of the first hydraulic pump and a second motor demand signal to a second motor of the first hydraulic pump based on the first pump demand signal;
providing a third motor demand signal to a third motor of the second hydraulic pump and a fourth motor demand signal to a fourth motor of the second hydraulic pump based on the second pump demand signal;
adjusting at least one of the first demand signal and the second demand signal based on at least one of a first position feedback signal relating to the first position and a second position feedback signal relating to the second position; and
adjusting at least one of the third demand signal and the fourth demand signal based on at least one of a third position feedback signal relating to the third position and a fourth position feedback signal relating to the fourth position.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:
1. A hydraulic system comprising:
a hydraulic pump assembly to provide hydraulic fluid to a hydraulic actuator having first and second ports, the hydraulic pump assembly including,
a hydraulic gear pump with a first gear having a plurality of first gear teeth and a second gear having a plurality of second gear teeth,
a first motor to rotate the first gear, and
a second motor to rotate the second gear, the first gear and second gear disposed so as to transfer hydraulic fluid from an inlet port of the hydraulic gear pump to an outlet port of the hydraulic gear pump;

a control valve disposed on a side of the outlet port with respect to a direction of fluid flow, the control valve in fluid communication with the first port and the outlet port; and a controller configured to establish at least one of a speed or a torque of the first and second motors to adjust via the hydraulic gear pump at least one of a flow in the hydraulic system to a flow set point or a pressure in the hydraulic system to a pressure set point, and concurrently establish an opening of the control valve to adjust at least one of the flow to the flow set point or the pressure to the pressure set point, wherein the controller establishes a position of at least one first tooth of the plurality of first gear teeth relative to a position of at least one second tooth of the plurality of second gear teeth so as to create synchronized contact between the first gear and the second gear to seal a fluid path from the outlet of the hydraulic gear pump to the inlet of the hydraulic gear pump.

2. The hydraulic system of claim 1, wherein the controller includes a plurality of operational modes including at least one of a flow control mode, a pressure control mode, or a balanced control mode.

3. The hydraulic system of claim 2, wherein, in the balanced control mode, the controller controls the first and second motors to adjust the pressure in the system to the pressure set point and concurrently controls the control valve to adjust the flow in the system to the flow set point.

4. The hydraulic system of claim 2, wherein, in the pressure control mode, the controller controls the first and second motors to adjust the pressure in the system to the pressure set point and concurrently controls the control valve to adjust the pressure in the system to the pressure set point.

5. The hydraulic system of claim 2, wherein, in the flow control mode, the controller controls the first and second motors to adjust the flow in the system to the flow set point and concurrently controls the control valve to adjust the flow in the system to the flow set point.

6. The hydraulic system of claim 1, wherein the controller includes a motion control module that, based on at least one of the flow or the pressure in the hydraulic system, provides a first demand signal to the first motor and a second demand signal to the second motor, and wherein the motion control module adjusts at least one of the first demand signal or the second demand signal based on at least one of a first position feedback signal relating to the position of the at least one first tooth or a second position feedback signal relating to the position of the at least one second tooth.

7. The hydraulic system of claim 6, wherein the hydraulic actuator is a hydraulic cylinder or a hydraulic motor.

8. The hydraulic system of claim 7, wherein the hydraulic system is a closed-loop system.

9. The hydraulic system of claim 6, wherein the synchronized contact is such that a slip coefficient is 5% or less.

10. The hydraulic system of claim 6, wherein at least one of the first motor or the second motor is respectively disposed within the first gear or the second gear.

11. The hydraulic system of claim 10, wherein each of the first motor and the second motor is respectively disposed within the first gear and the second gear.

12. The hydraulic system of claim 6, further comprising a storage device in fluid communication with the hydraulic gear pump to store the hydraulic fluid.

13. A method for controlling a fluid flow in a hydraulic fluid system, the hydraulic fluid system including a hydraulic gear pump with a first gear having a plurality of first gear teeth and a second gear having a plurality of second gear teeth, the hydraulic gear pump to provide hydraulic fluid to an actuator that controls a load, the hydraulic fluid system also including at least one control valve throttleable between a closed position and an open position, the hydraulic fluid system further including a first motor to rotate the first gear and a second motor to rotate the second gear, the method comprising:

establishing at least one of a speed or a torque of the first and second motors to adjust via the hydraulic gear pump at least one of a flow in the hydraulic fluid system to a flow set point or a pressure in the hydraulic fluid system to a pressure set point;

establishing, concurrently with controlling the first and second motors an opening of the at least one control valve to adjust at least one of the flow to the flow set point or the pressure to the pressure set point; and establishing a first position of at least one first tooth of the plurality of first gear teeth relative to a second position of at least one second tooth of the plurality of second gear teeth so as to create synchronized contact between the first gear and the second gear to seal a fluid path from the outlet of the hydraulic gear pump to the inlet of the hydraulic gear pump.

14. The method of claim 13, further comprising:

establishing a plurality of operational modes in the hydraulic fluid system including at least one of a flow control mode, a pressure control mode, or a balanced control mode.

15. The method of claim 14, wherein, in the balanced control mode, the first and second motors adjust the pressure in the system to the pressure set point and the control valve concurrently adjusts the flow in the system to the flow set point.

16. The method of claim 14, wherein, in the pressure control mode, the first and second motors adjust the pressure in the system to the pressure set point and the control valve concurrently adjusts the pressure in the system to the pressure set point.

17. The method of claim 14, wherein, in the flow control mode, the first and second motors adjust the flow in the system to the flow set point and the control valve concurrently adjusts the flow in the system to the flow set point.

18. The method of claim 13, further comprising:

adjusting at least one of a demand signal to the first motor or a demand signal to the second motor based on at least one of a first position feedback signal relating to the first position or a second position feedback signal relating to the second position.

19. The method of claim 18, wherein the operation of the hydraulic gear pump is initiated in a closed-loop system.

20. The method of claim 18, wherein the synchronized contact is such that a slip coefficient is 5% or less.

* * * * *